(12) United States Patent
Puri et al.

(10) Patent No.: US 9,819,965 B2
(45) Date of Patent: Nov. 14, 2017

(54) CONTENT ADAPTIVE TRANSFORM CODING FOR NEXT GENERATION VIDEO

(71) Applicant: Intel Corporation, Santa Clara, CA (US)

(72) Inventors: Atul Puri, Redmond, WA (US); Neelesh N. Gokhale, Seattle, WA (US)

(73) Assignee: Intel Corporation, Santa Clara, CA (US)

( * ) Notice: Subject to any disclaimer, the term of this patent is extended or adjusted under 35 U.S.C. 154(b) by 537 days.

(21) Appl. No.: 14/129,204

(22) PCT Filed: Oct. 29, 2013

(86) PCT No.: PCT/US2013/067182
§ 371 (c)(1),
(2) Date: Dec. 24, 2013

(87) PCT Pub. No.: WO2014/078068
PCT Pub. Date: May 22, 2014

(65) Prior Publication Data
US 2015/0010048 A1    Jan. 8, 2015

Related U.S. Application Data

(60) Provisional application No. 61/725,576, filed on Nov. 13, 2012, provisional application No. 61/758,314, filed on Jan. 30, 2013.

(51) Int. Cl.
*H04N 19/122* (2014.01)
*H04N 19/625* (2014.01)
(Continued)

(52) U.S. Cl.
CPC .......... *H04N 19/82* (2014.11); *H04N 19/105* (2014.11); *H04N 19/119* (2014.11); *H04N 19/12* (2014.11);
(Continued)

(58) Field of Classification Search
None
See application file for complete search history.

(56) References Cited

U.S. PATENT DOCUMENTS

| 5,675,386 A | 10/1997 | Lee et al. |
|---|---|---|
| 5,729,691 A | 3/1998 | Agarwal |

(Continued)

FOREIGN PATENT DOCUMENTS

| EP | 0799550 | 10/1997 |
|---|---|---|
| JP | 2012517132 | 7/2012 |

(Continued)

OTHER PUBLICATIONS

G. J. Sullivan, J. R. Ohm, W. J. Han and T. Wiegand, "Overview of the High Efficiency Video Coding (HEVC) Standard," in IEEE Transactions on Circuits and Systems for Video Technology, vol. 22, No. 12, pp. 1649-1668, Dec. 2012. doi: 10.1109/TCSVT.2012.2221191.*

(Continued)

*Primary Examiner* — Jorge L Ortiz Criado
*Assistant Examiner* — Stefan Gadomski
(74) *Attorney, Agent, or Firm* — Green, Howard, & Mughal LLP

(57) ABSTRACT

Techniques related to applying content adaptive and fixed transforms to prediction error data partitions for coding video are discussed. Such techniques may include applying content adaptive transforms having content dependent basis functions to small to medium sized prediction error data partitions and fixed transforms having fixed basis functions to medium to large sized prediction error data partitions.

22 Claims, 22 Drawing Sheets

(51) Int. Cl.

| | | |
|---|---|---|
| *H04N 19/91* | (2014.01) | |
| *H04N 19/61* | (2014.01) | |
| *H04N 19/119* | (2014.01) | |
| *H04N 19/503* | (2014.01) | |
| *H04N 19/82* | (2014.01) | |
| *H04N 19/176* | (2014.01) | |
| *H04N 19/147* | (2014.01) | |
| *H04N 19/46* | (2014.01) | |
| *H04N 19/136* | (2014.01) | |
| *H04N 19/85* | (2014.01) | |
| *H04N 19/12* | (2014.01) | |
| *H04N 19/172* | (2014.01) | |
| *H04N 19/44* | (2014.01) | |
| *H04N 19/513* | (2014.01) | |
| *H04N 19/573* | (2014.01) | |
| *H04N 19/105* | (2014.01) | |
| *H04N 19/139* | (2014.01) | |
| *H04N 19/527* | (2014.01) | |

(52) U.S. Cl.
CPC ......... *H04N 19/122* (2014.11); *H04N 19/136* (2014.11); *H04N 19/139* (2014.11); *H04N 19/147* (2014.11); *H04N 19/172* (2014.11); *H04N 19/176* (2014.11); *H04N 19/44* (2014.11); *H04N 19/46* (2014.11); *H04N 19/513* (2014.11); *H04N 19/527* (2014.11); *H04N 19/573* (2014.11); *H04N 19/61* (2014.11); *H04N 19/85* (2014.11); *H04N 19/91* (2014.11)

(56) References Cited

U.S. PATENT DOCUMENTS

| | | | |
|---|---|---|---|
| 8,009,965 | B2 | 8/2011 | Takao |
| 8,817,868 | B2 * | 8/2014 | Holcomb ............ H04N 19/136 375/240 |
| 2002/0044604 | A1 | 4/2002 | Nieweglowski et al. |
| 2002/0110280 | A1 * | 8/2002 | Prakash ................. H04N 19/50 382/240 |
| 2004/0114684 | A1 | 6/2004 | Karczewicz et al. |
| 2004/0151248 | A1 | 8/2004 | Kondo et al. |
| 2005/0094729 | A1 | 5/2005 | Yuan et al. |
| 2006/0088096 | A1 * | 4/2006 | Han ....................... H04N 19/00 375/240.03 |
| 2006/0133479 | A1 | 6/2006 | Chen et al. |
| 2006/0251330 | A1 | 11/2006 | Toth et al. |
| 2007/0121731 | A1 | 5/2007 | Tanizawa et al. |
| 2007/0291849 | A1 | 12/2007 | Lainema |
| 2008/0112489 | A1 | 5/2008 | Malladi et al. |
| 2009/0046937 | A1 | 2/2009 | Fenney et al. |
| 2009/0154567 | A1 | 6/2009 | Lei et al. |
| 2009/0167775 | A1 | 7/2009 | Lu et al. |
| 2009/0175333 | A1 | 7/2009 | Hsiang et al. |
| 2009/0196517 | A1 | 8/2009 | Divorra Escoda et al. |
| 2009/0257664 | A1 | 10/2009 | Kao et al. |
| 2009/0279615 | A1 | 11/2009 | Au et al. |
| 2010/0002775 | A1 | 1/2010 | Huang et al. |
| 2010/0040146 | A1 | 2/2010 | Wang et al. |
| 2010/0046845 | A1 | 2/2010 | Wedi et al. |
| 2010/0202521 | A1 | 8/2010 | Koo et al. |
| 2011/0058611 | A1 | 3/2011 | Sugimoto et al. |
| 2011/0200113 | A1 | 8/2011 | Kim et al. |
| 2011/0243228 | A1 * | 10/2011 | Ngan ................... H04N 19/159 375/240.13 |
| 2011/0255610 | A1 | 10/2011 | Kameyama et al. |
| 2011/0280309 | A1 | 11/2011 | Francois et al. |
| 2011/0294544 | A1 | 12/2011 | Liang et al. |
| 2012/0128070 | A1 | 5/2012 | Kim et al. |
| 2012/0134412 | A1 | 5/2012 | Shibahara et al. |
| 2012/0155532 | A1 | 6/2012 | Puri et al. |
| 2012/0155533 | A1 | 6/2012 | Puri et al. |
| 2012/0236929 | A1 * | 9/2012 | Liu ................... H04N 19/00739 375/240.02 |
| 2012/0257677 | A1 | 10/2012 | Bankoski et al. |
| 2012/0281928 | A1 | 11/2012 | Cohen |
| 2013/0022127 | A1 | 1/2013 | Park et al. |
| 2013/0101048 | A1 * | 4/2013 | Lee ......................... G06F 17/14 375/240.19 |
| 2013/0114732 | A1 * | 5/2013 | Dong ................... G06F 17/147 375/240.19 |
| 2013/0136175 | A1 * | 5/2013 | Wang ............... H04N 19/00781 375/240.12 |
| 2013/0208794 | A1 | 8/2013 | Jeong et al. |
| 2013/0272422 | A1 * | 10/2013 | Lee ................. H04N 19/00781 375/240.18 |
| 2013/0287106 | A1 | 10/2013 | Lee et al. |
| 2014/0328400 | A1 | 11/2014 | Puri et al. |

FOREIGN PATENT DOCUMENTS

| | | |
|---|---|---|
| KR | 100948714 | 1/2008 |
| KR | 20080067363 | 7/2008 |
| KR | 20100007980 | 1/2010 |
| KR | 20100042542 | 4/2010 |
| KR | 10-2011-0112171 A | 10/2011 |
| KR | 10-2011-0112180 A | 10/2011 |
| KR | 20110113583 | 10/2011 |
| KR | 10-2011-0129493 A | 12/2011 |
| KR | 20120080548 | 7/2012 |
| KR | 20120120091 | 11/2012 |
| KR | 10-2013-0045425 A | 5/2013 |
| WO | 2009021062 | 2/2009 |
| WO | WO2010086393 | 8/2010 |
| WO | 2011039931 | 4/2011 |
| WO | 2011127961 | 10/2011 |
| WO | 2011128269 | 10/2011 |
| WO | 2013003726 | 1/2013 |
| WO | 2014078422 | 5/2014 |
| WO | 2014109826 | 7/2014 |
| WO | 2014120367 | 8/2014 |
| WO | 2014120369 | 8/2014 |
| WO | 2014120373 | 8/2014 |
| WO | 2014120374 | 8/2014 |
| WO | 2014120575 | 8/2014 |

OTHER PUBLICATIONS

Zixiang Xiong, K. Ramchandran, M. T. Orchard and Ya-Qin Zhang, "A comparative study of DCT- and wavelet-based image coding," in IEEE Transactions on Circuits and Systems for Video Technology, vol. 9, No. 5, pp. 692-695, Aug. 1999. doi: 10.1109/76.780358.*
M. Singh, A.D. Goswami, "Image Compression Technique Using Hybrid Discreet Cosing Transform (DCT) and Discreet Wavelet Transform (DWT) Method", in International Journal of Advanced Research in Computer Science and Software Engineering, vol. 2, Issue 10, pp. 217-223. Oct. 2012.*
International Search Report and Written Opinion received for PCT Patent Application No. PCT/US2013/067182, dated Jan. 29, 2014, 10 pages.
International Search Report and Written Opinion received for PCT Patent Application No. PCT/US2013/077967, dated Apr. 10, 2014, 16 pages.
EP Search Report, dated Jun. 16, 2016, for EP Patent Application No. 13855401.9.
International Preliminary Report on Patentability for PCT Application No. PCT/US2013/067182, dated May 28, 2015.
International Preliminary Report on Patentability for PCT/US2013/077692 dated Aug. 13, 2015, 10 pages.
International Search Report and Written Opinion for International Application No. PCT/US2013/069905, dated Feb. 26, 2014.
International Search Report and Written Opinion for International Application No. PCT/US2013/069960, dated Mar. 14, 2014.
International Search Report and Written Opinion for PCT Application No. PCT/US2013/069962 dated Feb. 28, 2014.
International Search Report and Written Opinion for PCT Application No. PCT/US2013/078114, dated May 13, 2014.

(56) References Cited

OTHER PUBLICATIONS

Non-Final Office Action dated Jun. 29, 2016 for Korean Patent Application No. 2015-7009451.
Search Report for European Patent Application No. 13873683.0, dated Jun. 16, 2016, 8 pages.
Chujoh, et al., "Specification and experimental results of quadtree-based adaptive loop filter", ITU-Telecommunications Standardization Sector, VCEG-AK22, Apr. 2009, 11 pages.
Minasyan, S. et al., "An image compression scheme based on parametric Haar-like transform", IEEE International Symposium on Circuits and Systems, May 2005, pp. 2088-2091.
Final Office Action dated Feb. 2, 2017 for U.S. Appl. No. 14/379,532.
Final Office Action dated Mar. 7, 2017 for Korea Patent Application No. 2015-7009451.
Final Office Action dated Dec. 30, 2016 for Korean Patent Application No. 2015-7009451.
Non-Final Office Action for U.S. Appl. No. 14/379,532, dated Sep. 30, 2016.
Office Action (Search Report), dated Nov. 17, 2016, for European Patent Application No. 138554019.
First Office Action dated Apr. 5, 2017 for Chinese Patent Application No.201380053444.5.
Xu, Jizheng et al., "An Overview of Directional Transforms in Image Coding", IEEE Int'l Symposium on Circuits and Systems, ISCAS May 30, 2010 to Jun. 2, 2010, Paris, France, IEEE, US, May 30, 2010, pp. 3036-3039.

\* cited by examiner

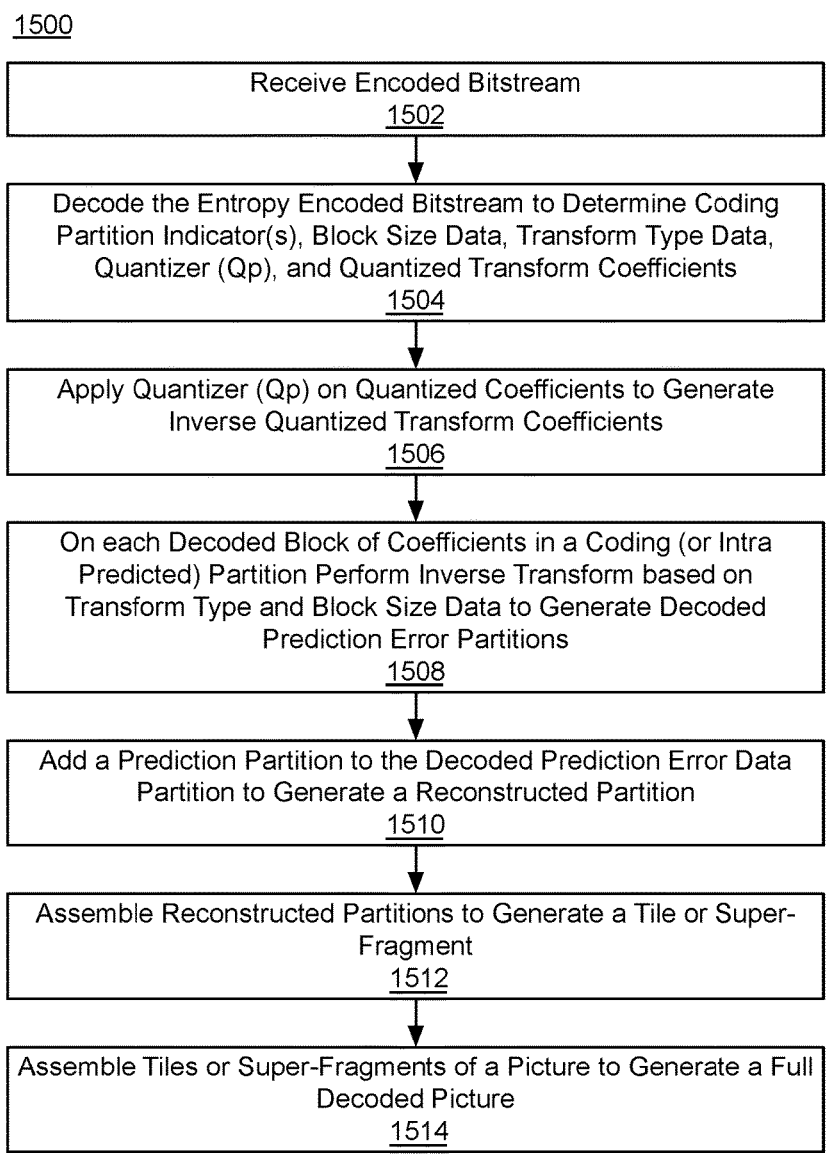

Table 5 - Example of bi-tree partitioning codebook entries
| Index | Shape | Number of Partitions |
|---|---|---|
| 0 | 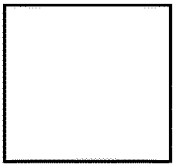 | 1 |
| 1 | 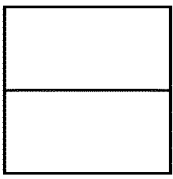 | 2 |
| 2 | 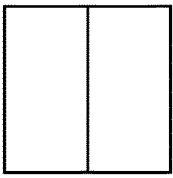 | 2 |
| 3 | 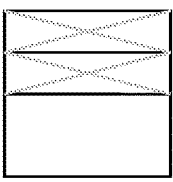 | 3 |
| 4 | 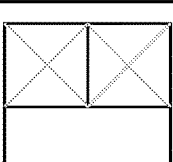 | 3 |
| 5 | 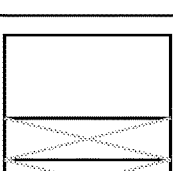 | 3 |
FIG. 18A Table 5 (continued) - Example of bi-tree partitioning codebook entries Table 6 - Example of k-d tree partitioning codebook entries

| Index | Shape | Number of Partitions |
|---|---|---|
| 0 | | 1 |
| 1 | | 2 |
| 2 | | 2 |
| 3 | | 2 |
| 4 | | 2 |

FIG. 19A

Table 6 (continued) - Example of k-d tree partitioning codebook entries

Table 6 (continued) - Example of k-d tree partitioning codebook entries

CONTENT ADAPTIVE TRANSFORM CODING FOR NEXT GENERATION VIDEO

RELATED APPLICATIONS

The present application claims the benefit of U.S. Provisional Application No. 61/725,576 filed 13 Nov. 2012, and titled "CONTENT ADAPTIVE VIDEO CODER", as well as U.S. Provisional Application No. 61/758,314 filed 30 Jan. 2013, and titled "NEXT GENERATION VIDEO CODING".

BACKGROUND

A video encoder compresses video information so that more information can be sent over a given bandwidth. The compressed signal may then be transmitted to a receiver having a decoder that decodes or decompresses the signal prior to display.

High Efficiency Video Coding (HEVC) is the latest video compression standard, which is being developed by the Joint Collaborative Team on Video Coding (JCT-VC) formed by ISO/IEC Moving Picture Experts Group (MPEG) and ITU-T Video Coding Experts Group (VCEG). HEVC is being developed in response to the previous H.264/AVC (Advanced Video Coding) standard not providing enough compression for evolving higher resolution video applications. Similar to previous video coding standards, HEVC includes basic functional modules such as intra/inter prediction, transform, quantization, in-loop filtering, and entropy coding.

The ongoing HEVC standard may attempt to improve on limitations of the H.264/AVC standard such as limited choices for allowed prediction partitions and coding partitions, limited allowed multiple references and prediction generation, limited transform block sizes and actual transforms, limited mechanisms for reducing coding artifacts, and inefficient entropy encoding techniques. However, the ongoing HEVC standard may use iterative approaches to solving such problems.

BRIEF DESCRIPTION OF THE DRAWINGS

The material described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements. In the figures:

FIG. 10 illustrates an example bitstream;

FIG. 11 is a flow diagram illustrating an example process;

FIGS. 18A and 18B illustrate an example bi-tree partitioning codebook of entries with fragment size of 32×32 pixels for use in defining a partition of a tile or a super-fragment; and FIGS. 19A, 19B, and 19C illustrate an example k-d tree partitioning codebook of entries with fragment size of 32×32 pixels for use in defining a partition, all arranged in accordance with at least some implementations of the present disclosure.

DETAILED DESCRIPTION

Figure 1:
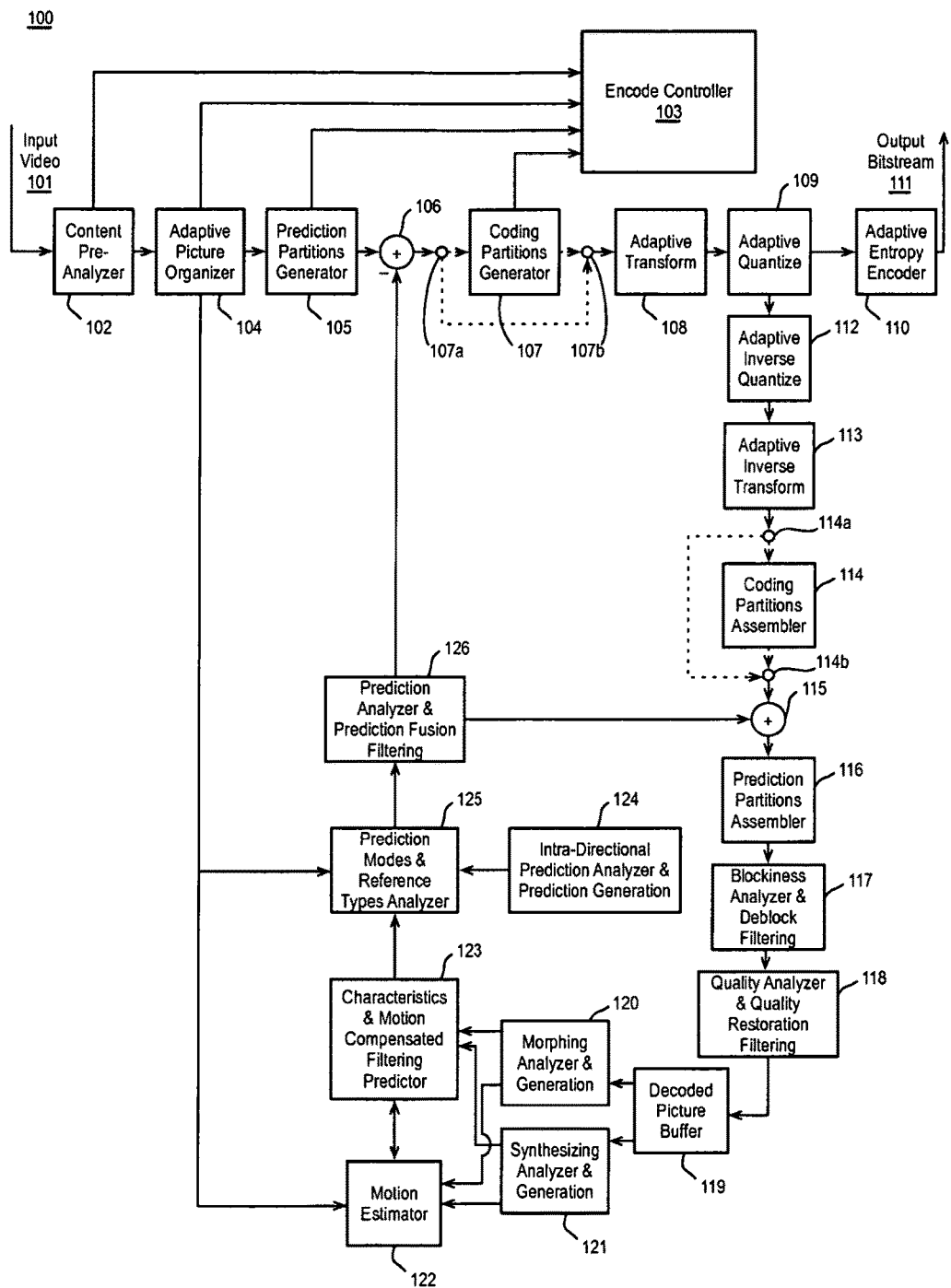
FIG. 1 is an illustrative diagram of an example next generation video encoder.

One or more embodiments or implementations are now described with reference to the enclosed figures. While specific configurations and arrangements are discussed, it should be understood that this is done for illustrative purposes only. Persons skilled in the relevant art will recognize that other configurations and arrangements may be employed without departing from the spirit and scope of the description. It will be apparent to those skilled in the relevant art that techniques and/or arrangements described herein may also be employed in a variety of other systems and applications other than what is described herein.

While the following description sets forth various implementations that may be manifested in architectures such as system-on-a-chip (SoC) architectures for example, implementation of the techniques and/or arrangements described herein are not restricted to particular architectures and/or computing systems and may be implemented by any architecture and/or computing system for similar purposes. For instance, various architectures employing, for example, multiple integrated circuit (IC) chips and/or packages, and/or various computing devices and/or consumer electronic (CE) devices such as set top boxes, smart phones, etc., may implement the techniques and/or arrangements described herein. Further, while the following description may set forth numerous specific details such as logic implementations, types and interrelationships of system components, logic partitioning/integration choices, etc., claimed subject matter may be practiced without such specific details. In other instances, some material such as, for example, control structures and full software instruction sequences, may not be shown in detail in order not to obscure the material disclosed herein.

The material disclosed herein may be implemented in hardware, firmware, software, or any combination thereof. The material disclosed herein may also be implemented as instructions stored on a machine-readable medium, which may be read and executed by one or more processors. A machine-readable medium may include any medium and/or mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.); and others.

References in the specification to "one implementation", "an implementation", "an example implementation", etc., indicate that the implementation described may include a particular feature, structure, or characteristic, but every embodiment may not necessarily include the particular feature, structure, or characteristic. Moreover, such phrases are not necessarily referring to the same implementation. Further, when a particular feature, structure, or characteristic is described in connection with an embodiment, it is submitted that it is within the knowledge of one skilled in the art to effect such feature, structure, or characteristic in connection with other implementations whether or not explicitly described herein.

Systems, apparatus, articles, and methods are described below related to content adaptive transforms for video coding.

Next generation video (NGV) systems, apparatus, articles, and methods are described below. NGV video coding may incorporate significant content based adaptivity in the video coding process to achieve higher compression. As discussed above, the H.264/AVC standard may have a variety of limitations and ongoing attempts to improve on the standard, such as, for example, the HEVC standard may use iterative approaches to address such limitations. Herein, an NGV system including an encoder and a decoder will be described.

Also as discussed, the H.264/AVC standard may include limited choices of coding partitions and fixed transforms. In particular, as discussed herein, video data may be received for transform coding. The video data may include any suitable data for transform coding such as, for example, residual video data, prediction partitions, prediction error data partitions, tiles or super-fragments, or wavelet data. In some examples, the video data may include prediction error data partitions having error data for prediction partitions. For example, the prediction partitions may include partitions of tiles or super-fragments of a video frame.

The received video data may be partitioned. In various examples, the video data may be partitioned based on the data type (e.g., F/B-picture (e.g., functional or bi-directional), P-picture (e.g., predictive), or I-picture (e.g., intra compensation only)) or prediction technique (e.g., inter- or intra- or the like) associated with the video data using bi-tree partitioning or k-d tree partitioning. In some examples, the video data may include prediction error data partitions (e.g., associated with inter prediction for P- and F/B-pictures) and the prediction error data partitions may be partitioned into coding partitions. For example, prediction error data partitions may be partitioned into coding partitions using bi-tree partitioning or k-d tree partitioning. As used herein, the term F/B-picture may include an F-picture (e.g., functional) or a B-picture (e.g. bi-directional) such that the picture may use prior or future previously decoded pictures or frames for prediction.

In some examples, the video data may include tiles or super-fragments of a video frame for intra-prediction (either for I-pictures or for intra prediction in P- and F/B-pictures), which may be partitioned to generate partitions for prediction. In some examples, such partitioning may be performed using k-d tree partitioning for I-pictures and using bi-tree partitioning for P- and F/B-pictures. Prediction partitions associated with partitions for prediction may be generated (e.g., via intra-prediction techniques) and differenced with original pixel data to generate prediction error data partitions. In such examples, only a single level of partitioning may be performed and the prediction error data partitions may be considered coding partitions.

In some examples, the plurality of coding partitions may be transformed such that a subset of the coding partitions (e.g., small to medium sized coding partitions) are transformed using a content adaptive transform (e.g., a transform which has a basis that is block wise adaptive) and another subset of the coding partitions (e.g., medium to large sized partitions) are transformed using a fixed transform (e.g., a transform having a fixed basis). In other examples, a subset of the coding partitions (e.g., small to medium sized partitions) may be transformed using a content adaptive transform and substantially all of the coding partitions may be transformed using a fixed transform. Based on the success of the transforms and the relative bit costs and error rates, a rate distortion optimization or the like may be made to choose between the content adaptive transform(s) and the fixed transform(s) for the coding partitions.

In examples where both bi-tree and k-d tree partitioning are used based on picture or prediction type as discussed, similar techniques may be applied. In some examples, the bi-tree coding partitions may be transformed such that a subset of the coding partitions (e.g., small to medium sized partitions) are transformed using a content adaptive transform and another subset of the coding partitions (e.g., medium to large sized partitions) are transformed using a fixed transform. Similarly, in some examples, the k-d tree partitions may be transformed such that a subset of the partitions (e.g., small to medium sized partitions) are transformed using a content adaptive transform and another subset of the partitions (e.g., medium to large sized partitions) are transformed using a fixed transform. In other examples, the bi-tree partitions may be transformed such that a subset of the coding partitions (e.g., small to medium sized partitions) may be transformed using a content adaptive transform and substantially all of the coding partitions may be transformed using a fixed transform. Based on the success of the transforms and the relative bit costs and error rates, a rate determination optimization or the like may be made to choose between the content adaptive transform(s) and the fixed transform(s). Similarly, in some examples, the k-d tree partitions may be transformed such that a subset of the partitions (e.g., small to medium sized partitions) may be transformed using a content adaptive transform and substantially all of the coding partitions may be transformed using a fixed transform, and, based on the success of the transforms and the relative bit costs and error rates, a rate determination optimization or the like may be made to choose between the content adaptive transform result and the fixed transform result.

In various examples, the resulting data from the pertinent transforms (e.g., transform coefficients) and data defining the relevant coding partition(s) may be quantized, scanned and entropy encoded into a bitstream for transmission. The bitstream may be decoded and the decoded data may be inverse transformed to generate, for example, prediction error data partitions that may be further used in the decoding process and eventual display via a display device. For coding partitions transformed using a content adaptive transform, the encode process may determine transform data that may be transmitted to the decode process (e.g., in addition to the transform coefficients). Further, for partitions transformed using a content adaptive transform, both the encode and decode processes may include determining basis function parameters associated with the partition based on another block of previously decoded video data. Further, in some examples, the content adaptive transform may include an adaptive parametric transform in either the vertical or horizontal direction and a fixed transform in a direction orthogonal to the adaptive parametric transform. In some examples, the content adaptive transform may include a closed-form hybrid parametric transform.

As used herein, the term "coder" may refer to an encoder and/or a decoder. Similarly, as used herein, the term "coding" may refer to performing video encoding via an encoder and/or performing video decoding via a decoder. For example, a video encoder and video decoder may both be examples of coders capable of coding video data. In addition, as used herein, the term "codec" may refer to any process, program or set of operations, such as, for example, any combination of software, firmware, and/or hardware that may implement an encoder and/or a decoder. Further, as used herein, the phrase "video data" may refer to any type of data associated with video coding such as, for example, video frames, image data, encoded bit stream data, or the like.

FIG. 1 is an illustrative diagram of an example next generation video encoder 100, arranged in accordance with at least some implementations of the present disclosure. As shown, encoder 100 may receive input video 101. Input video 101 may include any suitable input video for encoding such as, for example, input frames of a video sequence. As shown, input video 101 may be received via a content pre-analyzer module 102. Content pre-analyzer module 102 may be configured to perform analysis of the content of video frames of input video 101 to determine various types of parameters for improving video coding efficiency and speed performance. For example, content pre-analyzer module 102 may determine horizontal and vertical gradient information (e.g., Rs, Cs), variance, spatial complexity per picture, temporal complexity per picture, scene change detection, motion range estimation, gain detection, prediction distance estimation, number of objects estimation, region boundary detection, spatial complexity map computation, focus estimation, film grain estimation, or the like. The parameters generated by content pre-analyzer module 102 may be used by encoder 100 (e.g., via encode controller 103) and/or quantized and communicated to a decoder. As shown, video frames and/or other data may be transmitted from content pre-analyzer module 102 to adaptive picture organizer module 104, which may determine the picture type (e.g., I-, P-, or F/B-picture) of each video frame and reorder the video frames as needed. In some examples, adaptive picture organizer module 104 may include a frame portion generator configured to generate frame portions. In some examples, content pre-analyzer module 102 and adaptive picture organizer module 104 may together be considered a pre-analyzer subsystem of encoder 100.

As shown, video frames and/or other data may be transmitted from adaptive picture organizer module 104 to prediction partitions generator module 105. In some examples, prediction partitions generator module 105 may divide a frame or picture into tiles or super-fragments or the like. In some examples, an additional module (e.g., between modules 104 and 105) may be provided for dividing a frame or picture into tiles or super-fragments. Prediction partitions generator module 105 may divide each tile or super-fragment into potential prediction partitionings or partitions. In some examples, the potential prediction partitionings may be determined using a partitioning technique such as, for example, a k-d tree partitioning technique, a bi-tree partitioning technique, or the like, which may be determined based on the picture type (e.g., I-, P-, or F/B-picture) of individual video frames, a characteristic of the frame portion being partitioned, or the like. In some examples, the determined potential prediction partitionings may be partitions for prediction (e.g., inter- or intra-prediction) and may be described as prediction partitions or prediction blocks or the like.

In some examples, a selected prediction partitioning (e.g., prediction partitions) may be determined from the potential prediction partitionings. For example, the selected prediction partitioning may be based on determining, for each potential prediction partitioning, predictions using characteristics and motion based multi-reference predictions or intra-predictions, and determining prediction parameters. For each potential prediction partitioning, a potential prediction error may be determined by differencing original pixels with prediction pixels and the selected prediction partitioning may be the potential prediction partitioning with the minimum prediction error. In other examples, the selected prediction partitioning may be determined based on a rate distortion optimization including a weighted scoring based on number of bits for coding the partitioning and a prediction error associated with the prediction partitioning.

As shown, the original pixels of the selected prediction partitioning (e.g., prediction partitions of a current frame) may be differenced with predicted partitions (e.g., a prediction of the prediction partition of the current frame based on a reference frame or frames and other predictive data such as inter- or intra-prediction data) at differencer 106. The determination of the predicted partitions will be described further below and may include a decode loop as shown in FIG. 1. Any residuals or residual data (e.g., partition prediction error data) from the differencing may be transmitted to coding partitions generator module 107. In some examples, such as for intra-prediction of prediction partitions in any picture type (I-, F/B- or P-pictures), coding partitions generator module 107 may be bypassed via switches 107a and 107b. In such examples, only a single level of partitioning may be performed. Such partitioning may be described as prediction partitioning (as discussed) or coding partitioning or both. In various examples, such partitioning may be performed via prediction partitions generator module 105 (as discussed) or, as is discussed further herein, such partitioning may be performed via a k-d tree intra-prediction/coding partitioner module or a bi-tree intra-prediction/coding partitioner module implemented via coding partitions generator module 107.

In some examples, the partition prediction error data, if any, may not be significant enough to warrant encoding. In other examples, where it may be desirable to encode the partition prediction error data and the partition prediction error data is associated with inter-prediction or the like, coding partitions generator module 107 may determine coding partitions of the prediction partitions. In some examples, coding partitions generator module 107 may not be needed as the partition may be encoded without coding partitioning (e.g., as shown via the bypass path available via switches 107a and 107b). With or without coding partitioning, the partition prediction error data (which may subsequently be described as coding partitions in either event) may be transmitted to adaptive transform module 108 in the event the residuals or residual data require encoding. In some examples, prediction partitions generator module 105 and coding partitions generator module 107 may together be considered a partitioner subsystem of encoder 100. In various examples, coding partitions generator module 107 may operate on partition prediction error data, original pixel data, residual data, or wavelet data.

Coding partitions generator module 107 may generate potential coding partitionings (e.g., coding partitions) of, for example, partition prediction error data using bi-tree and/or k-d tree partitioning techniques or the like. In some examples, the potential coding partitions may be transformed using adaptive or fixed transforms with various block sizes via adaptive transform module 108 and a selected coding partitioning and selected transforms (e.g., adaptive or fixed) may be determined based on a rate distortion optimization or other basis. In some examples, the selected coding partitioning and/or the selected transform(s) may be determined based on a predetermined selection method based on coding partitions size or the like.

For example, adaptive transform module 108 may include a first portion or component for performing a parametric transform to allow locally optimal transform coding of small to medium size blocks and a second portion or component for performing globally stable, low overhead transform coding using a fixed transform, such as a discrete cosine transform (DCT) or a picture based transform from a variety of transforms, including parametric transforms, or any other configuration as is discussed further herein. In some examples, for locally optimal transform coding a Parametric Haar Transform (PHT) may be performed, as is discussed further herein. In some examples, transforms may be performed on 2D blocks of rectangular sizes between about 4×4 pixels and 64×64 pixels, with actual sizes depending on a number of factors such as whether the transformed data is luma or chroma, or inter or intra, or if the determined transform used is PHT or DCT or the like.

As shown, the resultant transform coefficients may be transmitted to adaptive quantize module 109. Adaptive quantize module 109 may quantize the resultant transform coefficients. Further, any data associated with a parametric transform, as needed, may be transmitted to either adaptive quantize module 109 (if quantization is desired) or adaptive entropy encoder module 110. Also as shown in FIG. 1, the quantized coefficients may be scanned and transmitted to adaptive entropy encoder module 110. Adaptive entropy encoder module 110 may entropy encode the quantized coefficients and include them in output bitstream 111. In some examples, adaptive transform module 108 and adaptive quantize module 109 may together be considered a transform encoder subsystem of encoder 100.

As also shown in FIG. 1, encoder 100 includes a local decode loop. The local decode loop may begin at adaptive inverse quantize module 112. Adaptive inverse quantize module 112 may be configured to perform the opposite operation(s) of adaptive quantize module 109 such that an inverse scan may be performed and quantized coefficients may be de-scaled to determine transform coefficients. Such an adaptive quantize operation may be lossy, for example. As shown, the transform coefficients may be transmitted to an adaptive inverse transform module 113. Adaptive inverse transform module 113 may perform the inverse transform as that performed by adaptive transform module 108, for example, to generate residuals or residual values or partition prediction error data (or original data or wavelet data, as discussed) associated with coding partitions. In some examples, adaptive inverse quantize module 112 and adaptive inverse transform module 113 may together be considered a transform decoder subsystem of encoder 100.

As shown, the partition prediction error data (or the like) may be transmitted to optional coding partitions assembler 114. Coding partitions assembler 114 may assemble coding partitions into decoded prediction partitions as needed (as shown, in some examples, coding partitions assembler 114 may be skipped via switches 114a and 114b such that decoded prediction partitions may have been generated at adaptive inverse transform module 113) to generate prediction partitions of prediction error data or decoded residual prediction partitions or the like.

As shown, the decoded residual prediction partitions may be added to predicted partitions (e.g., prediction pixel data) at adder 115 to generate reconstructed prediction partitions. The reconstructed prediction partitions may be transmitted to prediction partitions assembler 116. Prediction partitions assembler 116 may assemble the reconstructed prediction partitions to generate reconstructed tiles or super-fragments. In some examples, coding partitions assembler module 114 and prediction partitions assembler module 116 may together be considered an un-partitioner subsystem of encoder 100.

The reconstructed tiles or super-fragments may be transmitted to blockiness analyzer and deblock filtering module 117. Blockiness analyzer and deblock filtering module 117 may deblock and dither the reconstructed tiles or super-fragments (or prediction partitions of tiles or super-fragments). The generated deblock and dither filter parameters may be used for the current filter operation and/or coded in bitstream 111 for use by a decoder, for example. The output of blockiness analyzer and deblock filtering module 117 may be transmitted to a quality analyzer and quality restoration filtering module 118. Quality analyzer and quality restoration filtering module 118 may determine QR filtering parameters (e.g., for a QR decomposition) and use the determined parameters for filtering. The QR filtering parameters may also be coded in bitstream 111 for use by a decoder. As shown, the output of quality analyzer and quality restoration filtering module 118 may be transmitted to decoded picture buffer 119. In some examples, the output of quality analyzer and quality restoration filtering module 118 may be a final reconstructed frame that may be used for prediction for coding other frames (e.g., the final reconstructed frame may be a reference frame or the like). In some examples, blockiness analyzer and deblock filtering module 117 and quality analyzer and quality restoration filtering module 118 may together be considered a filtering subsystem of encoder 100.

In encoder 100, prediction operations may include inter- and/or intra-prediction. As shown in FIG. 1, inter-prediction may be performed by one or more modules including morphing analyzer and generation module 120, synthesizing analyzer and generation module 121, and characteristics and motion filtering predictor module 123. Morphing analyzer and generation module 120 may analyze a current picture to determine parameters for changes in gain, changes in dominant motion, changes in registration, and changes in blur with respect to a reference frame or frames with which it is to be coded. The determined morphing parameters may be quantized/de-quantized and used (e.g., by morphing analyzer and generation module 120) to generate morphed reference frames that that may be used by motion estimator module 122 for computing motion vectors for efficient motion (and characteristics) compensated prediction of a current frame. Synthesizing analyzer and generation module 121 may generate super resolution (SR) pictures and projected interpolation (PI) pictures or the like for motion for determining motion vectors for efficient motion compensated prediction in these frames.

Motion estimator module 122 may generate motion vector data based on morphed reference frame(s) and/or super resolution (SR) pictures and projected interpolation (PI) pictures along with the current frame. In some examples, motion estimator module 122 may be considered an inter-prediction module. For example, the motion vector data may be used for inter-prediction. If inter-prediction is applied, characteristics and motion filtering predictor module 123 may apply motion compensation as part of the local decode loop as discussed.

Intra-prediction may be performed by intra-directional prediction analyzer and prediction generation module 124. Intra-directional prediction analyzer and prediction generation module 124 may be configured to perform spatial directional prediction and may use decoded neighboring partitions. In some examples, both the determination of direction and generation of prediction may be performed by intra-directional prediction analyzer and prediction generation module 124. In some examples, intra-directional prediction analyzer and prediction generation module 124 may be considered an intra-prediction module.

As shown in FIG. 1, prediction modes and reference types analyzer module 125 may allow for selection of prediction modes from among, "skip", "auto", "inter", "split", "multi", and "intra", for each prediction partition of a tile (or super-fragment), all of which may apply to P- and F/B-pictures. In addition to prediction modes, it also allows for selection of reference types that can be different depending on "inter" or "multi" mode, as well as for P- and F/B-pictures. The prediction signal at the output of prediction modes and reference types analyzer module 125 may be filtered by prediction analyzer and prediction fusion filtering module 126. Prediction analyzer and prediction fusion filtering module 126 may determine parameters (e.g., filtering coefficients, frequency, overhead) to use for filtering and may perform the filtering. In some examples, filtering the prediction signal may fuse different types of signals representing different modes (e.g., intra, inter, multi, split, skip, and auto). In some examples, intra-prediction signals may be different than all other types of inter-prediction signal(s) such that proper filtering may greatly enhance coding efficiency. In some examples, the filtering parameters may be encoded in bitstream 111 for use by a decoder. The filtered prediction signal may provide the second input (e.g., prediction partition(s)) to differencer 106, as discussed above, that may determine the prediction difference signal (e.g., partition prediction error) for coding discussed earlier. Further, the same filtered prediction signal may provide the second input to adder 115, also as discussed above. As discussed, output bitstream 111 may provide an efficiently encoded bitstream for use by a decoder for the presentment of video.

Figure 2:
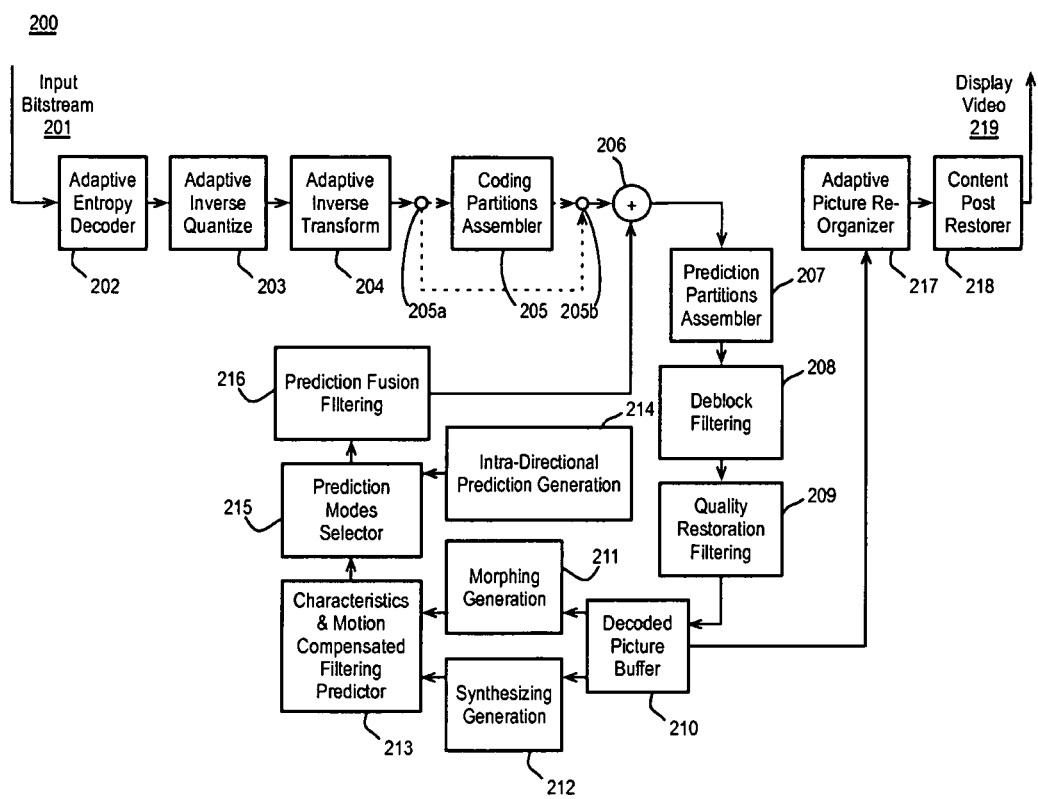
FIG. 2 is an illustrative diagram of an example next generation video decoder.

FIG. 2 is an illustrative diagram of an example next generation video decoder 200, arranged in accordance with at least some implementations of the present disclosure. As shown, decoder 200 may receive an input bitstream 201. In some examples, input bitstream 201 may be encoded via encoder 100 and/or via the encoding techniques discussed herein. As shown, input bitstream 201 may be received by an adaptive entropy decoder module 202. Adaptive entropy decoder module 202 may decode the various types of encoded data (e.g., overhead, motion vectors, transform coefficients, etc.). In some examples, adaptive entropy decoder 202 may use a variable length decoding technique. In some examples, adaptive entropy decoder 202 may perform the inverse operation(s) of adaptive entropy encoder module 110 discussed above.

The decoded data may be transmitted to adaptive inverse quantize module 203. Adaptive inverse quantize module 203 may be configured to inverse scan and de-scale quantized coefficients to determine transform coefficients. Such an adaptive quantize operation may be lossy, for example. In some examples, adaptive inverse quantize module 203 may be configured to perform the opposite operation of adaptive quantize module 109 (e.g., substantially the same operations as adaptive inverse quantize module 112). As shown, the transform coefficients (and, in some examples, transform data for use in a parametric transform) may be transmitted to an adaptive inverse transform module 204. Adaptive inverse transform module 204 may perform an inverse transform on the transform coefficients to generate residuals or residual values or partition prediction error data (or original data or wavelet data) associated with coding partitions. In some examples, adaptive inverse transform module 204 may be configured to perform the opposite operation of adaptive transform module 108 (e.g., substantially the same operations as adaptive inverse transform module 113). In some examples, adaptive inverse transform module 204 may perform an inverse transform based on other previously decoded data, such as, for example, decoded neighboring partitions. In some examples, adaptive inverse quantize module 203 and adaptive inverse transform module 204 may together be considered a transform decoder subsystem of decoder 200.

As shown, the residuals or residual values or partition prediction error data may be transmitted to coding partitions assembler 205. Coding partitions assembler 205 may assemble coding partitions into decoded prediction partitions as needed (as shown, in some examples, coding partitions assembler 205 may be skipped via switches 205a and 205b such that decoded prediction partitions may have been generated at adaptive inverse transform module 204). The decoded prediction partitions of prediction error data (e.g., prediction partition residuals) may be added to predicted partitions (e.g., prediction pixel data) at adder 206 to generate reconstructed prediction partitions. The reconstructed prediction partitions may be transmitted to prediction partitions assembler 207. Prediction partitions assembler 207 may assemble the reconstructed prediction partitions to generate reconstructed tiles or super-fragments. In some examples, coding partitions assembler module 205 and prediction partitions assembler module 207 may together be considered an un-partitioner subsystem of decoder 200.

The reconstructed tiles or super-fragments may be transmitted to deblock filtering module 208. Deblock filtering module 208 may deblock and dither the reconstructed tiles or super-fragments (or prediction partitions of tiles or super-fragments). The generated deblock and dither filter parameters may be determined from input bitstream 201, for example. The output of deblock filtering module 208 may be transmitted to a quality restoration filtering module 209. Quality restoration filtering module 209 may apply quality filtering based on QR parameters, which may be determined from input bitstream 201, for example. As shown in FIG. 2, the output of quality restoration filtering module 209 may be transmitted to decoded picture buffer 210. In some examples, the output of quality restoration filtering module 209 may be a final reconstructed frame that may be used for prediction for coding other frames (e.g., the final reconstructed frame may be a reference frame or the like). In some examples, deblock filtering module 208 and quality restoration filtering module 209 may together be considered a filtering subsystem of decoder 200.

As discussed, compensation due to prediction operations may include inter- and/or intra-prediction compensation. As shown, inter-prediction compensation may be performed by one or more modules including morphing generation module 211, synthesizing generation module 212, and characteristics and motion compensated filtering predictor module 213. Morphing generation module 211 may use de-quantized morphing parameters (e.g., determined from input bitstream 201) to generate morphed reference frames. Synthesizing generation module 212 may generate super resolution (SR) pictures and projected interpolation (PI) pictures or the like based on parameters determined from input bitstream 201. If inter-prediction is applied, characteristics and motion compensated filtering predictor module 213 may apply motion compensation based on the received frames and motion vector data or the like in input bitstream 201.

Intra-prediction compensation may be performed by intra-directional prediction generation module 214. Intra-directional prediction generation module 214 may be configured to perform spatial directional prediction and may use decoded neighboring partitions according to intra-prediction data in input bitstream 201.

As shown in FIG. 2, prediction modes selector module 215 may determine a prediction mode selection from among, "skip", "auto", "inter", "multi", and "intra", for each prediction partition of a tile, all of which may apply to P- and F/B-pictures, based on mode selection data in input bitstream 201. In addition to prediction modes, it also allows for selection of reference types that can be different depending on "inter" or "multi" mode, as well as for P- and F/B-pictures. The prediction signal at the output of prediction modes selector module 215 may be filtered by prediction fusion filtering module 216. Prediction fusion filtering module 216 may perform filtering based on parameters (e.g., filtering coefficients, frequency, overhead) determined via input bitstream 201. In some examples, filtering the prediction signal may fuse different types of signals representing different modes (e.g., intra, inter, multi, skip, and auto). In some examples, intra-prediction signals may be different than all other types of inter-prediction signal(s) such that proper filtering may greatly enhance coding efficiency. The filtered prediction signal may provide the second input (e.g., prediction partition(s)) to differencer 206, as discussed above.

As discussed, the output of quality restoration filtering module 209 may be a final reconstructed frame. Final reconstructed frames may be transmitted to an adaptive picture re-organizer 217, which may re-order or re-organize frames as needed based on ordering parameters in input bitstream 201. Re-ordered frames may be transmitted to content post-restorer module 218. Content post-restorer module 218 may be an optional module configured to perform further improvement of perceptual quality of the decoded video. The improvement processing may be performed in response to quality improvement parameters in input bitstream 201 or it may be performed as standalone operation. In some examples, content post-restorer module 218 may apply parameters to improve quality such as, for example, an estimation of film grain noise or residual blockiness reduction (e.g., even after the deblocking operations discussed with respect to deblock filtering module 208). As shown, decoder 200 may provide display video 219, which may be configured for display via a display device (not shown).

As discussed, in some examples, encoder 100 and/or decoder 200 may implement techniques related to content adaptive partitioning for prediction and coding for next generation video coding. In some examples, content adaptive partitioning for prediction may be performed by prediction partitions generator module 105 of encoder 100. In some examples, content adaptive partitioning for coding may be performed by coding partitions generator module 107 of encoder 100. In some examples, content adaptive partitioning for prediction for inter-prediction or the like may be performed by prediction partitions generator module 105 and content adaptive partitioning for coding for inter-prediction or the like may be performed by coding partitions generator module 107 of encoder 100. In some examples, content adaptive partitioning for prediction/coding (e.g., only one layer of partitioning) for intra-prediction may be performed by prediction partitions generator module 105 or coding partitions generator module 107 of encoder 100. Further, in some examples, based on encoded prediction partitioning and/or coding partitioning, coding partitions assembler module 114 of encoder 100 and/or coding partitions assembler module 205 of decoder 200 may assemble coding partitions to form prediction partitions. Also, in some examples, prediction partitions assembler 116 of encoder 100 and/or prediction partitions assembler 207 of decoder 200 may assemble reconstructed prediction partitions to form tiles, super-fragments, which may be assembled to generate frames or pictures. As discussed, the various prediction partitions, coding partitions, or tiles or super-fragments may be used for inter-prediction, intra-prediction, other coding efficiency enhancement, or image or video enhancements as discussed herein.

While FIGS. 1 and 2 illustrate particular encoding and decoding modules, various other coding modules or components not depicted may also be utilized in accordance with the present disclosure. Further, the present disclosure is not limited to the particular components illustrated in FIGS. 1 and 2 and/or to the manner in which the various components are arranged. Various components of the systems described herein may be implemented in software, firmware, and/or hardware and/or any combination thereof. For example, various components of encoder 100 and/or decoder 200 may be provided, at least in part, by hardware of a computing System-on-a-Chip (SoC) such as may be found in a computing system such as, for example, a mobile phone.

Further, it may be recognized that encoder 100 may be associated with and/or provided by a content provider system including, for example, a video content server system, and that output bitstream 111 may be transmitted or conveyed to decoders such as, for example, decoder 200 by various communications components and/or systems such as transceivers, antennae, network systems, and the like not depicted in FIGS. 1 and 2. It may also be recognized that decoder 200 may be associated with a client system such as a computing device (e.g., a desktop computer, laptop computer, tablet computer, convertible laptop, mobile phone, or the like) that is remote to encoder 100 and that receives input bitstream 201 via various communications components and/or systems such as transceivers, antennae, network systems, and the like not depicted in FIGS. 1 and 2. Therefore, in various implementations, encoder 100 and decoder subsystem 200 may be implemented either together or independent of one another.

Figure 3:
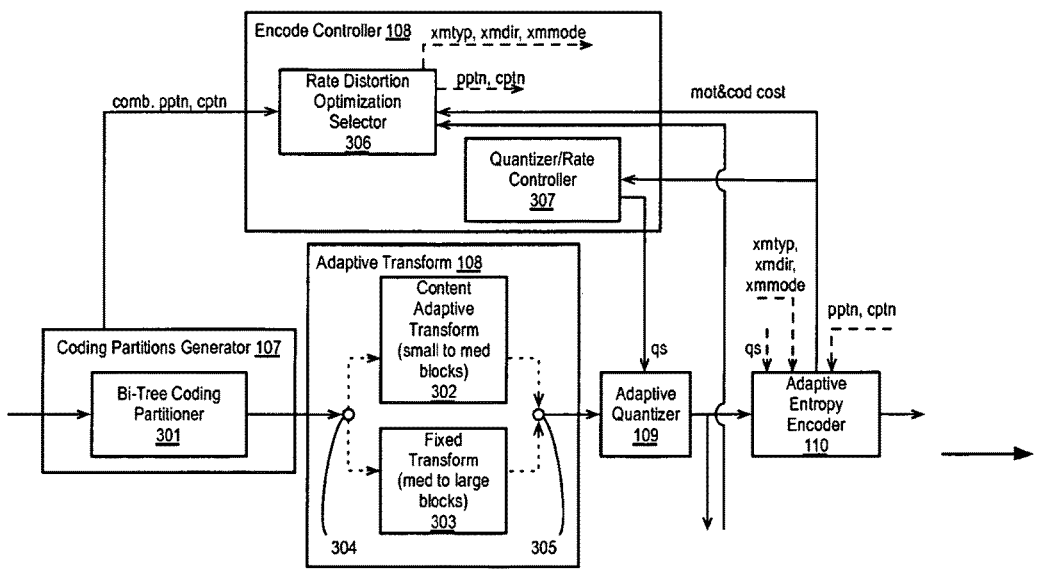
FIG. 3 is an illustrative diagram of an example encoder subsystem.

FIG. 3 is an illustrative diagram of an example encoder subsystem 300, arranged in accordance with at least some implementations of the present disclosure. As shown, encoder subsystem 300 may include coding partitions generator module 107, encode controller module 103, adaptive transform module 108, adaptive quantizer module 109, and/or adaptive entropy encoder module 110. Although not shown in FIG. 3, for the sake of clarity of presentation, video data may be input to coding partitions generator module 107 from differencer 106, partitions generator module 105, or the like. The video data received by coding partitions generator module 107 may be any suitable video data such as, for example, prediction error data partitions (e.g., error data of a prediction partition such as for inter-prediction).

For example, a tile of a video frame may be generated by partitioning the frame into a grid of squares or rectangles (either of equal or different sizes) or super-fragments may be formed by, for example, generating tiles from a video frame and generating frame layers (e.g., layers of substantially the same depth or other characteristic) from the video frame. Super-fragments may then be formed such that each super-fragment is an individual frame layer in an individual tile. For example, a tile with one frame layer would be a single super-fragment while a tile with two frame layers would be divided into two super-fragments, and so on. It is noted that tiles may typically be square or rectangular while super-fragments may be any shape (only constrained by granularity) and may be either contiguous or non-contiguous. The tile or super-fragments may be partitioned into potential prediction partitionings, which may be evaluated to determine a selected prediction partitioning (e.g., a pattern of prediction partitions). The prediction partitions associated with the selected prediction partitioning may be differenced with original pixel data to determine prediction error data partitions.

In some examples, the video data may be original prediction partition data or wavelet data. In some examples, the video data may be an intra original signal, an intra spatial prediction error signal, wavelet data, a wavelet intra LL band signal (e.g., an original wavelet), a wavelet prediction error signal, a intra wavelet higher band (e.g. HL, LH, or HH bands), a motion compensated prediction error (e.g., MCFD) signal, a wavelet inter LL band motion compensated prediction error signal, an inter wavelet higher band (e.g. HL, LH, or HH bands), residual data, or the like. The video data may provide or represent luma data or chroma data, for example. As shown, in example encoder subsystem 300, the video data may be received by a bi-tree coding partitioner module 301 of coding partitions generator module 107.

Bi-tree coding partitioner module 301 may partition the (for example) prediction partitions into multiple partitions using a bi-tree partitioning technique as is discussed further herein below with respect to FIG. 8. Bi-tree coding partitioner module 301 may provide for flexible partitioning that may allow for alternatively splitting into partitions in the horizontal and vertical directions. Such a technique may allow for cuts in either the horizontal or vertical direction, or in both directions, and may thereby allow for multiple, flexible partitions. As shown, coding partitions (or potential coding partitions) may be transmitted from bi-tree coding partitioner module 301 of coding partitions generator module 107 to adaptive transform module 108. In various examples, the coding partitions may be square or rectangular. Although illustrated with bi-tree coding partitioner module 301, in some examples, coding partitions generator module 107 may implement a k-d tree coding partitioner module that may partition the prediction partitions using a k-d tree partitioning technique.

As shown, in some examples, adaptive transform module 108 may include a content adaptive transform module 302 and a fixed transform module 303, which may be used selectively based on the operations of switches 304, 305. For example, a content adaptive transform may include a transform with content dependent basis functions that may be determined from decoding neighboring video data (e.g., neighboring blocks, partitions, or the like). A content adaptive transform may be contrasted with a fixed transform, which may have fixed basis functions, and in which only transform coefficients must be transmitted for decoding. As used herein, both content adaptive transforms and fixed transforms may use adaptive block sizes, may be discrete transforms, and may be two-dimensional separable transforms (e.g., transforms applied first in a horizontal or vertical direction and then applied in a complimentary direction).

In some examples, content adaptive transform module 302 may apply a content adaptive transform such as, for example, a parametric transform, a parametric Haar transform, a hybrid parametric Haar transform (e.g., a parametric Haar transform in one direction and a fixed transform in the orthogonal direction), a parametric slant transform, a hybrid parametric slant transform, or the like. In some examples, content adaptive transform module 302 may apply a closed-form hybrid parametric transform, a closed-form hybrid parametric Haar transform, a closed-form solution for a parametric transform, or a closed-form expression for a parametric transform, or the like. As discussed, a hybrid transform may be a separable 2D transform such that a fixed transform is performed in one direction and a parametric transform is performed in the orthogonal direction. As shown, in some examples, content adaptive transform module 302 may be applied to small to medium sized coding partitions or small to medium sized blocks of coding partitions. Herein, such coding partitions or transform blocks may have the same size such that for each size of coding partition, a transform having the same block size may be available. In some examples, if simplification to a smaller number of transforms is desired then either the allowed prediction partition sizes may likewise be reduced or further information on subdivision of coding partitions into sizes available for transform may be sent via encoder 100. For example, small to medium sized partitions or blocks may include partitions or blocks having a height of less than or equal to 16 pixels and a width less than or equal to 16 pixels. For example, small to medium sized partitions or blocks may include partitions or blocks having a size of 4×4 pixels, 4×8 pixels, 8×4 pixels, 8×8 pixels, 4×16 pixels, 16×4 pixels, 8×16 pixels, 16×8 pixels, 16×16 pixels, or the like.

In some examples, fixed transform module 303 may apply a fixed transform such as, for example, a discrete cosine transform, a discrete cosine transform approximator, or the like. As shown, in some examples, fixed transform module 303 may be applied to medium to large sized coding partitions or medium to large sized blocks of coding partitions. For example, medium to large sized coding partitions or blocks may include coding partitions or blocks having a height of greater than or equal to 16 pixels and a width greater than or equal to 16 pixels. For example, medium to large sized coding partitions or blocks may include a wide array of partitions having each side of at least 16 pixels (including square and rectangular partitions), including 16×16 pixels, 16×32 pixels, 32×16 pixels, 32×32 pixels, 32×64 pixels, 64×32 pixels, 64×64 pixels, and so on. In some examples, fixed transform module 303 may apply a discrete cosine transform using a high precision integer approximation or a high correlation integer transform. As discussed, in some examples, there may be overlap between the coding partitions provided to content adaptive transform module 302 and those provided to fixed transform module 303. In such examples, the coding partitions provided to both content adaptive transform module 302 and fixed transform module 303 may be evaluated to determine which transform to use. In other examples, there may be no overlap. For example, small to medium sized coding partitions may include coding partitions having a width less than 16 pixels and a height less than 16 pixels or the like, and medium to large sized coding partitions may include coding partitions having a width greater than 16 pixels and a height greater than 16 pixels or the like. In other examples, a heuristic technique may be implemented to determine which module medium size blocks are transmitted to for transform processing.

As discussed, switches 304, 305 may operate to select a transform module for coding partitions from coding partitions generator 107. In some examples, switches 304, 305 and/or coding partitions generator 107 may operate under the control of a rate distortion optimization selector module 306 of encode controller 103 or heuristic parameter implemented via encode controller 103. Rate distortion optimization selector module 306 may determine optimum choices for coding partitions and associated transform sizes that may result in optimum encoding based on providing small to medium coding partitions to content adaptive transform module 302 and medium to large coding partitions to fixed transform module 303 or the like. For example, some overhead (e.g., additional encoded bits) may be associated with a content adaptive transform such as transform data, which may be needed by a decoder to construct adaptive basis functions or the like. However, such overhead may be reduced by transmitting essential information, such as, for example, a set of indicators including transform type (e.g., xmtyp; e.g., whether the transform for a partition is adaptive or discrete), transform direction (e.g., xmdir; describing whether the parametric transform is horizontal or vertical in hybrid transforms), and/or transform mode (e.g., xmmode; used only for intra coding signals between mode choices of using a prediction difference signal or an original signal). As shown in FIG. 3, such indicators or flags or data or the like may be provided to adaptive entropy encoder module 110 for encoding in a bitstream such as output bitstream 111. As shown, encode controller module 108 may also include a quantizer/rate controller 307, which may control a quantizer rate of adaptive quantizer module 109, such as a quantizer (Qp) value.

Figure 4:
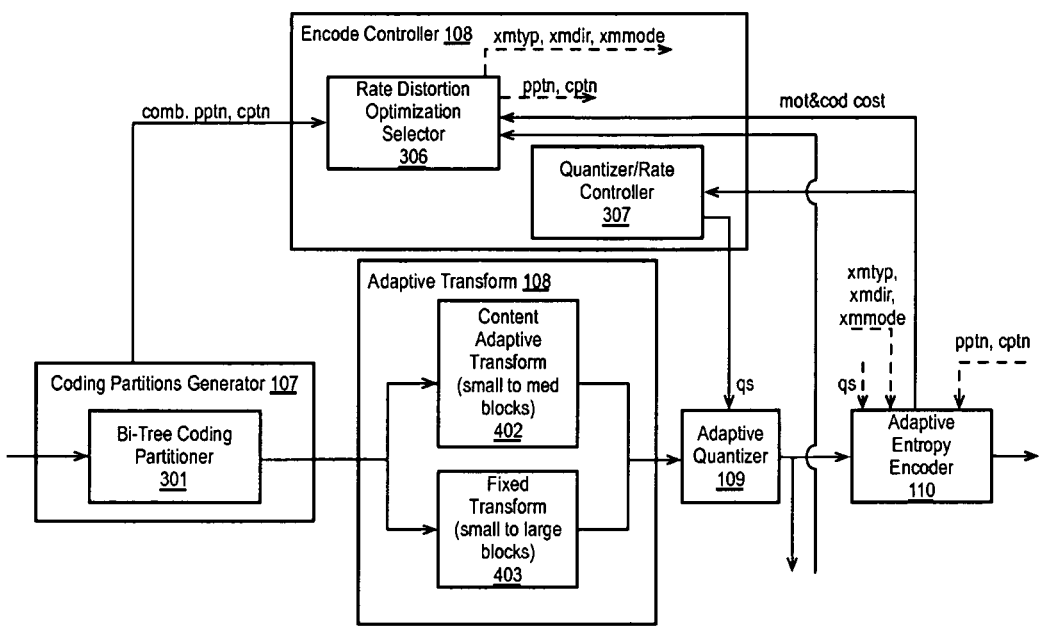
FIG. 4 is an illustrative diagram of an example encoder subsystem.

FIG. 4 is an illustrative diagram of an example encoder subsystem 400, arranged in accordance with at least some implementations of the present disclosure. As shown, encoder subsystem 400 may include coding partitions generator module 107, encode controller module 103, adaptive transform module 108, adaptive quantizer module 109, and/or adaptive entropy encoder module 110. Although not shown in FIG. 4 for the sake of clarity of presentation, video data may be input to coding partitions generator module 107 from differencer 106, prediction partitions generator module 105, or the like. As discussed, the video data received by coding partitions generator module 107 may be any suitable video data such as prediction error data partitions (e.g., error data of a prediction partition such as for inter-prediction), and the video data may be received by a bi-tree coding partitioner module 301 of coding partitions generator module 107. As discussed, bi-tree coding partitioner module 301 may partition the video data into multiple partitions using a bi-tree partitioning technique. Also as discussed, although illustrated with bi-tree coding partitioner module 301, in some examples, coding partitions generator module 107 may implement a k-d tree coding partitioner module that may partition the prediction partitions using a k-d tree partitioning technique.

As shown, in some examples, adaptive transform module 108 may include a content adaptive transform module 402 and a fixed transform module 403. Content adaptive transform module 402 may apply a transform with content dependent basis functions that may be determined from decoding neighboring video data as discussed herein. In some examples, content adaptive transform module 402 may apply an adaptive transform such as, for example, a parametric transform, a parametric Haar transform, a hybrid parametric Haar transform (e.g., a parametric Haar transform in one direction and a fixed transform in the orthogonal direction), a parametric slant transform, a hybrid parametric slant transform, or the like. In some examples, adaptive transform module 402 may apply a closed-form hybrid parametric transform or a closed-form hybrid parametric Haar transform. As shown, in some examples, content adaptive transform module 402 may be applied to small to medium sized coding partitions or blocks. For example, small to medium sized coding partitions or blocks may include coding partitions or blocks having a height of less than or equal to 16 pixels and a width less than or equal to 16 pixels. For example, small to medium sized partitions may include partitions having a size of 4×4 pixels, 4×8 pixels, 8×4 pixels, 8×8 pixels, 4×16 pixels, 16×4 pixels, 8×16 pixels, 16×8 pixels, 16×16 pixels, or the like.

In some examples, fixed transform module 403 may apply a fixed transform such as, for example, a discrete cosine transform, a discrete cosine transform approximator, or the like. As shown, in some examples, fixed transform module 403 may be applied to small to large sized coding partitions or blocks. In some examples, fixed transform module 403 may be applied to all partitions and/or blocks thereof. For example, medium to large sized coding partitions or blocks may include coding partitions or blocks having a height of greater than or equal to 16 pixels and a width greater than or equal to 16 pixels. For example, medium to large sized coding partitions or blocks may include wide array of coding partitions or blocks having each side of at least 16 pixels including square and rectangular partitions including 16×16 pixels, 16×32 pixels, 32×16 pixels, 32×32 pixels, 32×64 pixels, 64×32 pixels, 64×64 pixels, and so on. In some examples, fixed transform module 403 may apply a discrete cosine transform using a high precision integer approximation. As discussed, in some examples, there may be overlap between the partitions provided to content adaptive transform module 402 and those provided to fixed transform module 403.

For partitions provided to both content adaptive transform module 402 and fixed transform module 403 (e.g., small to medium sized coding partitions or blocks), a decision may be made as to which transform module result to use based on a trade-off analysis via rate distortion optimization selector module 306. For example, a coding partition and a coding transform may be determined, which may be ultimately encoded via transform coefficients and overhead data (e.g., indicators as discussed herein for transform type, adaptive transform direction, and/or a transform mode). For medium to large size coding partitions, there may be substantially no change in performance with respect to encoder subsystem 300 since a fixed transform may still be applied to such coding partitions or blocks. Encoder subsystem 400 may provide the ability to make optimal decisions from a coding efficiency/bit savings perspective with respect to small to medium sized coding partitions or blocks at the cost of additional computations and decision overhead.

As discussed, some overhead data may be provided from an encoder to a decoder using the techniques discussed herein. For example, a set of indicators including transform type (e.g., xmtyp; e.g., whether the transform for a coding partition or block is content adaptive or fixed), transform direction (e.g., xmdir; describing whether the parametric transform is horizontal or vertical in hybrid content adaptive transforms), and/or transform mode (e.g., xmmode; used only for intra coding signals between mode choices of using a prediction difference signal or an original signal) may be provided. As shown in FIG. 4, such indicators or flags or data or the like may be provided to adaptive entropy encoder module 110 for encoding in a bitstream such as output bitstream 111. As compared with encoder subsystem 300 of FIG. 3, such overhead data may be similar or the same in content but may be provided more frequently in the implementation of encoder subsystem 400.

Figure 5:
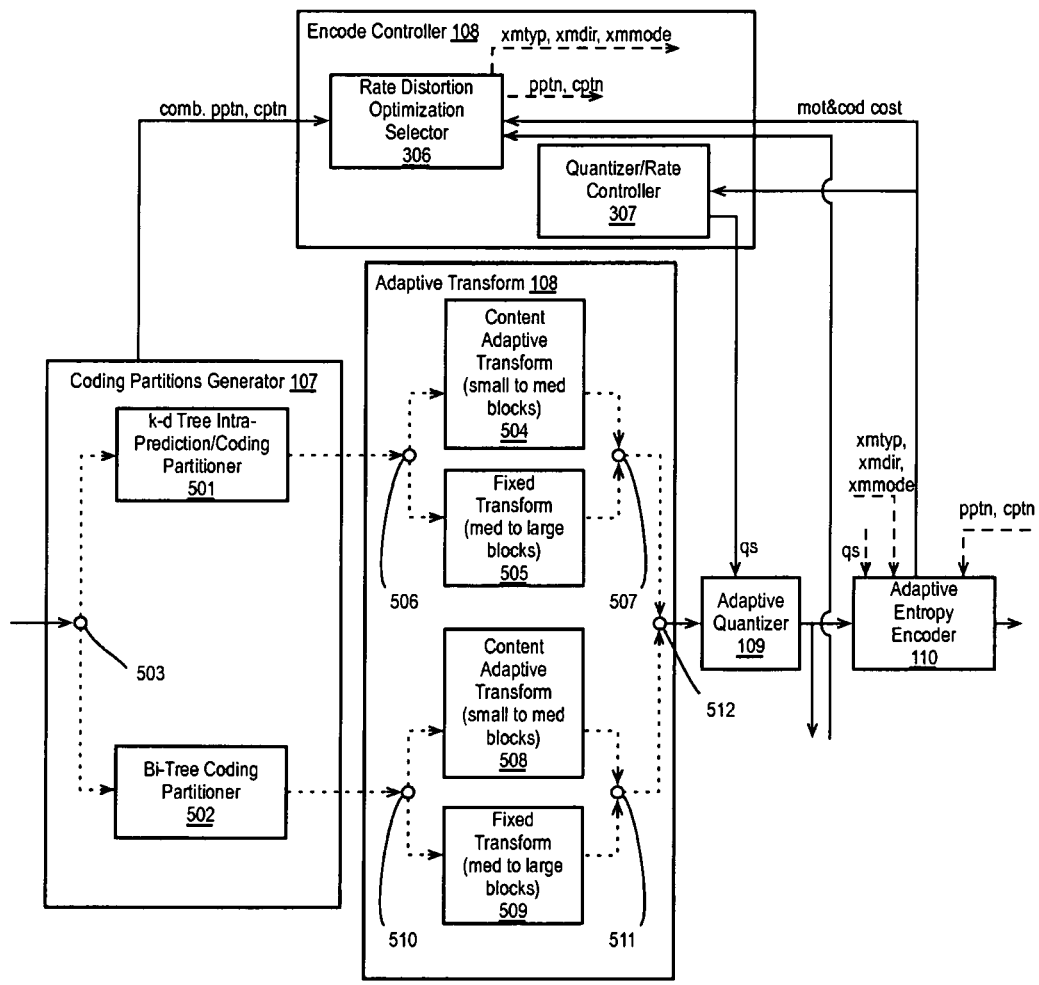
FIG. 5 is an illustrative diagram of an example encoder subsystem.

FIG. 5 is an illustrative diagram of an example encoder subsystem 500, arranged in accordance with at least some implementations of the present disclosure. As shown, encoder subsystem 500 may include coding partitions generator module 107, encode controller module 108, adaptive transform module 108, adaptive quantizer module 109, and/or adaptive entropy encoder module 110. Although not shown in FIG. 5, for the sake of clarity of presentation, video data may be input to coding partitions generator module 107 from differencer 106, prediction partitions generator module 105, or the like. The video data received by coding partitions generator module 107 may be any suitable video data such as, for example, prediction error data partitions, prediction partitions, tiles or super-fragments, original pixel data, wavelet data, residual data, or any other video data as discussed herein. The video data may provide or represent luma data or chroma data, for example. As shown, in example encoder subsystem 500, the video data may be received by coding partitions generator module 107.

As shown, coding partitions generator module 107 may include a k-d tree intra-prediction/coding partitioner module 501 and a bi-tree coding partitioner module 502. Under the control of switch 503, received video data may be transmitted to either k-d tree intra-prediction/coding partitioner module 501 or bi-tree coding partitioner module 502. For example, switch 503 may route the video data based on a picture type of the video data and/or a prediction type associated with the video data. For example, when the picture type is an F/B-picture or a P-picture and the prediction type is inter-prediction or the like, the video data may include prediction error data partitions (e.g., error data or residuals for prediction partitions) and switch 503 may route the video data to bi-tree coding partitioner module 502 for partitioning into coding partitions. For example, when the picture type is an F/B-picture or a P-picture and the prediction type is intra-prediction, the video data may include tiles or super-fragments video and switch 503 may route the video data to bi-tree coding partitioner module 502 for partitioning into partitions that may be labeled as prediction partitions or coding partitions (since only one level of partitioning may be performed). As discussed, in such examples, the partitioning may be performed by bi-tree coding partitioner module 502 or prediction partitions generator module 105. When the picture type is an I-picture (e.g., which may be coded entirely using intra-prediction) the video data may include tiles or super-fragments and switch 503 may route the video data to k-d tree coding partitioner module 501 for partitioning into partitions that may be labeled as prediction partitions or coding partitions (since only one level of partitioning may be performed). As discussed, in such examples, the partitioning maybe performed by k-d tree coding partitioner module 501 or prediction partitions generator module 105.

Although illustrated with bi-tree coding partitioner module 502, in some examples, coding partitions generator module 107 may implement a k-d tree coding partitioner module in place of module 501 that may partition the prediction partitions using a k-d tree partitioning technique. Similarly, although illustrated with k-d tree intra-prediction/coding partitioner module 501, in some examples, coding partitions generator module 107 may implement a bi-tree coding partitioner module in place of module 502 that may partition the prediction partitions using a bi-tree partitioning technique.

As discussed, in some examples, such as in I-picture intra-coding, only one layer of partitioning may be applied, which may be labeled either as prediction partitioning or coding partitioning. In some examples, coding partitions generator 107 may therefore receive I-picture tiles or super-fragments or frames for partitioning using a k-d tree partitioning technique via k-d tree intra-prediction/coding partitioner module 501. In other examples, I-pictures may have previously been partitioned via prediction partitions generator 105, and no further partitioning may be required. In such examples, k-d tree intra-prediction/coding partitioner module 501 may be bypassed. In either case, the I-picture partitions (labeled as prediction partitions or coding partitions) may be transmitted to adaptive transform module 108.

Also as discussed, in some examples, in P- or F/B-picture intra-coding, only one layer of partitioning may be applied, which may be labeled either as prediction partitioning or coding partitioning. In some examples, coding partitions generator 107 may therefore receive P- or F/B-picture tiles or super-fragments or frames for partitioning using a bi-tree partitioning technique via bi-tree coding partitioner module 502 (in such instances bi-tree coding partitioner module 501 may be considered a bi-tree prediction/coding partitioner module). In other examples, P- or F/B-pictures may have previously been partitioned via prediction partitions generator 105, and no further partitioning may be required. In such examples bi-tree coding partitioner module 502 may be bypassed. In either case, the P- or F/B-picture partitions (labeled as prediction partitions or coding partitions) may be transmitted to adaptive transform module 108.

In some examples, for each intra prediction partition a prediction direction (e.g., 1 out of 9 or 31 prediction directions) may be associated with the intra prediction partition such that using a past decoded causal area, pixels of previous neighboring tiles and/or neighboring partitions in the same tile of current frame, intra prediction may be made for each prediction partition.

Bi-tree coding partitioner module 502 may partition the video data into multiple partitions using a bi-tree partitioning technique as is discussed further herein below with respect to FIG. 8. Bi-tree coding partitioner module 502 may provide for flexible partitioning that may allow for alternatively splitting into partitions in the horizontal and vertical directions. Such a technique may allow for cuts in either the horizontal or vertical direction, or in both directions, and may thereby allow for multiple, flexible partitions. K-d tree intra-prediction/coding partitioner module 501 may partition the video data into multiple partitions using a k-d tree partitioning technique as is discussed further herein below with respect to FIG. 9. For example, k-d tree intra-prediction/coding partitioner module 501 may provide for even greater flexibility in partitioning that may allow for alternatively splitting into partitions in the horizontal and vertical directions at both the midpoint of a partition and at ¼ and ¾ points along a partition. Such increases may cause increased overhead and computing, which may be justified for I-pictures, for example. As shown, partitions or subpartitions (e.g., coding partitions of previously defined partitions for prediction) may be transmitted from coding partitions generator module 107 to adaptive transform module 108.

Taking first the example of k-d tree partitions (e.g., for I-pictures), partitions (e.g., either prediction or coding) may be transmitted to adaptive transform module 108 from either k-d tree intra-prediction/coding partitioner module 501 or prediction partitions generator module 105. For example, a tile or super-fragment may be partitioned using a k-d tree partitioning technique to generate partitionings (e.g., partitions for prediction). Intra-prediction may be performed for the partitions for prediction to generate prediction partitions, which may be differenced with original pixel data to generate prediction error data partitions. As discussed, a selected partitioning may be determined based on a rate distortion optimization or the like. The prediction error data partitions (and/or prediction partitions) associated with the selected partitioning may be transmitted to adaptive transform module 108. As discussed, such prediction partitions may be alternatively be labeled as coding partitions since only a single level of partitioning may be performed.

As shown, adaptive transform module 108 may include a content adaptive transform module 504 and a fixed transform module 505, which may be operated selectively based on the operation of switches 506, 507. For example, a content adaptive transform may include a transform with content dependent basis functions that may be determined from decoding neighboring video data (e.g., neighboring blocks, partitions, or the like) or a transform with associated transform data that must be transmitted from an encoder (e.g., via a bitstream) to a decoder for decoding, and a fixed transform may include a fixed transform having fixed basis functions and in which only transform coefficients must be transmitted for decoding, as discussed above.

In some examples, content adaptive transform module 504 may apply an adaptive transform such as, for example, a parametric transform, a parametric Haar transform, a hybrid parametric Haar transform (e.g., a parametric Haar transform in one direction and a fixed transform in the orthogonal direction), a parametric slant transform, a hybrid parametric slant transform, or the like. In some examples, adaptive transform module 504 may apply a closed-form hybrid parametric transform or a closed-form hybrid parametric Haar transform. As shown, in some examples content adaptive transform module 504 may be applied to small to medium sized partitions. For example, small to medium sized partitions may include partitions or blocks having a height of less than or equal to 16 pixels and a width less than or equal to 16 pixels. For example, small to medium sized partitions or blocks may include partitions having a size of 4×4 pixels, 4×8 pixels, 8×4 pixels, 8×8 pixels, 4×16 pixels, 16×4 pixels, 8×16 pixels, 16×8 pixels, 16×16 pixels, or the like.

In some examples, fixed transform module 505 may apply a fixed transform such as, for example, a discrete cosine transform, a discrete cosine transform approximator, or the like. As shown, in some examples, fixed transform module 505 may be applied to medium to large sized partitions or blocks. For example, medium to large sized partitions or blocks may include partitions having a height of greater than or equal to 16 pixels and a width greater than or equal to 16 pixels. For example, medium to large sized partitions or blocks may include a wide array of partitions having each side of at least 16 pixels (including square and rectangular partitions), including 16×16 pixels, 16×32 pixels, 32×16 pixels, 32×32 pixels, 32×64 pixels, 64×32 pixels, 64×64 pixels, and so on. In some examples, fixed transform module 505 may apply a discrete cosine transform using a high precision integer approximation. As discussed, in some examples, there may be overlap between the partitions provided to content adaptive transform module 504 and those provided to fixed transform module 505. In such examples, the partitions provided to both content adaptive transform module 504 and fixed transform module 505 may be evaluated to determine which transform to use. In other examples, there may be no overlap. For example, small to medium sized partitions or blocks may include partitions or blocks having a width less than 16 pixels and a height less than 16 pixels or the like, and medium to large sized pixels may include partitions having a width greater than 16 pixels and a height greater than 16 pixels or the like. In other examples, a heuristic technique may be used to determine when module medium size blocks are transmitted to for transform processing.

As discussed, switches 506, 507 may operate to select a transform module for k-d tree partitions (e.g., partitions of I-pictures). In some examples, switches 506, 507 and/or coding partitions generator 107 may operate under the control of a rate distortion optimization selector module 306 of encode controller 103 as discussed above, which may provide indicators including transform type (e.g., xmtyp; e.g., whether the transform for a partition is adaptive or discrete), transform direction (e.g., xmdir; describing whether the parametric transform is horizontal or vertical in hybrid transforms), and/or transform mode (e.g., xmmode; used only for intra coding signals between mode choices of using a prediction difference signal or an original signal) to adaptive transform module 108.

Turning now to the example of bi-tree partitions, coding partitions (e.g., coding partitions for F/B- and P-pictures) may be transmitted to adaptive transform module 108, which, as shown, may include a content adaptive transform module 508 and a fixed transform module 509, which may be operated selectively based on the operation of switches 510, 511. Content adaptive transform module 508, fixed transform module 509, and switches 510, 511 may operate similarly to content adaptive transform module 504, fixed transform module 505, and switches 506, 507, and the operations will not be repeated for the sake of brevity. As shown, content adaptive transform module 108 may also include switch 512, which may be operated in conjunction with switch 503 to select the proper route for various video data (e.g., video data partitions related to I-pictures or F/B- and P-pictures) as discussed above.

In encoder subsystem 500 of FIG. 5, in some examples, such as hybrid parametric Haar transforms, the content adaptive transform may only be performed for partitions having a power of 2. In such examples, constraints may be imposed via k-d tree intra-prediction/coding partitioner module 501 such that partitions may only be powers of 2 to accommodate the available transform. In some examples, if small to medium partitions may not be kept at sizes that are powers of 2, a fixed transform (e.g., a discrete cosine transform or the like) may be used for such partitions without the need for additional signaling overhead.

Figure 6:
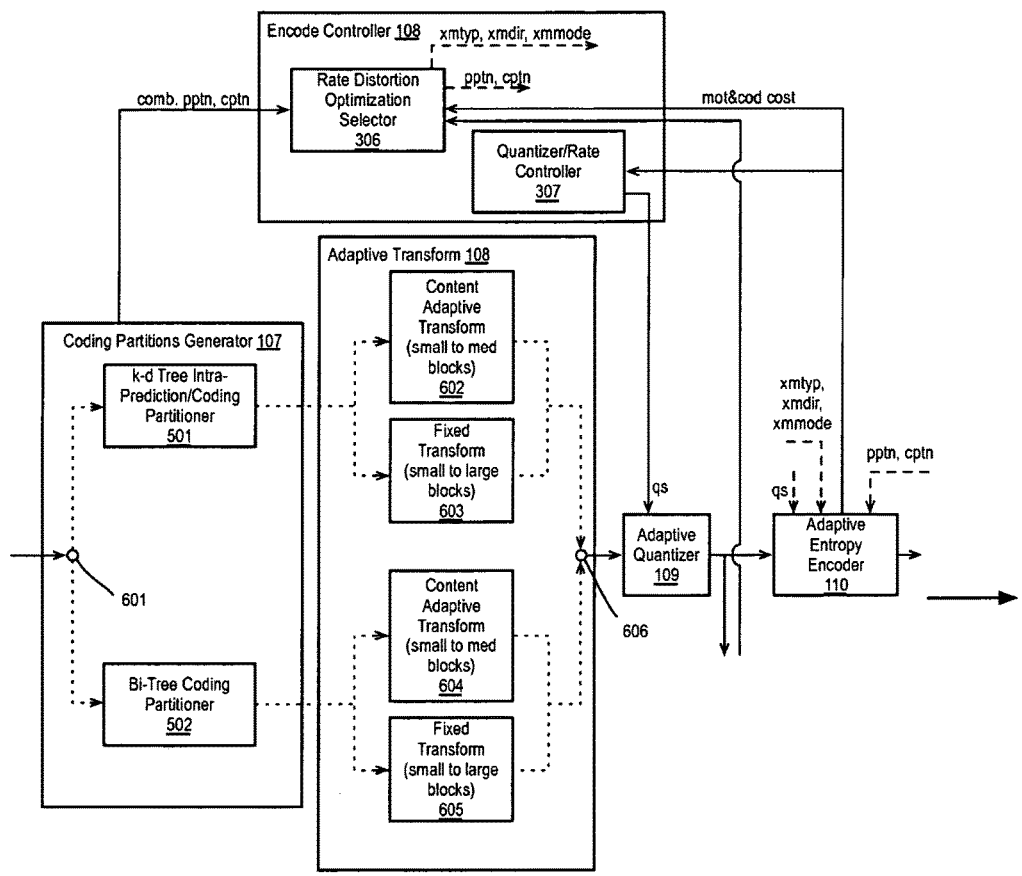
FIG. 6 is an illustrative diagram of an example encoder subsystem.

FIG. 6 is an illustrative diagram of an example encoder subsystem 600, arranged in accordance with at least some implementations of the present disclosure. As shown, encoder subsystem 600 may include coding partitions generator module 107, encode controller module 103, adaptive transform module 108, adaptive quantizer module 109, and/or adaptive entropy encoder module 110. Although not shown in FIG. 6 for the sake of clarity of presentation, video data may be input to coding partitions generator module 107 from differencer 106, prediction partitions generator module 105, or the like. The video data received by coding partitions generator module 107 may be any suitable video data such as, for example, prediction error data partitions, prediction partitions, tiles or super-fragments, original pixel data, wavelet data, residual data, or any other video data as discussed herein. The video data may provide or represent luma data or chroma data, for example. As shown, in example encoder subsystem 500, the video data may be received by coding partitions generator module 107.

As shown, coding partitions generator module 107 may include k-d tree intra-prediction/coding partitioner module 501 and bi-tree coding partitioner module 502, as discussed above with respect to FIG. 5, operated under the control of switch 601. Under the control of switch 601, received video data may be transmitted to either k-d tree intra-prediction/coding partitioner module 501 or bi-tree coding partitioner module 502. For example, switch 601 may route the video data based on a picture type of the video data and/or a prediction type associated with the video data. For example, when the picture type is an F/B-picture or a P-picture and the prediction type is inter-prediction or the like, the video data may include prediction error data partitions (e.g., error data or residuals for prediction partitions) and switch 601 may route the video data to bi-tree coding partitioner module 502 for partitioning into coding partitions. For example, when the picture type is an F/B-picture or a P-picture and the prediction type is intra-prediction, the video data may include tiles or super-fragments video and switch 601 may route the video data to bi-tree coding partitioner module 502 for partitioning into partitions that may be labeled as prediction partitions or coding partitions (since only one level of partitioning may be performed). As discussed, in such examples, the partitioning may be performed by bi-tree coding partitioner module 502 or prediction partitions generator module 105. When the picture type is an I-picture (e.g., which may be coded entirely using intra-prediction) the video data may include tiles or super-fragments and switch 503 may route the video data to k-d tree coding partitioner module 501 for partitioning into partitions that may be labeled as prediction partitions or coding partitions (since only one level of partitioning may be performed). As discussed, in such examples, the partitioning maybe performed by k-d tree coding partitioner module 501 or prediction partitions generator module 105.

As discussed, although illustrated with bi-tree coding partitioner module 502, in some examples, coding partitions generator module 107 may implement a k-d tree coding partitioner module in place of module 501 that may partition the prediction partitions using a k-d tree partitioning technique. Similarly, although illustrated with k-d tree intra-prediction/coding partitioner module 501, in some examples, coding partitions generator module 107 may implement a bi-tree coding partitioner module in place of module 502 that may partition the prediction partitions using a bi-tree partitioning technique.

As discussed, in some examples, such as in I-picture intra-coding, only one layer of partitioning may be applied, which may be labeled either as prediction partitioning or coding partitioning. In some examples, coding partitions generator 107 may therefore receive I-picture tiles or super-fragments or frames for partitioning using a k-d tree partitioning technique via k-d tree intra-prediction/coding partitioner module 501. In other examples, I-pictures may have previously been partitioned via prediction partitions generator 105, and no further partitioning may be required. In such examples, k-d tree intra-prediction/coding partitioner module 501 may be bypassed. In either case, the I-picture partitions (labeled as prediction partitions or coding partitions) may be transmitted to adaptive transform module 108.

Also as discussed, in some examples, in P- or F/B-picture intra-coding, only one layer of partitioning may be applied, which may be labeled either as prediction partitioning or coding partitioning. In some examples, coding partitions generator 107 may therefore receive P- or F/B-picture tiles or super-fragments or frames for partitioning using a bi-tree partitioning technique via bi-tree coding partitioner module 502 (in such instances bi-tree coding partitioner module 501 may be considered a bi-tree prediction/coding partitioner module). In other examples, P- or F/B-pictures may have previously been partitioned via prediction partitions generator 105, and no further partitioning may be required. In such examples bi-tree coding partitioner module 502 may be bypassed. In either case, the P- or F/B-picture partitions (labeled as prediction partitions or coding partitions) may be transmitted to adaptive transform module 108.

Bi-tree coding partitioner module 502 may partition the video data into multiple partitions using a bi-tree partitioning technique as is discussed further herein below with respect to FIG. 8. K-d tree intra-prediction/coding partitioner module 501 may partition the video data into multiple partitions using a k-d tree partitioning technique as is discussed further herein below with respect to FIG. 9. Bi-tree coding partitioner module 502 may partition prediction error data partitions (for example) into multiple coding partitions using a bi-tree partitioning technique and k-d tree intra-prediction/coding partitioner module 501 may partition the video data (e.g., I-picture tiles or super-fragments) into multiple partitions using a k-d tree partitioning technique, as discussed herein. As shown in FIG. 6, coding partitions or, in the case of I-pictures, coding partitions or prediction partitions (as labeled) may be transmitted from coding partitions generator module 107 to adaptive transform module 108.

Taking first the example of k-d tree partitions, partitions (e.g., for I-pictures) may be transmitted to a content adaptive transform module 602 and a fixed transform module 603 of adaptive transform module 108. For example, a tile or super-fragment may be partitioned using a k-d tree partitioning technique to generate partitionings (e.g., partitions for prediction). Intra-prediction may be performed for the partitions for prediction to generate prediction partitions, which may be differenced with original pixel data to generate prediction error data partitions. As discussed, a selected partitioning may be determined based on a rate distortion optimization or the like. The prediction error data partitions (and/or prediction partitions) associated with the selected partitioning may be transmitted to adaptive transform module 108. As discussed, such prediction partitions may be alternatively be labeled as coding partitions since only a single level of partitioning may be performed.

As shown, adaptive transform module 108 may include content adaptive transform module 602 and fixed transform module 603. For example, a content adaptive transform may include a transform with content dependent basis functions that may be determined from decoding neighboring video data (e.g., neighboring blocks or partitions or the like) or a transform with associated transform data that must be transmitted from an encoder (e.g., via a bitstream) to a decoder for decoding, and a fixed transform may include a transform having fixed basis functions and in which only transform coefficients must be transmitted for decoding, as discussed above.

In some examples, content adaptive transform module 602 may apply an adaptive transform such as, for example, a parametric transform, a parametric Haar transform, a hybrid parametric Haar transform (e.g., a parametric Haar transform in one direction and a fixed transform in the orthogonal direction), a parametric slant transform, a hybrid parametric slant transform, or the like. In some examples, adaptive transform module 602 may apply a closed-form hybrid parametric transform or a closed-form hybrid parametric Haar transform. As shown, in some examples content adaptive transform module 602 may be applied to small to medium sized partitions or blocks. For example, small to medium sized partitions or blocks may include partitions or blocks having a height of less than or equal to 16 pixels and a width less than or equal to 16 pixels. For example, small to medium sized partitions or blocks may include partitions or blocks having a size of 4×4 pixels, 4×8 pixels, 8×4 pixels, 8×8 pixels, 4×16 pixels, 16×4 pixels, 8×16 pixels, 16×8 pixels, 16×16 pixels, or the like.

In some examples, fixed transform module 603 may apply a fixed transform such as, for example, a discrete cosine transform, a discrete cosine transform approximator, or the like. As shown, in some examples, fixed transform module 603 may be applied to medium to large sized partitions or blocks. For example, medium to large sized partitions or blocks may include partitions or blocks having a height of greater than or equal to 16 pixels and a width greater than or equal to 16 pixels. For example, medium to large sized partitions or blocks may include wide array of partitions or blocks having each side of at least 16 pixels (including square and rectangular partitions), including 16×16 pixels, 16×32 pixels, 32×16 pixels, 32×32 pixels, 32×64 pixels, 64×32 pixels, 64×64 pixels, and so on. In some examples, fixed transform module 603 may apply a discrete cosine transform using a high precision integer approximation.

Turning now to the example of bi-tree partitions, coding partitions (e.g., coding partitions for F/B- and P-pictures) may be transmitted to an adaptive transform module 604 and a fixed transform module 605 of adaptive transform module 108. Adaptive transform module 604 and fixed transform module 605 may operate similarly to adaptive transform module 602 and fixed transform module 604, and the operations will not be repeated for the sake of brevity. As shown, adaptive transform module 108 may also include switch 606, which may be operated in conjunction with switch 601 to select the proper route for various video data.

For partitions provided to both content adaptive transform module 602 and fixed transform module 603 or to both content adaptive transform module 604 and fixed transform module 605 (e.g., small to medium sized partitions), a decision may be made as to which transform module result to use based on a trade-off analysis via rate distortion optimization selector module 306. For medium to large size partitions, there is substantially no change in performance with respect to encoder subsystem 500 since a fixed transform may still be applied to such partitions. Encoder subsystem 600 may provide the ability to make optimal decisions from a coding efficiency/bits savings perspective with respect to small to medium sized partitions at the cost of additional computations and decision overhead. Such overhead may be encoded as a set of indicators including transform type (e.g., xmtyp; e.g., whether the transform for a partition is adaptive or discrete), transform direction (e.g., xmdir; describing whether the parametric transform is horizontal or vertical in hybrid transforms), and/or transform mode (e.g., xmmode; used only for intra coding signals between mode choices of using a prediction difference signal or an original signal). As shown in FIG. 6, such indicators or flags or data or the like may be provided to adaptive entropy encoder module 110 for encoding in a bitstream such as output bitstream 111.

As discussed with respect to FIGS. 3-6, various partitions (e.g., coding partitions of F/B- or P-pictures for inter-prediction or prediction/coding partitions of I-, F/B-, or P-pictures for intra-prediction) may be transform coded. In such examples, data associated with the partitions (e.g., data describing the size or location or the like of the partitions) may also be provided via a bitstream such as output bitstream 111 or the like.

Further, as discussed, the concepts of small, medium, and large partitions have been discussed in various contexts (e.g., picture types and/or luma or chroma). The following tables illustrate example block sizes and associated transform types in some implementations.

For example, Table 1 illustrates example partition or block sizes for content adaptive transforms such as a hybrid parametric Haar transform (e.g., small to medium sized prediction/coding partitions) for intra-coding (e.g., for I-pictures) of luma (e.g., for k-d tree partitions).

TABLE 1

Example Partitions for Content Adaptive Transforms for Intra-Coding of Luma

| No. | Partition Sizes |
| --- | --- |
| 0 | 4 × 4 |
| 1 | 4 × 8 |
| 2 | 4 × 16 |
| 3 | 8 × 4 |
| 4 | 16 × 4 |
| 5 | 8 × 8 |
| 6 | 8 × 16 |
| 7 | 16 × 8 |
| 8 | 16 × 16 |

For example, Table 2 illustrates example partitions for content adaptive transforms such as a hybrid parametric Haar transform (e.g., small to medium sized prediction/coding partitions) for intra-coding (e.g., for I-pictures) of chroma (e.g., for k-d tree partitions).

TABLE 2

Example Partitions for Content Adaptive Transforms for Intra-Coding of Chroma

| No. | Partition Sizes |
| --- | --- |
| 0 | 2 × 2 |
| 1 | 2 × 4 |
| 2 | 2 × 8 |
| 3 | 4 × 2 |
| 4 | 8 × 2 |
| 5 | 4 × 4 |
| 6 | 4 × 8 |
| 7 | 8 × 4 |
| 8 | 8 × 8 |

For example, Table 3 illustrates example partitions for content adaptive transforms such as a hybrid parametric Haar transform (e.g., small to medium sized coding partitions) for inter-coding (e.g., for F/B- and P-pictures) of luma (e.g., for bi-tree partitions).

TABLE 3

Example Partitions for Content Adaptive Transforms for Inter-Coding of Luma

| No. | Partition Sizes |
|---|---|
| 0 | 4 × 4 |
| 1 | 8 × 8 |
| 2 | 16 × 16 |

For example, Table 4 illustrates example partitions for content adaptive transforms such as a hybrid parametric Haar transform (e.g., small to medium sized coding partitions) for inter-coding (e.g., for F/B- and P-pictures) of chroma (e.g., for bi-tree partitions).

TABLE 4

Example Partitions for Content Adaptive Transforms for Inter-Coding of Chroma

| No. | Partition Sizes |
|---|---|
| 0 | 2 × 2 |
| 1 | 4 × 4 |
| 2 | 8 × 8 |

For example, for fixed transforms such as a discrete cosine transform (e.g., all coding partitions) for intra-coding (e.g., for I-pictures using k-d tree partitions) and for inter-coding (e.g., for F/B- and P-pictures using bi-tree partitions), all combinations of sizes having a factor of 4 from 4×4 to 64×64 may have an applicable transform. Similarly, for fixed transforms or luma, all combinations of sizes having a factor of 2 from 2×2 to 32×32 may have an applicable transform.

Figure 7:
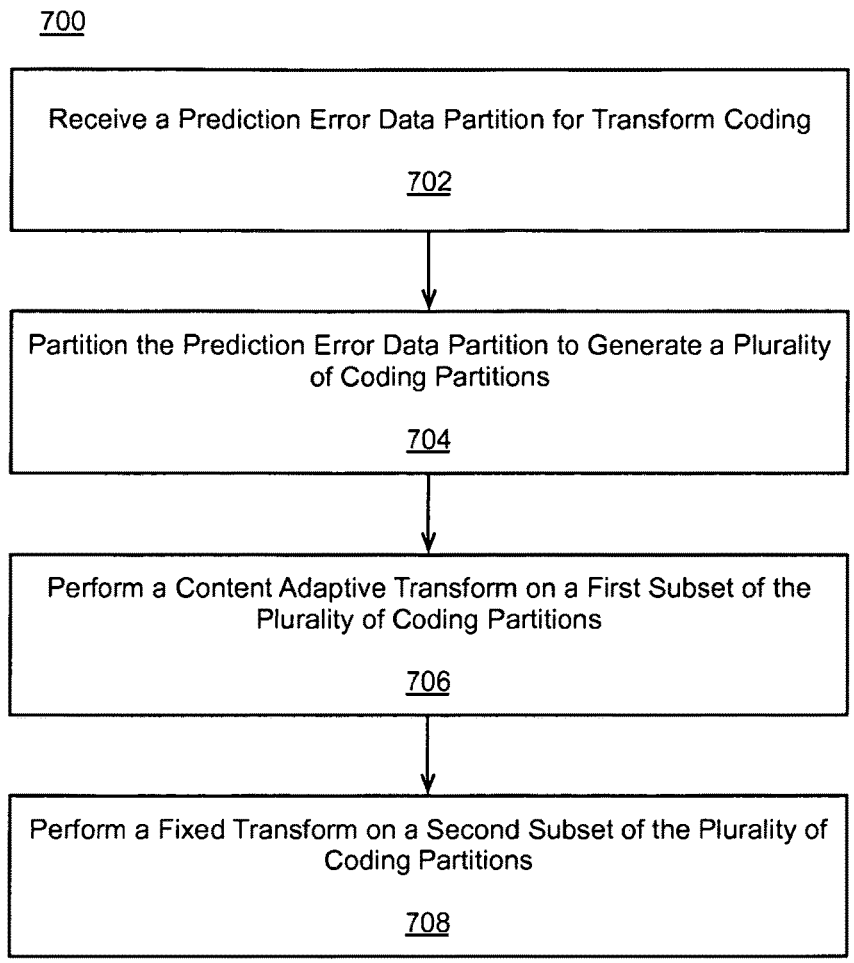
FIG. 7 is a flow diagram illustrating an example process.

FIG. 7 is a flow diagram illustrating an example process 700, arranged in accordance with at least some implementations of the present disclosure. Process 700 may include one or more operations, functions or actions as illustrated by one or more of operations 702, 704, 706, and/or 708. Process 700 may form at least part of a next generation video coding process. By way of non-limiting example, process 700 may form at least part of a next generation video encoding process as undertaken by encoder system 100 of FIG. 1 and/or any of encoder subsystems 300, 400, 500, and/or 600 of FIGS. 3-6.

Process 700 may begin at operation 702, "Receive a Prediction Error Data Partition for Transform Coding", where a prediction error data partition may be received for transform coding. For example, a prediction error data partition or partitions may be received by coding partitions generator module 107 or the like.

Process 700 may continue at operation 704, "Partition the Prediction Error Data Partition to Generate a Plurality of Coding Partitions", where the prediction error data partition may be partitioned to generate a plurality of coding partitions. For example, the video data may be partitioned by a bi-tree coding partitioner module or a k-d tree coding partitioner module of coding partitions generator module 107 as discussed herein. In some examples, video data associated with an F/B- or P-picture may be partitioned by a bi-tree coding partitioner module. In some examples, video data associated with an I-picture may be partitioned by a k-d tree coding partitioner module. In some examples, the video data partitioned by the k-d tree coding partitioner module may include a tile or super-fragment or the like of an I-picture. In some examples, a coding partitioner module may be chosen or selected via a switch or switches.

Process 700 may continue at operation 706, "Perform a Content Adaptive Transform on a First Subset of the Plurality of Coding Partitions", where a content adaptive transform may be performed on a first subset of the plurality of coding partitions. For example, a content adaptive transform may be performed on a subset of the plurality of coding partitions including the small to medium sized coding partitions as discussed herein. In some examples, a content adaptive transform may be performed on a subset of the plurality of partitions including the small to medium sized coding partitions under the control of a switch. In some examples, the content adaptive transform may be a closed-form hybrid parametric transform.

Process 700 may continue at operation 708, "Perform a Fixed Transform on a Second Subset of the Plurality of Coding Partitions", where a fixed transform may be performed on a second subset of the plurality of coding partitions. In some examples, a fixed transform may be performed on a subset of the plurality of coding partitions including the medium to large sized coding partitions as discussed herein. In some examples, a fixed transform may be performed on a subset of the plurality of coding partitions including the medium to large sized coding partitions under the control of a switch. In some examples, a fixed transform may be performed on a subset of the plurality of coding partitions including the small to large sized coding partitions or substantially all of the coding partitions. In such examples, for those coding partitions that are transformed using both a content adaptive transform and a fixed transform, either may be chosen based on a bit cost analysis, a performance optimization, a rate distortion optimization, or the like.

Process 700 may be implemented via any of encoder subsystems 300, 400, 500, or 600 as discussed herein. Further, process 700 may be repeated either in serial or in parallel on any number of instantiations of video data such as prediction error data partitions, original data partitions, or wavelet data or the like (e.g., at operation 702, process 700 may receive original data or wavelet data for processing in analogy to the described prediction error data partition). In some examples, operation 704 may include only bi-tree partitioning (e.g., as shown with respect to encoder subsystems 300 and 400). In other examples, operation 704 may include bi-tree partitioning or k-d tree partitioning based on a picture type of the object video data (e.g., as shown with respect to encoder subsystems 500 and 600). Similarly, in some examples, operations 706 and 708 may be performed on the same coding partition and the optimum transform may be used to code the video data. In some examples, operations 706 and 708 may be performed on different partitions based on partition size or the like as discussed herein. Further, as discussed elsewhere herein, transform coefficients determined based on operations 706 and 708, along with overhead bits (e.g., indicators and the like) may be scanned, quantized, and encoded in a bitstream for transmission to one or more decoders, for example.

As discussed, video data may be partitioned in various implementations. Also as discussed, the video data may be prediction partitions of tiles or super-fragments of a video frame. In some examples, using tiles may offer the advantages of simplicity while super-fragments may be more complex but may offer the advantage of enhanced inter- or intra-prediction or image enhancement. In either case, the video data may be partitioned as discussed herein using, for example, bi-tree or k-d tree partitioning techniques.

Figure 8:
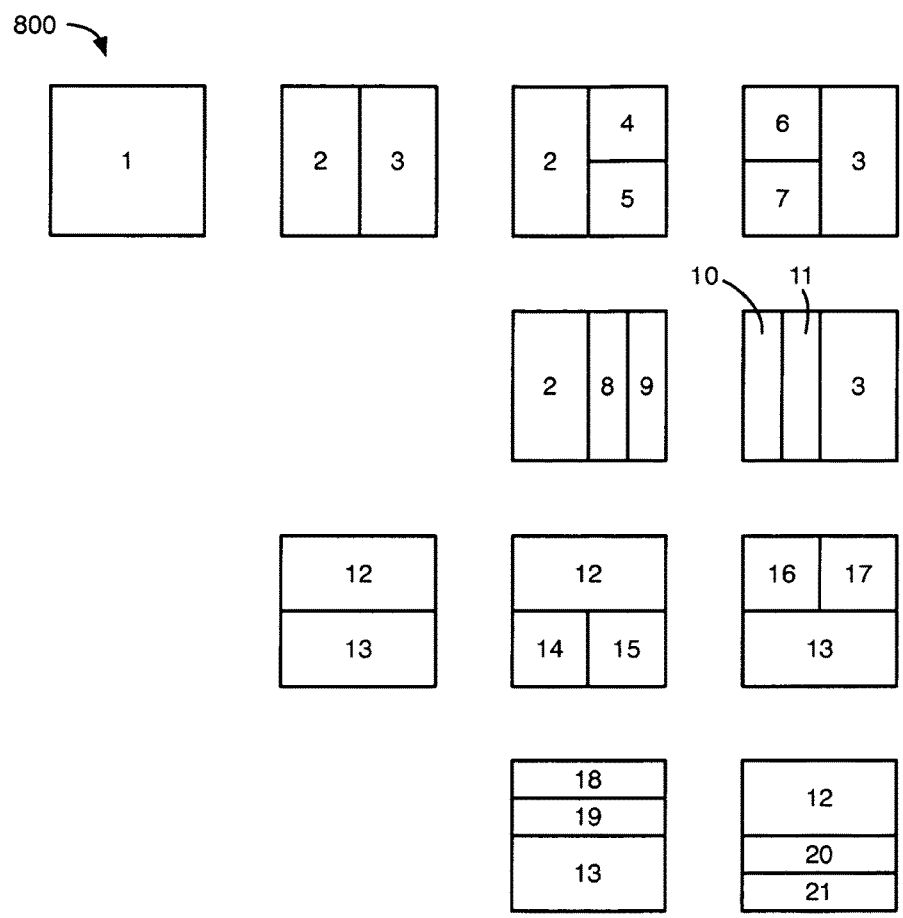
FIG. 8 illustrates example partitioning of video data using a bi-tree partitioning technique.

FIG. 8 illustrates example partitioning of video data 800 using a bi-tree partitioning technique, arranged in accordance with at least some implementations of the present disclosure. As shown, in some examples, video data 800 may include a square shape. As discussed, in various examples, video data 800 may include any suitable shape. Further, video data 800 may include a prediction partition, a tile, or a super-fragment or the like as discussed herein. As discussed, in some examples, bi-tree partitioning may be applied in the context of F/B- or P-pictures to a prediction error data partitions to generate coding partitions.

As shown in FIG. 8, bi-tree partitioning may include a progression of partitioning. Beginning with video data 800, a partition 1 may be defined as video data 800 itself. Partition 1 may be vertically partitioned into two partitions 2, 3. Each of partitions 2, 3, may be further partitioned, this time vertically into partitions 4, 5 (e.g., partitions of partition 3) and partitions 6, 7 (e.g., partitions of partition 2). The second row (from the top) of FIG. 8 illustrates further vertical partitioning of partition 3 into partitions 8, 9 and further vertical partitioning of partition 2 into partitions 10, 11. The third row (from the top) of FIG. 8 illustrates horizontal partitioning (e.g., instead of the vertical partitioning of the first row (from the top)) to generate partitions 12, 13 from partition 1. The third row (from the top) of FIG. 8 also illustrates further vertical partitioning of partitions 12, 13 to generate partitions 14, 15 (e.g., partitions of partition 13) and partitions 16, 17 (e.g., from partitions of partition 12). The fourth or bottom row illustrates further horizontal partitioning of partition 12 to generate partitions 18, 19 and of partition 13 to generate partitions 20, 21. As illustrated, bi-tree partitioning may be used recursively, one dimension at a time (e.g., horizontally and vertically) to subdivide or partition each partition into two equal partitions until the smallest partition size may be reached. Bi-tree partitioning may partition a frame portion into a wide number of combinations and may provide for a smooth progression of partitions.

Figure 9:
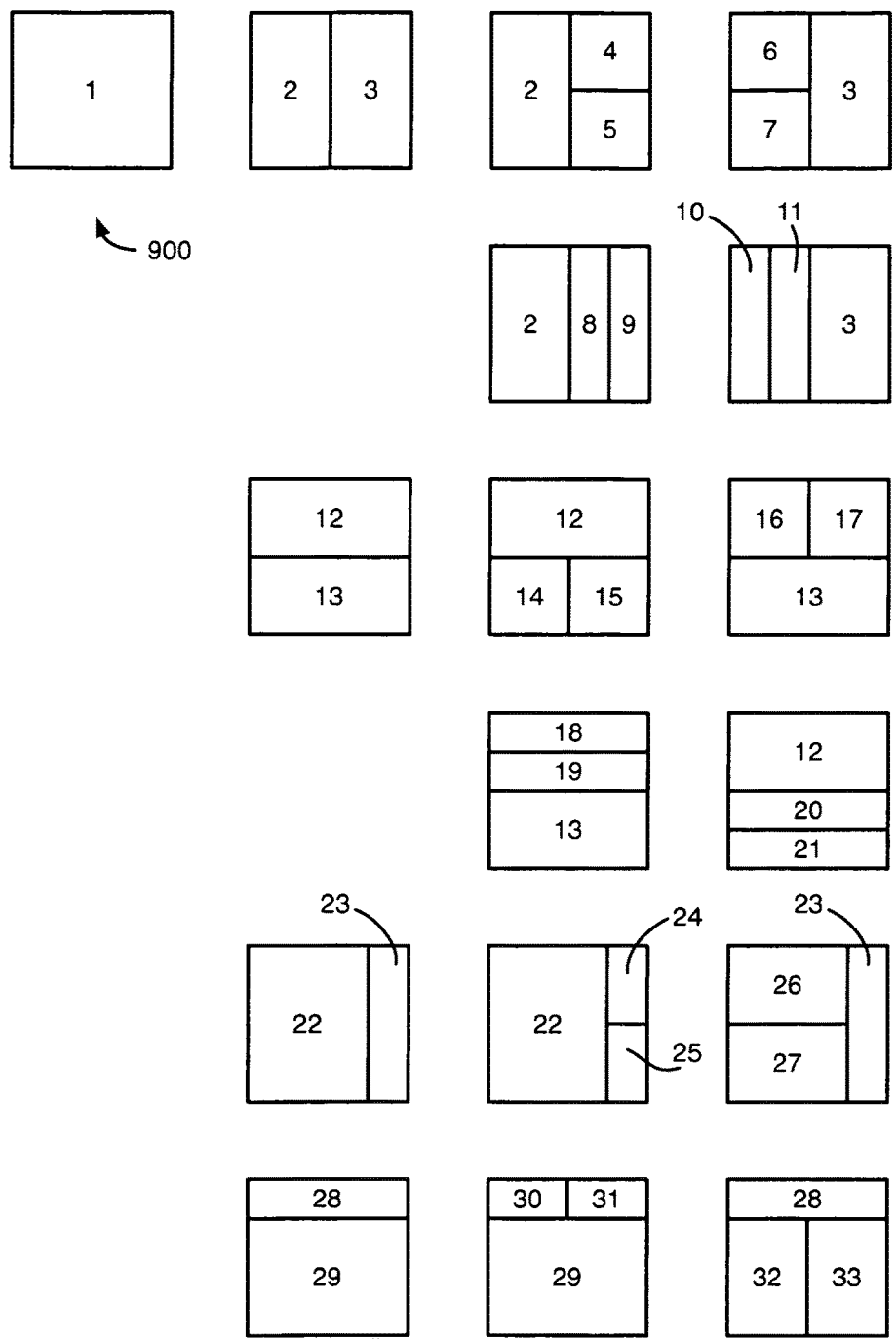
FIG. 9 illustrates example partitioning of video data using a k-d tree partitioning technique.

FIG. 9 illustrates example partitioning of video data 900 using a k-d tree partitioning technique, arranged in accordance with at least some implementations of the present disclosure. As shown, in some examples, video data 900 may include a square shape. As discussed, in various examples, video data 900 may include any suitable shape. Further, video data 900 may include a prediction partition, a tile, or a super-fragment or the like as discussed herein. As discussed, in some examples, k-d tree partitioning may be applied in the context of I-pictures to tiles or super-fragments to generate a single level of partitioning that may be labeled as a prediction partition or a coding partition and may be implemented via either prediction partitions generator module 105 or coding partitions generator module 107.

As shown in FIG. 9, k-d tree partitioning may include a progression of partitioning. Further, as illustrated, k-d tree partitioning may be a superset of bi-tree partitioning such that rows 1-4 of FIG. 9 (beginning from the top of FIG. 9) may match rows 1-4 of FIG. 8. In some examples, the process of k-d tree partitioning illustrated in FIG. 9 may divide video data 900 iteratively into four rectangular partitions in a particular dimension (e.g., vertical or horizontal). Beginning with frame portion 900, a partition 1 may be defined as frame portion 900 itself. Partition 1 may be vertically partitioned into two partitions 2, 3. Each of partitions 2, 3, may be further partitioned, this time vertically into partitions 4, 5 (e.g., partitions of partition 3) and partitions 6, 7 (e.g., partitions of partition 2). The second row (from the top) of FIG. 9 illustrates further vertical partitioning of partition 3 into partitions 8, 9 and further vertical partitioning of partition 2 into partitions 10, 11. The third row (from the top) of FIG. 9 illustrates horizontal partitioning (e.g., instead of the vertical partitioning of the first row (from the top)) to generate partitions 12, 13 from partition 1. The third row (from the top) of FIG. 9 also illustrates further vertical partitioning of partitions 12, 13 to generate partitions 14, 15 (e.g., partitions of partition 13) and partitions 16, 17 (e.g., from partitions of partition 12). The fourth row (from the top) illustrates further horizontal partitioning of partition 12 to generate partitions 18, 19 and of partition 13 to generate partitions 20, 21.

As discussed, through the fourth row, k-d tree partitioning may substantially match bi-tree partitioning. As illustrated at the fifth row (from the top) of FIG. 9, video data 900 may be partitioned into ¼ and ¾ size partitions vertically to generate partitions 22, 23. Further, partition 23 may be partitioned in half vertically to generate partitions 24, 25 and partition 22 may be partitioned in half vertically to form partitions 26, 27. As illustrated at the sixth or bottom row of FIG. 9, video data 900 may be partitioned into ¼ and ¾ size partitions horizontally to generate partitions 28, 29. Further, partition 28 may be partitioned in half horizontally to generate partitions 30, 31 and partition 29 may be partitioned in half horizontally to form partitions 32, 33. Such a partitioning process may be repeated recursively, alternating dimensions (e.g., horizontal and vertical) to subdivided or partition each partition into 2 equal parts (halves) and 2 unequal parts (e.g., at a ratio of 1:3) until the smallest partition size may be reached. K-d tree partitioning may partition a frame portion into a wide number of combinations not only at a midpoint of the partitions and sub-partitions (and so on) but also with further accuracy on each access. In the illustrated example, one-quarter accuracy is used. In other examples, any accuracy may be used such as one-third, one fifth, or the like may be used.

As discussed with respect to FIGS. 8 and 9, video data may be partitioned into a wide range of partitions. The partitions may each be indexed with an index value and transmitted to encode controller 103 (please refer to FIG. 1). The indexed and transmitted partitions may include hundreds of partitions, for example, applied via various partitionings (e.g., a partitioning or partitioning scheme may include a pattern of partitions). One or more partitions (of a selected partitioning for example) may be used as discussed with respect to FIG. 1 for transform coding. Data associated with the transform coding (e.g., transform coefficients and transform data if needed) and data defining the utilized partitions may be encoded in a bitstream, for example, as is discussed further herein below.

In some examples, the wide range of partitioning options may be limited or constrained. Such a constraint may be applied in either bi-tree or k-d tree partitioning examples. For example, partitioning the video data may include pre-defining a first partition as halving the video data in a first dimension (e.g., horizontal or vertical) and pre-defining a second partition as halving the result in a second dimension (e.g., the opposite of the first halving). Further partitions may be made only after such initial constrained partitioning, for example, such that other optional partitions based on the initial video data will no longer be available. Such constraints may provide for beginning with 64×64 pixel video data and dividing the video data into 32×32 size sub-portions and then partitioning each sub-portion by k-d tree or bi-tree partitioning, which may limit the number of partitions.

As discussed, the partitions may be used for transform coding. The partitions may be defined (e.g., their shape and/or location may be defined) for use by the encoder and/or decoder. In some examples, an individual partition may be defined using symbol-run coding based on pixel blocks. In other examples, an individual partition may be defined using a code book.

Figure 18B:
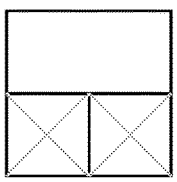

FIGS. 18A and 18B illustrate an example bi-tree partitioning codebook of entries with fragment size of 32×32 pixels for use in defining a partition of a tile or a super-fragment, arranged in accordance with at least some implementations of the present disclosure. For example, FIGS. 18A and 18B illustrate a Table 5 as shown. In Table 5 as illustrated in FIGS. 18A and 18B, the large X's represent nonterminating partitions.

Figure 19B:
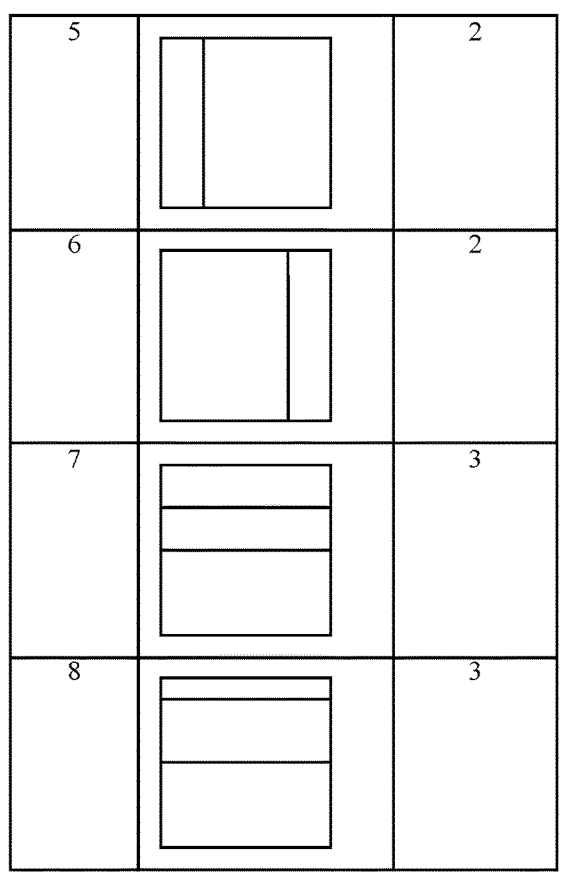
Figure 19C:
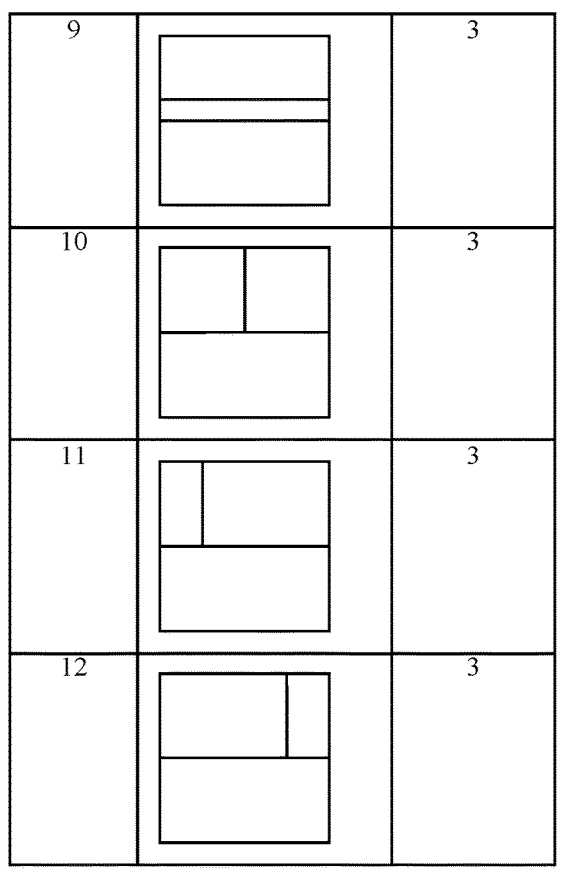

FIGS. 19A, 19B, and 19C illustrate an example k-d tree partitioning codebook of entries with fragment size of 32×32 pixels for use in defining a partition, arranged in accordance with at least some implementations of the present disclosure. For example, FIGS. 19A, 19B, and 19C illustrate a Table 6 as shown.

Table 5 as illustrated in FIGS. 18A and 18B and Table 6 as illustrated in FIGS. 19A, 19B, and 19C only show example codebook entries. A full codebook of entries may provide a full or substantially full listing of all possible entries and coding thereof. In some examples, the codebook may take into account constraints as described above. In some examples, data associated with a codebook entry for a partition (prediction or coding) may be encoded in a bitstream for use at a decoder as discussed herein.

As discussed, in various implementations, a content adaptive transform may be applied to coding partitions for transform coding. Further, transform coefficients and, if needed, transform data (e.g., data needed to reconstruct a transform; which may be reduced to transform type, direction, and/or mode in some examples) may be entropy encoded and transmitted to a decoder for decoding.

Also as discussed, prediction error data partitions may be partitioned to generate coding partitions. Further, the coding partitions may be characterized or defined using symbol-run coding or a codebook or the like. The coding partitions may be transform encoded using content adaptive or fixed transform in various examples to generate transform coefficients. Also as discussed, data associated with the described partitions (e.g., the transform coefficients or quantized transform coefficients), overhead data (e.g., indicators as discussed herein for transform type, adaptive transform direction, and/or a transform mode), and/or data characterizing the partitions and so on may be encoded (e.g., via an entropy encoder) into a bitstream. The bitstream may be communicated to a decoder, which may use the encoded bitstream to decode video frames for display.

FIG. 10 illustrates an example bitstream 1400, arranged in accordance with at least some implementations of the present disclosure. In some examples, bitstream 1400 may correspond to output bitstream 111 as shown in FIG. 1 and/or input bitstream 201 as shown in FIG. 2. Although not shown in FIG. 10 for the sake of clarity of presentation, in some examples bitstream 1400 may include a header portion and a data portion. In various examples, bitstream 1400 may include data, indicators, index values, mode selection data, or the like associated with encoding a video frame as discussed herein. As shown, in some examples, bitstream 1400 may include first coding partition defining data 1410, first coding partition transform coefficient data 1420, first coding partition indicators 1430, second coding partition defining data 1440, second coding partition transform coef-ficient data 1450, and/or second coding partition indicators 1460. The illustrated data may be in any order in bitstream 1400 and may be adjacent or separated by any other of a variety of additional data for coding video.

For example, first coding partition defining data 1410 and/or second coding partition defining data 1440 may include data associated with coding partitions defined via coding partitions generator 107. For example, first coding partition defining data 1410 and/or second coding partition defining data 1440 may include data associated with defining bi-tree partitions or k-d tree partitions using a symbol-run coding or codebook technique or the like. For example, first coding partition defining data 1410 and second coding partition defining data 1440 may be associated with a first partition and a second partition, respectively. Bitstream 1400 may include coding partition defining data for any number of partitions.

Further, first coding partition transform coefficient data 1420 and/or second coding partition transform coefficient data 1450 may include transform coefficients determined via any content adaptive or fixed forward transforms as discussed herein. In some examples, the transform coefficients may be quantized transform coefficients. In some examples, the transform coefficients may be quantized and scanned. For example, first coding partition transform coefficient data 1410 and second coding partition transform coefficient data 1440 may be associated with a first coding partition and a second coding partition. Bitstream 1400 may include coding partition transform coefficient data for any number of partitions, respectively. In some examples, transform coefficients may be described as data associated with a coding partition. First coding partition indicators 1430 and/or second coding partition indicators 1440 may include bits, flags or other data including overhead bits such as one or more indicators for transform type, adaptive transform direction, block size data indicating transform block sizes of partitions, frame reference(s), morphing parameters, or synthesizing parameters associated with the prediction error data and/or a transform mode as discussed herein.

As discussed, bitstream 1400 may be generated by an encoder such as, for example, encoder 100 and/or received by a decoder 200 for decoding such that decoded video frames may be presented via a display device.

FIG. 11 is a flow diagram illustrating an example process 1500, arranged in accordance with at least some implementations of the present disclosure. Process 1500 may include one or more operations, functions or actions as illustrated by one or more of operations 1502, 1504, 1506, 1508, 1510, 1512, and/or 1514. Process 1500 may form at least part of a next generation video coding process. By way of non-limiting example, process 1500 may form at least part of a next generation video decoding process as undertaken by decoder system 200 of FIG. 2.

Process 1500 may begin at operation 1502, "Receive Encoded Bitstream", where a bitstream may be received. For example, a bitstream encoded as discussed herein may be received at a video decoder. In some examples, bitstream 1500 may be received via decoder 200.

Process 1500 may continue at operation 1504, "Decode the Entropy Encoded Bitstream to Determine Coding Partition Indicator(s), Block Size Data, Transform Type Data, Quantizer (Qp), and Quantized Transform Coefficients", where the bitstream may be decoded to determine coding partition indicators, block size data, transform type data, quantizer (Qp), and quantized transform coefficients. For example, the decoded data may include data associated with a coding partition (e.g., transform coefficients) and one or more indicators associated with the coding partition. For example, the transform coefficients may be for a fixed transform or a content adaptive transform as discussed herein. The transform type data may indicate a transform type for the coding partition, a parametric transform direction (e.g., for hybrid parametric transforms as discussed herein), and/or a transform mode (e.g., xmmode; used only for intra coding signals between mode choices of using a prediction difference signal or an original signal). In some examples, the decoding may be performed by adaptive entropy decoder module 202. In some examples, determining the transform coefficients may also involve an inverse quantization operation. In some examples, the inverse quantization operation may be performed by adaptive inverse quantize module 203.

Process 1500 may continue at operation 1506, "Apply Quantizer (Qp) on Quantized Coefficients to Generate Inverse Quantized Transform Coefficients", where quantizer (Qp) may be applied to quantized transform coefficients to generate inverse quantized transform coefficients. For example, operation 1506 may be applied via adaptive inverse quantize module 203.

Process 1500 may continue at operation 1508, "On each Decoded Block of Coefficients in a Coding (or Intra Predicted) Partition Perform Inverse Transform based on Transform Type and Block Size Data to Generate Decoded Prediction Error Partitions", where, on each decode block of transform coefficients in a coding (or intra predicted) partition, an inverse transform based on the transform type and block size data may be performed to generate decoded prediction error partitions. In some examples, the inverse transform may include an inverse fixed transform. In some examples, the inverse transform may include an inverse content adaptive transform. In such examples, performing the inverse content adaptive transform may include determining basis functions associated with the inverse content adaptive transform based on a neighboring block of decoded video data, as discussed herein. Any forward transform used for encoding as discussed herein may be used for decoding using an associated inverse transform. In some examples, the inverse transform may be performed by adaptive inverse transform module 204. In some examples, generating the decoded prediction error partitions may also include assembling coding partitions via coding partitions assembler 205.

Process 1500 may continue at operation 1510, "Add a Prediction Partition to the Decoded Prediction Error Data Partition to Generate a Reconstructed Partition", where a prediction partition my be added to the decoded prediction error data partition to generate a reconstructed prediction partition. For example, the decoded prediction error data partition may be added to the associated prediction partition via adder 206.

Process 1500 may continue at operation 1512, "Assemble Reconstructed Partitions to Generate a Tile or Super-Fragment", where the reconstructed prediction partitions may be assembled to generate tiles or super-fragments. For example, the reconstructed prediction partitions may be assembled to generate tiles or super-fragments via prediction partitions assembler module 207.

Process 1500 may continue at operation 1514, "Assemble Tiles or Super-Fragments of a Picture to Generate a Full Decoded Picture", where the tiles or super-fragments of a picture may be assembled to generate a full decoded picture. For example, after optional deblock filtering and/or quality restoration filtering, tiles or super-fragments may be assembled to generate a full decoded picture, which may be stored via decoded picture buffer 210 and/or transmitted for presentment via a display device after processing via adaptive picture re-organizer module 217 and content post-restorer module 218.

Is some examples, the content adaptive transforms implemented using the techniques discussed herein may be parametric transforms including a family of transforms such as the parametric Haar transform, the parametric slant transform, and the like. Such transforms may be content adaptive and may be constructed at encoder 100 and decoder 200 from local and/or global previously decoded video data. Such parametric content adaptive transforms may improve overall video compression efficiency via the efficiency gains in the transform coding subsystems as discussed herein. For example, the content adaptive transforms may include a closed form solution for the parametric Haar transform, a fast implementation of the closed form solution, and a coding solution that may use a hybrid parametric Haar transform (e.g., for coding using a content adaptive transform) or a discrete cosine transform (e.g., for coding using a fixed transform).

The content adaptive transforms discussed herein may use content adaptive orthonormal transforms of multiple sizes that may allow adaptation to the characteristics of the content in the video data. As discussed herein, in such content adaptive transforms, the basis matrix (e.g., matrix of basis functions) may be determined at both encoder 100 and decoder 200 based on causal decoded neighborhood data (e.g., previously decoded neighboring video data) relevant to the video data or partition being transform coded. In some examples, the content adaptive transform may include a parametric transform in only one direction (e.g., horizontal or vertical) and a fixed transform in the orthogonal direction to reduce decoder complexity.

As discussed, in some examples, the techniques described herein may be applied to wavelet data.

Figure 12:
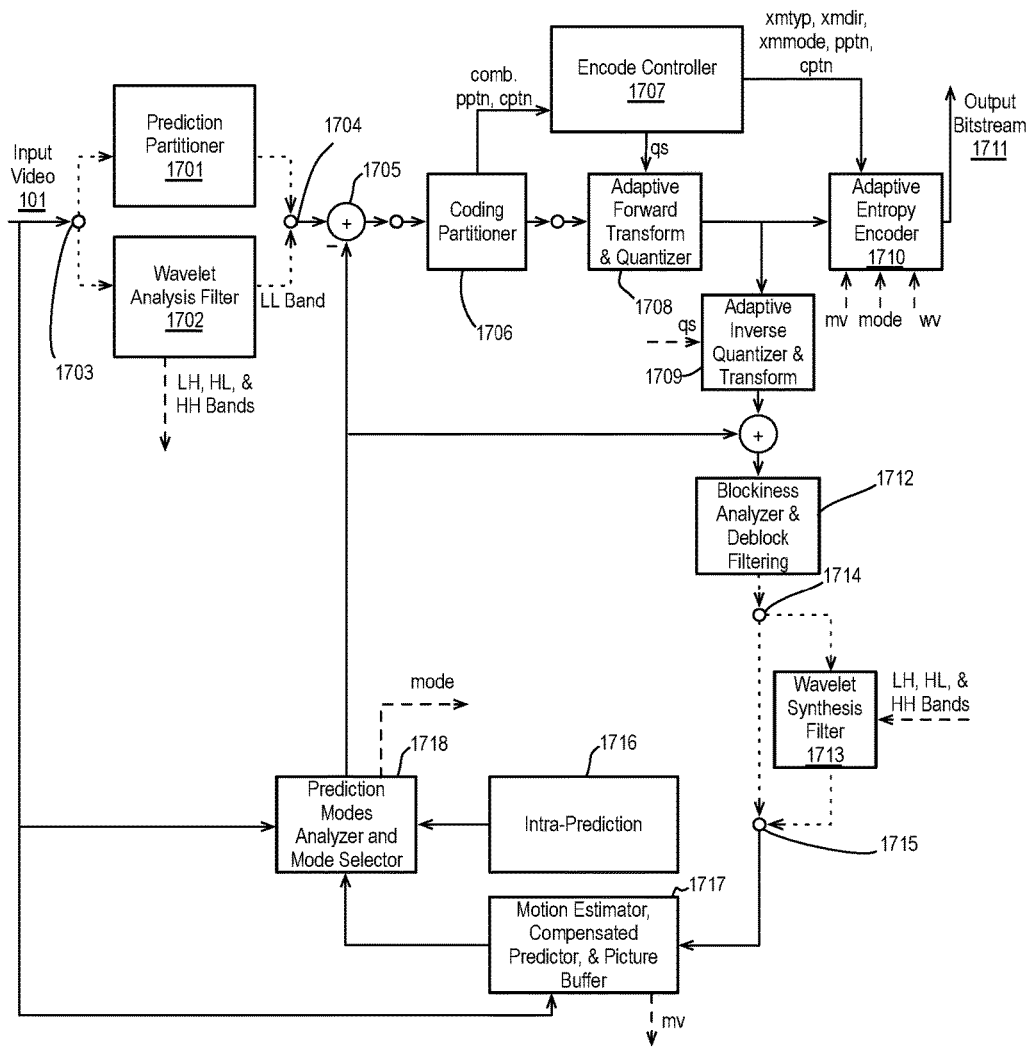
FIG. 12 is an illustrative diagram of an example wavelet based video encoder.

FIG. 12 is an illustrative diagram of an example wavelet based video encoder 1700. As shown, wavelet based video encoder 1700 may receive input video 101 and may include prediction partitioner module 1701, wavelet analysis filter module 1702 (which may be implemented via switches 1703, 1704), differencer 1705, coding partitioner module 1706, encode controller module 1707, adaptive forward transform and quantizer module 1708, adaptive inverse quantizer and transform module 1709, adaptive entropy encoder module 1710, blockiness analyzer and deblock filtering module 1712, wavelet synthesis filter module 1713 (which may be optionally implemented via switches 1714, 175), intra-prediction module 1716, motion estimator, compensated predictor, and picture buffer module 1717, and prediction modes analyzer and mode selector module 1718, which may operate to generate output bitstream 1711.

As discussed, encoder 1700 may perform wavelet coding. For example, wavelet analysis filter module 1702 may decompose input video 101 into wavelet bands. For example, wavelet analysis filter module 1702 may decompose input video 101 using one level wavelet decomposition to divide input video 101 into 4 sub-bands. Encoder 1700 also includes a local decode loop including wavelet synthesis filter module 1713, which may be configured to reverse the analysis operation to combine the 4 sub-bands to produce a reconstructed video frame. The remainder of modules of encoder 1700 operate substantially similarly to those discussed herein with respect to encoder 100 and a discussion of those components is not provided for the sake of brevity. In some examples, coding partitioner module 1706 and adaptive forward transform and quantizer module 1708 may implement the partitioning (e.g., bi-tree and k-d tree partitioning) and transforms (e.g., discrete and adaptive transforms) as discussed herein and may include components discussed with respect to FIGS. 3-6 herein.

As shown in FIG. 12, if wavelet LL band encoding were to employ transform coding then the adaptive transform concepts as described herein may be employed including using adaptive transform sizes, using content adaptive transforms, and other (e.g., fixed) transforms for encoding of blocks of coding partitions of prediction partitions. For the sake of brevity, FIG. 12 does not illustrate a prediction partition assembler module or a coding partition assembler module that may perform complimentary functions of prediction partitioner module 1701 and coding partitioner module 1706, and have been discussed herein. FIG. 12 also does illustrate encoding of other wavelet bands (e.g., LH, HL or HH bands) although FIG. 12 does illustrate wavelet synthesis filter module 1713 may be used to combine all bands to produce a decoded frame.

Figure 13:
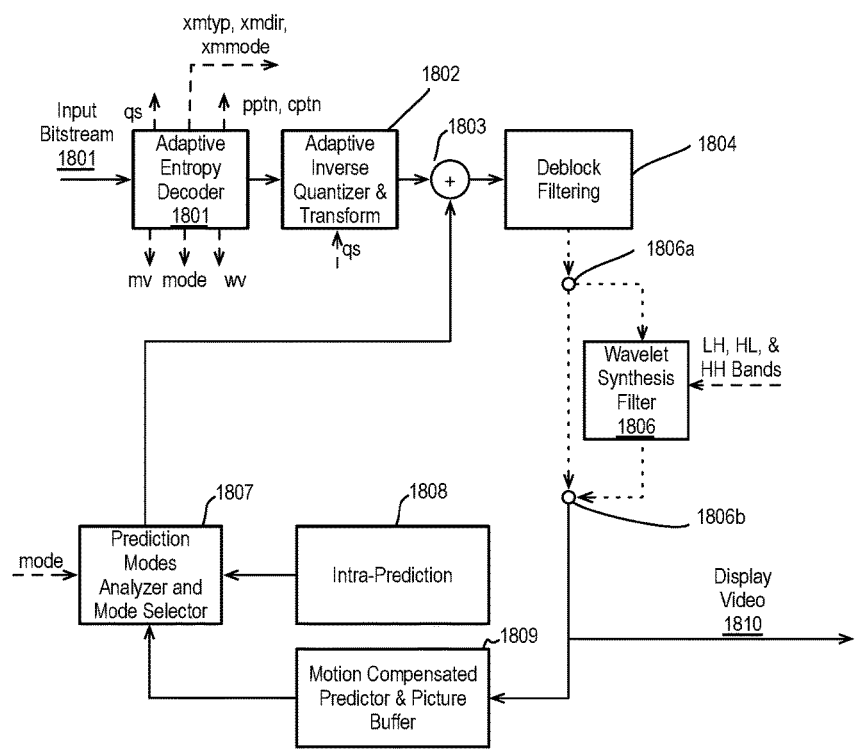
FIG. 13 is an illustrative diagram of an example wavelet based video decoder.

FIG. 13 is an illustrative diagram of an example wavelet based video decoder 1800. As shown, wavelet based video decoder 1800 may receive input bitstream 101 and may include adaptive entropy decoder module 1801, adaptive inverse quantizer and transform module 1802, adder 1803, deblock filtering module 1804, wavelet synthesis filter module 1806 (which may be optionally implemented via switches 1806a, 1806b), intra-prediction module 1808, motion compensated predictor and picture buffer module 1809, and prediction mode analyzer and mode selector module 1807, which may operate to generate display video 1810.

As shown, decoder 1800 may perform wavelet decoding. For example, wavelet synthesis filter module 1806 may be configured to reverse a wavelet analysis operation to combine 4 sub-bands (or the like) to produce a reconstructed video frame (e.g., similarly in operation to wavelet synthesis filter module 1713, discussed above). The remainder of modules of decoder 1800 operate substantially similarly to those discussed herein with respect to decoder 200 and a discussion of those components is not provided for the sake of brevity. In some examples, coding partitioner module 1706 and adaptive inverse quantizer and transform module 1708 may implement inverse transforms (e.g., discrete and adaptive inverse transforms) as discussed herein.

As shown in FIG. 13, if wavelet LL band decoding were to employ transform coding then the adaptive transform concepts as described herein may be employed including using adaptive transform sizes, using content adaptive transforms and other (e.g., fixed) transforms for decoding of blocks of coding partitions or prediction partitions. For the sake of brevity, FIG. 13 does not illustrate a prediction partition assembler module or a coding partition assembler module that may perform complimentary functions of prediction partitioner module 1701 and coding partitioner module 1701. FIG. 13 also does not illustrate decoding of other wavelet bands (e.g., LH, HL or HH bands) although FIG. 13 does illustrate wavelet synthesis filter module 1806 may be used to combine all bands to produce a decoded frame.

Various components of the systems described herein may be implemented in software, firmware, and/or hardware and/or any combination thereof. For example, various components of system 300 may be provided, at least in part, by hardware of a computing System-on-a-Chip (SoC) such as may be found in a computing system such as, for example, a smart phone. Those skilled in the art may recognize that systems described herein may include additional components that have not been depicted in the corresponding figures. For example, the systems discussed herein may include additional components such as bit stream multiplexer or de-multiplexer modules and the like that have not been depicted in the interest of clarity.

Some additional and/or alternative details related to process 700, 1400 and other processes discussed herein may be illustrated in one or more examples of implementations discussed herein and, in particular, with respect to FIG. 19 below.

Figure 14A:
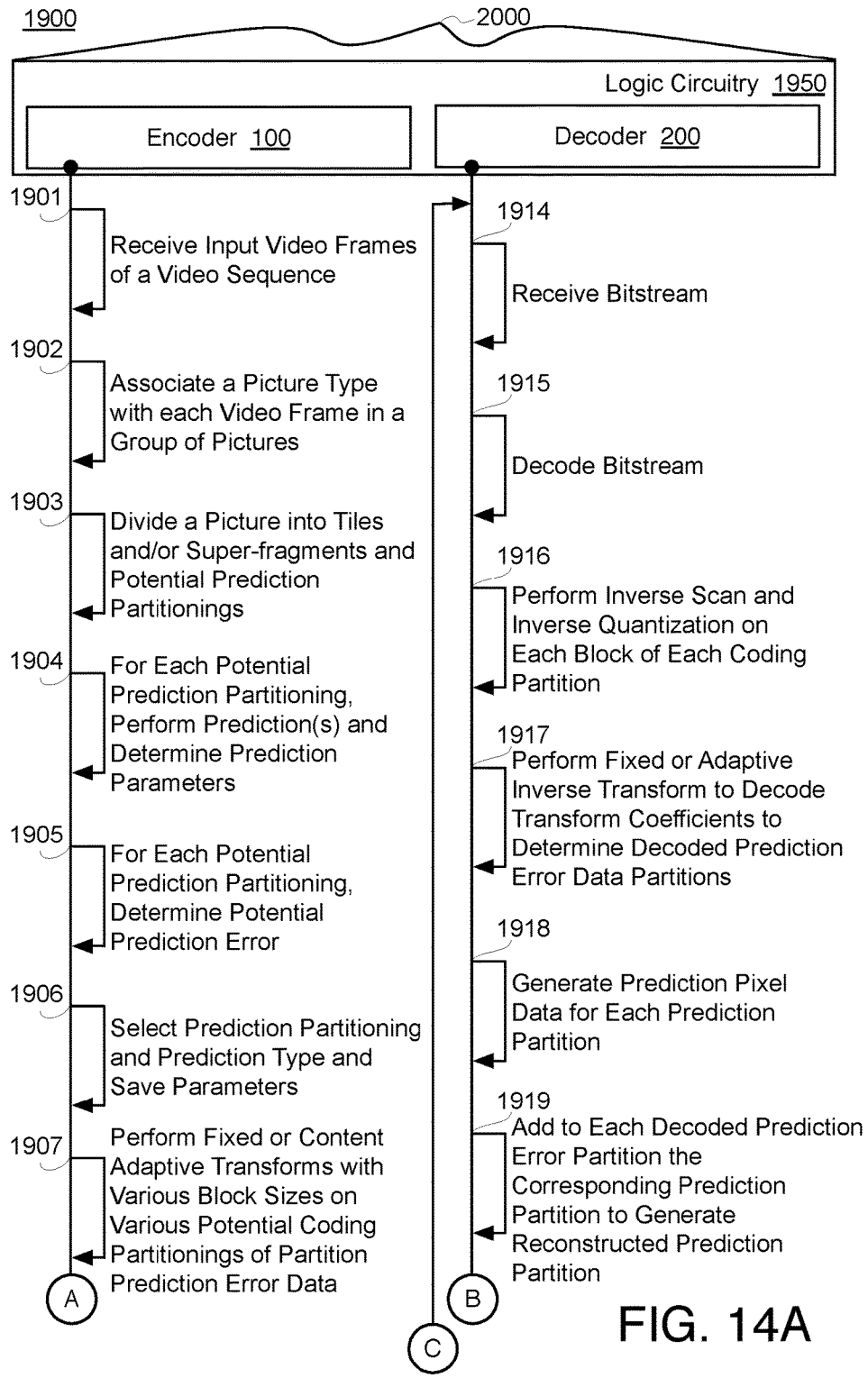
FIGS. 14A and 14B provide an illustrative diagram of an example video coding system and video coding process in operation.
Figure 14B:
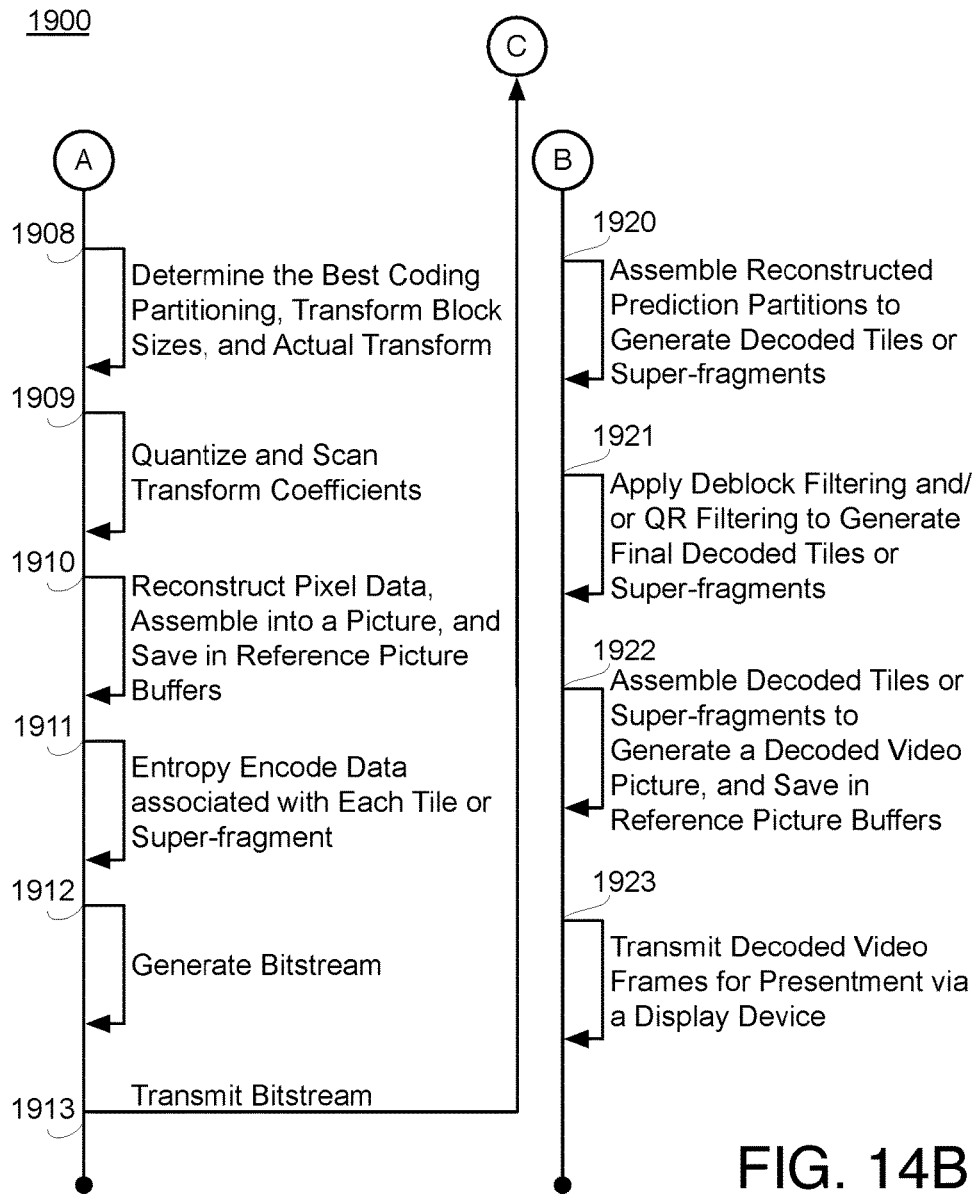

FIGS. 14A and 14B provide an illustrative diagram of an example video coding system 2000 and video coding process 1900 in operation, arranged in accordance with at least some implementations of the present disclosure. In the illustrated implementation, process 1900 may include one or more operations, functions or actions as illustrated by one or more of actions 1901-1923. By way of non-limiting example, process 1900 will be described herein with reference to example video coding system 2000 including encoder 100 of FIG. 1 and decoder 200 of FIG. 2, as is discussed further herein below with respect to FIG. 15. In some examples, video coding system 2000 may include encoder 1700 of FIG. 12 and decoder 1800 of FIG. 13. In various examples, process 1900 may be undertaken by a system including both an encoder and decoder or by separate systems with one system employing an encoder (and optionally a decoder) and another system employing a decoder (and optionally an encoder). It is also noted, as discussed above, that an encoder may include a local decode loop employing a local decoder as a part of the encoder system.

In the illustrated implementation, video coding system 2000 may include logic circuitry 1950, the like, and/or combinations thereof. For example, logic circuitry 1950 may include encoder 100 (or encoder 1700) and may include any modules as discussed with respect to FIG. 1 (or FIG. 12) and/or FIGS. 3-6 and decoder 200 (or decoder 1800) and may include any modules as discussed with respect to FIG. 2 and/or FIG. 13. Although video coding system 2000, as shown in FIGS. 14A and 14B, may include one particular set of blocks or actions associated with particular modules, these blocks or actions may be associated with different modules than the particular modules illustrated here. Although process 1900, as illustrated, is directed to encoding and decoding, the concepts and/or operations described may be applied to encoding and/or decoding separately, and, more generally, to video coding.

Process 1900 may begin at operation 1901, "Receive Input Video Frames of a Video Sequence", where input video frames of a video sequence may be received via encoder 100 for example.

Process 1900 may continue at operation 1902, "Associate a Picture Type with each Video Frame in a Group of Pictures", where a picture type may be associated with each video frame in a group of pictures via content pre-analyzer module 102 for example. For example, the picture type may be F/B-picture, P-picture, or I-picture, or the like. In some examples, a video sequence may include groups of pictures and the processing described herein (e.g., operations 1903-1911) may be performed on a frame or picture of a group of pictures and the processing may be repeated for all frames or pictures of a group and then repeated for all groups of pictures in a video sequence.

Process 1900 may continue at operation 1903, "Divide a Picture into Tiles and/or Super-fragments and Potential Prediction Partitionings", where a picture may be divided into tiles or super-fragments and potential prediction partitions via prediction partitions generator 105 for example.

Process 1900 may continue at operation 1904, "For Each Potential Prediction Partitioning, Perform Prediction(s) and Determine Prediction Parameters", where, for each potential prediction partitionings, prediction(s) may be performed and prediction parameters may be determined. For example, a range of potential prediction partitionings (each having various prediction partitions) may be generated and the associated prediction(s) and prediction parameters may be determined. For example, the prediction(s) may include prediction(s) using characteristics and motion based multi-reference predictions or intra-predictions.

As discussed, in some examples, inter-prediction may be performed. In some examples, up to 4 decoded past and/or future pictures and several morphing/synthesis predictions may be used to generate a large number of reference types (e.g., reference pictures). For instance in 'inter' mode, up to 9 reference types may be supported in P-pictures, and up to 10 reference types may be supported for F/B-pictures. Further, 'multi' mode may provide a type of inter prediction mode in which instead of 1 reference picture, 2 reference pictures may be used and P- and F/B-pictures respectively may allow 3, and up to 8 reference types. For example, prediction may be based on a previously decoded frame generated using at least one of a morphing technique or a synthesizing technique. In such examples, the bitstream (discussed below with respect to operation 1912) may include a frame reference, morphing parameters, or synthesizing parameters associated with the prediction partition.

Process 1900 may continue at operation 1905, "For Each Potential Prediction Partitioning, Determine Potential Prediction Error", where, for each potential prediction partitioning, a potential prediction error may be determined. For example, for each prediction partitioning (and associated prediction partitions, prediction(s), and prediction parameters), a prediction error may be determined. For example, determining the potential prediction error may include differencing original pixels (e.g., original pixel data of a prediction partition) with prediction pixels. In some examples, the associated prediction parameters may be stored. As discussed, in some examples, the prediction error data partition may include prediction error data generated based at least in part on a previously decoded frame generated using at least one of a morphing technique or a synthesizing technique.

Process 1900 may continue at operation 1906, "Select Prediction Partitioning and Prediction Type and Save Parameters", where a prediction partitioning and prediction type may be selected and the associated parameters may be saved. In some examples, the potential prediction partitioning with a minimum prediction error may be selected. In some examples, the potential prediction partitioning may be selected based on a rate distortion optimization (RDO).

Process 1900 may continue at operation 1907, "Perform Fixed or Content Adaptive Transforms with Various Block Sizes on Various Potential Coding Partitionings of Partition Prediction Error Data", where fixed or content adaptive transforms with various block sizes may be performed on various potential coding partitionings of partition prediction error data. For example, partition prediction error data may be partitioned to generate a plurality of coding partitions. For example, the partition prediction error data may be partitioned by a bi-tree coding partitioner module or a k-d tree coding partitioner module of coding partitions generator module 107 as discussed herein. In some examples, partition prediction error data associated with an F/B- or P-picture may be partitioned by a bi-tree coding partitioner module. In some examples, video data associated with an I-picture (e.g., tiles or super-fragments in some examples) may be partitioned by a k-d tree coding partitioner module. In some examples, a coding partitioner module may be chosen or selected via a switch or switches. For example, the partitions may be generated by coding partitions generator module 107.

Process 1900 may continue at operation 1908, "Determine the Best Coding Partitioning, Transform Block Sizes, and Actual Transform", where the best coding partitioning, transform block sizes, and actual transforms may be determined. For example, various coding partitionings (e.g., having various coding partitions) may be evaluated based on RDO or another basis to determine a selected coding partitioning (which may also include further division of coding partitions into transform blocks when coding partitions to not match a transform block size as discussed). For example, the actual transform (or selected transform) may include any content adaptive transform or fixed transform performed on coding partition or block sizes as described herein.

Process 1900 may continue at operation 1909, "Quantize and Scan Transform Coefficients", where transform coefficients associated with coding partitions (and/or transform blocks) may be quantized and scanned in preparation for entropy coding.

Process 1900 may continue at operation 1910, "Reconstruct Pixel Data, Assemble into a Picture, and Save in Reference Picture Buffers", where pixel data may be reconstructed, assembled into a picture, and saved in reference picture buffers. For example, after a local decode loop (e.g., including inverse scan, inverse transform, and assembling coding partitions), prediction error data partitions may be generated. The prediction error data partitions may be added with a prediction partition to generate reconstructed prediction partitions, which may be assembled into tiles or super-fragments. The assembled tiles or super-fragments may be optionally processed via deblock filtering and/or quality restoration filtering and assembled to generate a picture. The picture may be saved in decoded picture buffer 119 as a reference picture for prediction of other (e.g., following) pictures.

Process 1900 may continue at operation 1911, "Entropy Encode Data associated with Each Tile or Super-fragment", where data associated with each tile or super-fragment may be entropy encoded. For example, data associated with each tile or super-fragment of each picture of each group of pictures of each video sequence may be entropy encoded. The entropy encoded data may include the prediction partitioning, prediction parameters, the selected coding partitioning, the selected characteristics data, motion vector data, quantized transform coefficients, filter parameters, selection data (such as mode selection data), and indictors.

Process 1900 may continue at operation 1912, "Generate Bitstream" where a bitstream may be generated based on the entropy encoded data. As discussed, in some examples, the bitstream may include a frame or picture reference, morphing parameters, or synthesizing parameters associated with a prediction partition.

Process 1900 may continue at operation 1913, "Transmit Bitstream", where the bitstream may be transmitted. For example, video coding system 2000 may transmit output bitstream 111, bitstream 1400, or the like via an antenna 2002 (please refer to FIG. 15).

Operations 1901-1913 may provide for video encoding and bitstream transmission techniques, which may be employed by an encoder system as discussed herein. The following operations, operations 1914-1923 may provide for video decoding and video display techniques, which may be employed by a decoder system as discussed herein.

Process 1900 may continue at operation 1914, "Receive Bitstream", where the bitstream may be received. For example, input bitstream 201, bitstream 1400, or the like may be received via decoder 200. In some examples, the bitstream may include data associated with a coding partition, one or more indicators, and/or data defining coding partition(s) as discussed above. In some examples, the bitstream may include the prediction partitioning, prediction parameters, the selected coding partitioning, the selected characteristics data, motion vector data, quantized transform coefficients, filter parameters, selection data (such as mode selection data), and indictors.

Process 1900 may continue at operation 1915, "Decode Bitstream", where the received bitstream may be decoded via adaptive entropy decoder module 202 for example. For example, received bitstream may be entropy decoded to determine the prediction partitioning, prediction parameters, the selected coding partitioning, the selected characteristics data, motion vector data, quantized transform coefficients, filter parameters, selection data (such as mode selection data), and indictors.

Process 1900 may continue at operation 1916, "Perform Inverse Scan and Inverse Quantization on Each Block of Each Coding Partition", where an inverse scan and inverse quantization may be performed on each block of each coding partition for the prediction partition being processed. For example, the inverse scan and inverse quantization may be performed via adaptive inverse quantize module 203.

Process 1900 may continue at operation 1917, "Perform Fixed or Content Adaptive Inverse Transform to Decode Transform Coefficients to Determine Decoded Prediction Error Data Partitions", where a fixed or content adaptive inverse transform may be performed to decode transform coefficients to determine decoded prediction error data partitions. For example, the inverse transform may include an inverse content adaptive transform such as a hybrid parametric Haar inverse transform such that the hybrid parametric Haar inverse transform may include a parametric Haar inverse transform in a direction of the parametric transform direction and a discrete cosine inverse transform in a direction orthogonal to the parametric transform direction. In some examples, the fixed inverse transform may include a discrete cosine inverse transform or a discrete cosine inverse transform approximator. For example, the fixed or content adaptive transform may be performed via adaptive inverse transform module 204. As discussed, the content adaptive inverse transform may be based on other previously decoded data, such as, for example, decoded neighboring partitions or blocks. In some examples, generating the decoded prediction error data partitions may include assembling decoded coding partitions via coding partitions assembler module 205.

Process 1900 may continue at operation 1918, "Generate Prediction Pixel Data for Each Prediction Partition", where prediction pixel data may be generated for each prediction partition. For example, prediction pixel data may be generated using the selected prediction type (e.g., based on characteristics and motion, or intra-, or other types) and associated prediction parameters.

Process 1900 may continue at operation 1919, "Add to Each Decoded Prediction Error Partition the Corresponding Prediction Partition to Generate Reconstructed Prediction Partition", where each decoded prediction error partition (e.g., including zero prediction error partitions) may be added to the corresponding prediction partition to generated a reconstructed prediction partition. For example, prediction partitions may be generated via the decode loop illustrated in FIG. 2 and added via adder 206 to decoded prediction error partitions.

Process 1900 may continue at operation 1920, "Assemble Reconstructed Prediction Partitions to Generate Decoded Tiles or Super-fragments", where reconstructed prediction partitions may be assembled to generate decoded tiles or super-fragments. For example, prediction partitions may be assembled to generate decoded tiles or super-fragments via prediction partitions assembler module 207.

Process 1900 may continue at operation 1921, "Apply Deblock Filtering and/or QR Filtering to Generate Final Decoded Tiles or Super-fragments", where optional deblock filtering and/or quality restoration filtering may be applied to the decoded tiles or super-fragments to generate final decoded tiles or super-fragments. For example, optional deblock filtering may be applied via deblock filtering module 208 and/or optional quality restoration filtering may be applied via quality restoration filtering module 209.

Process 1900 may continue at operation 1922, "Assemble Decoded Tiles or Super-fragments to Generate a Decoded Video Picture, and Save in Reference Picture Buffers", where decoded (or final decoded) tiles or super-fragments may be assembled to generate a decoded video picture, and the decoded video picture may be saved in reference picture buffers (e.g., decoded picture buffer 210) for use in future prediction.

Figure 15:
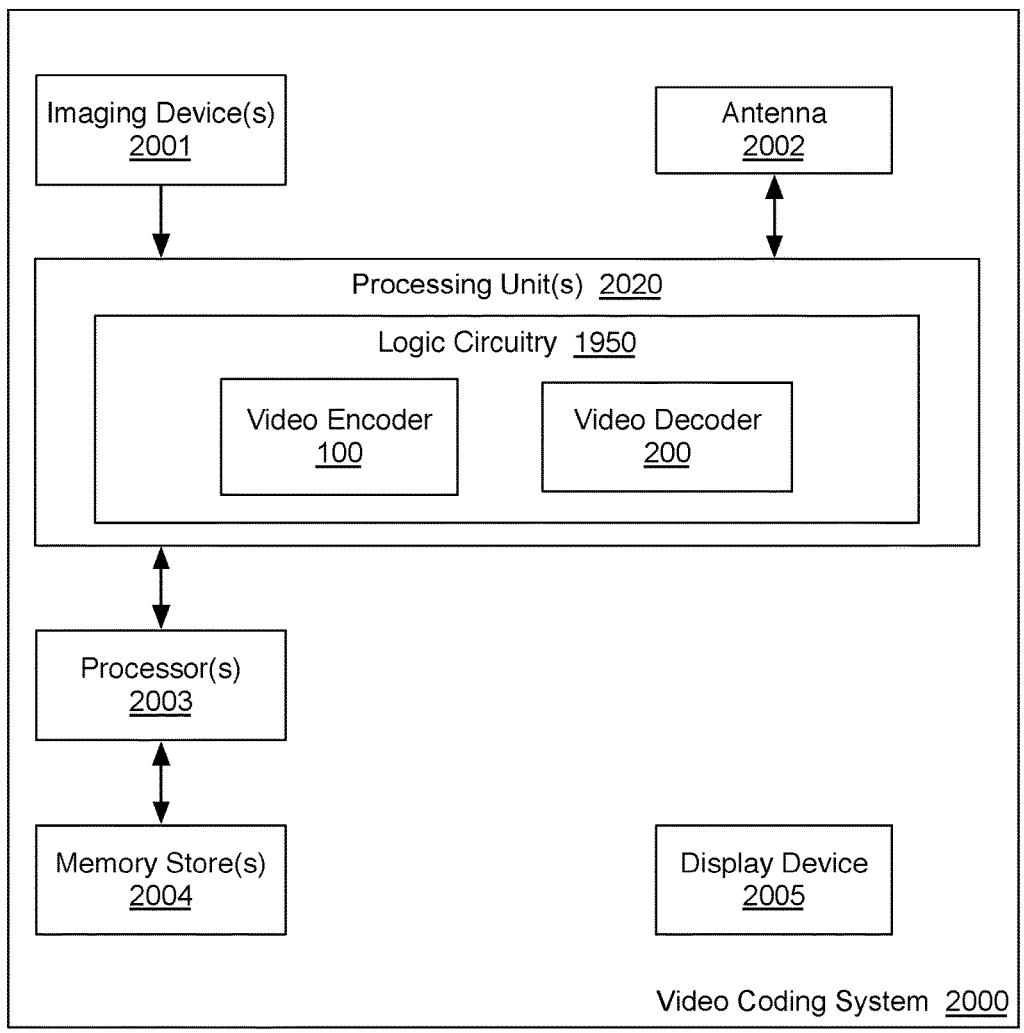
FIG. 15 is an illustrative diagram of an example video coding system.

Process 1900 may continue at operation 1923, "Transmit Decoded Video Frames for Presentment via a Display Device", where decoded video frames may be transmitted for presentment via a display device. For example, decoded video pictures may be further processed via adaptive picture re-organizer 217 and content post restorer module 218 and transmitted to a display device as video frames of display video 219 for presentment to a user. For example, the video frame(s) may be transmitted to a display device 2005 (as shown in FIG. 15) for presentment.

While implementation of the example processes herein may include the undertaking of all operations shown in the order illustrated, the present disclosure is not limited in this regard and, in various examples, implementation of the example processes herein may include the undertaking of only a subset of the operations shown and/or in a different order than illustrated.

In addition, any one or more of the operations discussed herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more of the operations of the example processes herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the video systems as discussed herein.

As used in any implementation described herein, the term "module" refers to any combination of software logic, firmware logic and/or hardware logic configured to provide the functionality described herein. The software may be embodied as a software package, code and/or instruction set or instructions, and "hardware", as used in any implementation described herein, may include, for example, singly or in any combination, hardwired circuitry, programmable circuitry, state machine circuitry, and/or firmware that stores instructions executed by programmable circuitry. The modules may, collectively or individually, be embodied as circuitry that forms part of a larger system, for example, an integrated circuit (IC), system on-chip (SoC), and so forth. For example, a module may be embodied in logic circuitry for the implementation via software, firmware, or hardware of the coding systems discussed herein.

FIG. 15 is an illustrative diagram of example video coding system 2000, arranged in accordance with at least some implementations of the present disclosure. In the illustrated implementation, video coding system 2000 may include imaging device(s) 2001, video encoder 100, video decoder 200 (and/or a video coder implemented via logic circuitry 1950 of processing unit(s) 2020), an antenna 2002, one or more processor(s) 2003, one or more memory store(s) 2004, and/or a display device 2005.

As illustrated, imaging device(s) 2001, antenna 2002, processing unit(s) 2020, logic circuitry 1950, video encoder 100, video decoder 200, processor(s) 2003, memory store(s) 2004, and/or display device 2005 may be capable of communication with one another. As discussed, although illustrated with both video encoder 100 and video decoder 200, video coding system 2000 may include only video encoder 100 or only video decoder 200 in various examples. Further, although described with respect to video encoder and/or video decoder, system 2000 may, in some examples, implement video encoder 1700 and/or video decoder 1800.

As shown, in some examples, video coding system 2000 may include antenna 2002. Antenna 2002 may be configured to transmit or receive an encoded bitstream of video data, for example. Further, in some examples, video coding system 2000 may include display device 2005. Display device 2005 may be configured to present video data. As shown, in some example, logic circuitry 1950 may be implemented via processing unit(s) 2020. Processing unit(s) 2020 may include application-specific integrated circuit (ASIC) logic, graphics processor(s), general purpose processor(s), or the like. Video coding system 2000 also may include optional processor(s) 2003, which may similarly include application-specific integrated circuit (ASIC) logic, graphics processor(s), general purpose processor(s), or the like. In some examples, logic circuitry 1950 may be implemented via hardware, video coding dedicated hardware, or the like, and processor(s) 2003 may implemented general purpose software, operating systems, or the like. In addition, memory store(s) 2004 may be any type of memory such as volatile memory (e.g., Static Random Access Memory (SRAM), Dynamic Random Access Memory (DRAM), etc.) or non-volatile memory (e.g., flash memory, etc.), and so forth. In a non-limiting example, memory store(s) 2004 may be implemented by cache memory. In some examples, logic circuitry 1950 may access memory store(s) 2004 (for implementation of an image buffer for example). In other examples, logic circuitry 1950 and/or processing unit(s) 2020 may include memory stores (e.g., cache or the like) for the implementation of an image buffer or the like.

In some examples, video encoder 100 implemented via logic circuitry may include an image buffer (e.g., via either processing unit(s) 2020 or memory store(s) 2004)) and a graphics processing unit (e.g., via processing unit(s) 2020). The graphics processing unit may be communicatively coupled to the image buffer. The graphics processing unit may include video encoder 100 (or encoder 1700) as implemented via logic circuitry 1950 to embody the various modules as discussed with respect to FIG. 1 and FIGS. 3-6. For example, the graphics processing unit may include coding partitions generator logic circuitry, adaptive transform logic circuitry, content pre-analyzer, encode controller logic circuitry, adaptive entropy encoder logic circuitry, and so on. The logic circuitry may be configured to perform the various operations as discussed herein. For example, the coding partitions generator logic circuitry may be configured to receive a prediction error data partition for transform coding and partition the prediction error data partition to generate a plurality of coding partitions of the prediction error data partition and the adaptive transform logic circuitry may be configured to perform content adaptive and/or fixed transforms on various partitions. For example, the partitioning may include a bi-tree partitioning technique or a k-d tree partitioning technique. Video decoder 200 may be implemented in a similar manner.

In some examples, antenna 2002 of video coding system 2000 may be configured to receive an encoded bitstream of video data. As discussed, the encoded bitstream may include data associated with the coding partition (e.g., transform coefficients or quantized transform coefficients, optional indicators (as discussed), and/or data defining the coding partition (e.g., data associated with defining bi-tree partitions or k-d tree partitions using a symbol-run coding or codebook technique or the like)). Video coding system 2000 may also include video decoder 200 (or decoder 1800) coupled to antenna 2002 and configured to decode the encoded bitstream. For example, video decoder 200 may be configured to decode the encoded bitstream to determine the data associated with the coding partition and the transform type, perform an inverse transform based at least in part on the data associated with the coding partition and the transform type to generate a decoded prediction error data partition, add a prediction partition to the decoded prediction error data partition to generate a reconstructed partition, and assemble the reconstructed partition with a second reconstructed partition to generate at least one of a tile or a super-fragment.

In embodiments, features described herein may be undertaken in response to instructions provided by one or more computer program products. Such program products may include signal bearing media providing instructions that, when executed by, for example, a processor, may provide the functionality described herein. The computer program products may be provided in any form of one or more machine-readable media. Thus, for example, a processor including one or more processor core(s) may undertake one or more features described herein in response to program code and/or instructions or instruction sets conveyed to the processor by one or more machine-readable media. In general, a machine-readable medium may convey software in the form of program code and/or instructions or instruction sets that may cause any of the devices and/or systems described herein to implement at least portions of the features described herein.

Figure 16:
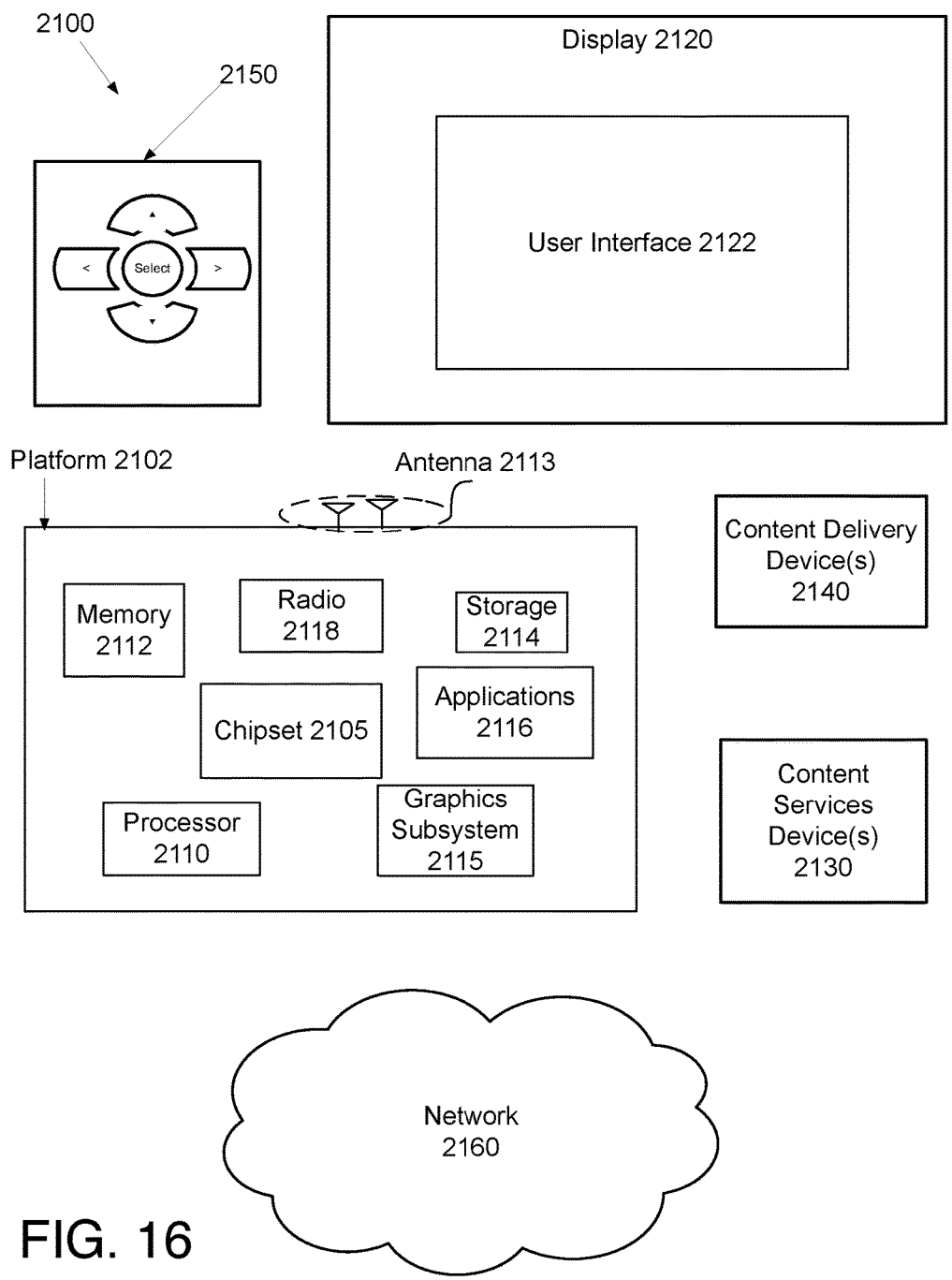
FIG. 16 is an illustrative diagram of an example system.

FIG. 16 is an illustrative diagram of an example system 2100, arranged in accordance with at least some implementations of the present disclosure. In various implementations, system 2100 may be a media system although system 2100 is not limited to this context. For example, system 2100 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

In various implementations, system 2100 includes a platform 2102 coupled to a display 2120. Platform 2102 may receive content from a content device such as content services device(s) 2130 or content delivery device(s) 2140 or other similar content sources. A navigation controller 2150 including one or more navigation features may be used to interact with, for example, platform 2102 and/or display 2120. Each of these components is described in greater detail below.

In various implementations, platform 2102 may include any combination of a chipset 2105, processor 2110, memory 2112, antenna 2113, storage 2114, graphics subsystem 2115, applications 2116 and/or radio 2118. Chipset 2105 may provide intercommunication among processor 2110, memory 2112, storage 2114, graphics subsystem 2115, applications 2116 and/or radio 2118. For example, chipset 2105 may include a storage adapter (not depicted) capable of providing intercommunication with storage 2114.

Processor 2110 may be implemented as a Complex Instruction Set Computer (CISC) or Reduced Instruction Set Computer (RISC) processors, x86 instruction set compatible processors, multi-core, or any other microprocessor or central processing unit (CPU). In various implementations, processor 2110 may be dual-core processor(s), dual-core mobile processor(s), and so forth.

Memory 2112 may be implemented as a volatile memory device such as, but not limited to, a Random Access Memory (RAM), Dynamic Random Access Memory (DRAM), or Static RAM (SRAM).

Storage 2114 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In various implementations, storage 2114 may include technology to increase the storage performance enhanced protection for valuable digital media when multiple hard drives are included, for example.

Graphics subsystem 2115 may perform processing of images such as still or video for display. Graphics subsystem 2115 may be a graphics processing unit (GPU) or a visual processing unit (VPU), for example. An analog or digital interface may be used to communicatively couple graphics subsystem 2115 and display 2120. For example, the interface may be any of a High-Definition Multimedia Interface, DisplayPort, wireless HDMI, and/or wireless HD compliant techniques. Graphics subsystem 2115 may be integrated into processor 2110 or chipset 2105. In some implementations, graphics subsystem 2115 may be a stand-alone device communicatively coupled to chipset 2105.

The graphics and/or video processing techniques described herein may be implemented in various hardware architectures. For example, graphics and/or video functionality may be integrated within a chipset. Alternatively, a discrete graphics and/or video processor may be used. As still another implementation, the graphics and/or video functions may be provided by a general purpose processor, including a multi-core processor. In further embodiments, the functions may be implemented in a consumer electronics device.

Radio 2118 may include one or more radios capable of transmitting and receiving signals using various suitable wireless communications techniques. Such techniques may involve communications across one or more wireless networks. Example wireless networks include (but are not limited to) wireless local area networks (WLANs), wireless personal area networks (WPANs), wireless metropolitan area network (WMANs), cellular networks, and satellite networks. In communicating across such networks, radio 2118 may operate in accordance with one or more applicable standards in any version.

In various implementations, display 2120 may include any television type monitor or display. Display 2120 may include, for example, a computer display screen, touch screen display, video monitor, television-like device, and/or a television. Display 2120 may be digital and/or analog. In various implementations, display 2120 may be a holographic display. Also, display 2120 may be a transparent surface that may receive a visual projection. Such projections may convey various forms of information, images, and/or objects. For example, such projections may be a visual overlay for a mobile augmented reality (MAR) application. Under the control of one or more software applications 2116, platform 2102 may display user interface 2122 on display 2120.

In various implementations, content services device(s) 2130 may be hosted by any national, international and/or independent service and thus accessible to platform 2102 via the Internet, for example. Content services device(s) 2130 may be coupled to platform 2102 and/or to display 2120. Platform 2102 and/or content services device(s) 2130 may be coupled to a network 2160 to communicate (e.g., send and/or receive) media information to and from network 2160. Content delivery device(s) 2140 also may be coupled to platform 2102 and/or to display 2120.

In various implementations, content services device(s) 2130 may include a cable television box, personal computer, network, telephone, Internet enabled devices or appliance capable of delivering digital information and/or content, and any other similar device capable of unidirectionally or bidirectionally communicating content between content providers and platform 2102 and/display 2120, via network 2160 or directly. It will be appreciated that the content may be communicated unidirectionally and/or bidirectionally to and from any one of the components in system 2100 and a content provider via network 2160. Examples of content may include any media information including, for example, video, music, medical and gaming information, and so forth.

Content services device(s) 2130 may receive content such as cable television programming including media information, digital information, and/or other content. Examples of content providers may include any cable or satellite television or radio or Internet content providers. The provided examples are not meant to limit implementations in accordance with the present disclosure in any way.

In various implementations, platform 2102 may receive control signals from navigation controller 2150 having one or more navigation features. The navigation features of controller 2150 may be used to interact with user interface 2122, for example. In various embodiments, navigation controller 2150 may be a pointing device that may be a computer hardware component (specifically, a human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 2150 may be replicated on a display (e.g., display 2120) by movements of a pointer, cursor, focus ring, or other visual indicators displayed on the display. For example, under the control of software applications 2116, the navigation features located on navigation controller 2150 may be mapped to virtual navigation features displayed on user interface 2122. In various embodiments, controller 2150 may not be a separate component but may be integrated into platform 2102 and/or display 2120. The present disclosure, however, is not limited to the elements or in the context shown or described herein.

In various implementations, drivers (not shown) may include technology to enable users to instantly turn on and off platform 2102 like a television with the touch of a button after initial boot-up, when enabled, for example. Program logic may allow platform 2102 to stream content to media adaptors or other content services device(s) 2130 or content delivery device(s) 2140 even when the platform is turned "off." In addition, chipset 2105 may include hardware and/or software support for 5.1 surround sound audio and/or high definition 7.1 surround sound audio, for example. Drivers may include a graphics driver for integrated graphics platforms. In various embodiments, the graphics driver may comprise a peripheral component interconnect (PCI) Express graphics card.

In various implementations, any one or more of the components shown in system 2100 may be integrated. For example, platform 2102 and content services device(s) 2130 may be integrated, or platform 2102 and content delivery device(s) 2140 may be integrated, or platform 2102, content services device(s) 2130, and content delivery device(s) 2140 may be integrated, for example. In various embodiments, platform 2102 and display 2120 may be an integrated unit. Display 2120 and content service device(s) 2130 may be integrated, or display 2120 and content delivery device(s) 2140 may be integrated, for example. These examples are not meant to limit the present disclosure.

In various embodiments, system 2100 may be implemented as a wireless system, a wired system, or a combination of both. When implemented as a wireless system, system 2100 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 2100 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and the like. Examples of wired communications media may include a wire, cable, metal leads, printed circuit board (PCB), backplane, switch fabric, semiconductor material, twisted-pair wire, co-axial cable, fiber optics, and so forth.

Platform 2102 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 16.

Figure 17:
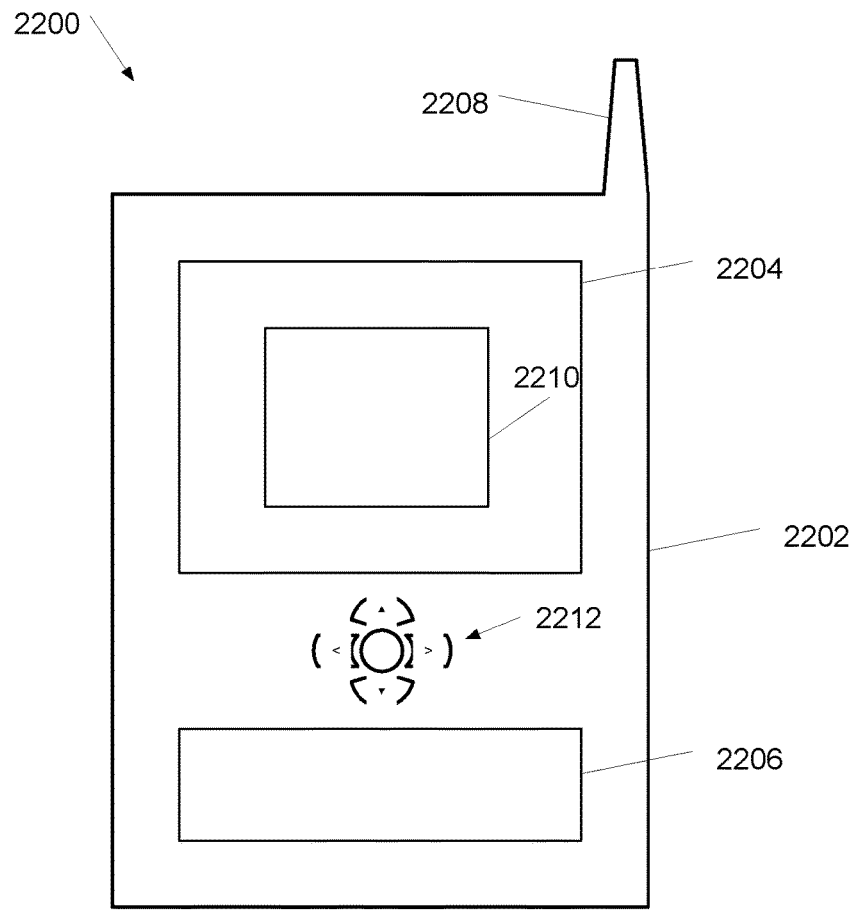
FIG. 17 illustrates an example device.

As described above, system 2100 may be embodied in varying physical styles or form factors. FIG. 17 illustrates implementations of a small form factor device 2200 in which system 2200 may be embodied. In various embodiments, for example, device 2200 may be implemented as a mobile computing device a having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, cameras (e.g. point-and-shoot cameras, super-zoom cameras, digital single-lens reflex (DSLR) cameras), and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In various embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

As shown in FIG. 17, device 2200 may include a housing 2202, a display 2204 which may include a user interface 2210, an input/output (I/O) device 2206, and an antenna 2208. Device 2200 also may include navigation features 2212. Display 2204 may include any suitable display unit for displaying information appropriate for a mobile computing device. I/O device 2206 may include any suitable I/O device for entering information into a mobile computing device. Examples for I/O device 2206 may include an alphanumeric keyboard, a numeric keypad, a touch pad, input keys, buttons, switches, rocker switches, microphones, speakers, voice recognition device and software, and so forth. Information also may be entered into device 2200 by way of microphone (not shown). Such information may be digitized by a voice recognition device (not shown). The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

While certain features set forth herein have been described with reference to various implementations, this description is not intended to be construed in a limiting sense. Hence, various modifications of the implementations described herein, as well as other implementations, which are apparent to persons skilled in the art to which the present disclosure pertains are deemed to lie within the spirit and scope of the present disclosure.

The following examples pertain to further embodiments.

In one example, a computer-implemented method for video coding may include receiving a prediction error data partition for transform coding, partitioning the prediction error data partition to generate a plurality of coding partitions of the prediction error data partition, performing a content adaptive transform on a first subset of the plurality of coding partitions, and performing a fixed transform on a second subset of the plurality of coding partitions.

In another example, a computer-implemented method for video coding may further include determining a first picture type and a first prediction type associated a video frame associated with the prediction error data partition such that the picture type may include at least one of an F/B-picture or a P-picture and such that the prediction type may include inter prediction, receiving a tile coding, determining a second picture type associated with the tile such that the second picture type may include an I-picture, partitioning the tile using at least one of a k-d tree partitioning technique or a bi-tree partitioning technique to generate a plurality of partitions for prediction, performing intra-prediction to generate a plurality of prediction partitions associated with the plurality of partitions for prediction, differencing the plurality of prediction partitions with original pixel data associated with the plurality of prediction partitions to generate a plurality of second prediction error data partitions, performing a second content adaptive transform on a third subset of the plurality of second prediction error data partitions, performing a second fixed transform on a fourth subset of the plurality of second prediction error data partitions, determining a first coding partition from the plurality of coding partitions and a first coding transform for the first coding partition such that the first coding transform may include at least one of the content adaptive transform or the fixed transform, such that both the first subset and the second subset may include the first coding partition, and such that determining the first coding transform may include a rate distortion optimization or a content pre-analysis, generating one or more indicators associated with the first coding partition and the first coding transform such that the one or more indicators may include at least one of a transform type indicating at least one of the content adaptive transform or the fixed transform, a transform direction indicating a parametric transform direction for the content adaptive transform, or block size data indicating transform block sizes of the first coding partition, determining a second coding partition from the plurality of second prediction error data partitions and a second coding transform for the second coding partition such that the second coding transform may include at least one of the second content adaptive transform or the second fixed transform, and such that determining the second coding transform may include determining the second coding transform based on a size of the second coding partition, generating one or more second indicators associated with the second coding partition and the second coding transform, entropy encoding data associated with the first coding partition and the one or more indicators in a bitstream such that the data associated with the first coding partition may include at least one of transform coefficients or quantized transform coefficients, entropy encoding data associated with the second coding partition and the one or more second indicators in the bitstream such that the data associated with the second coding partition may include at least one of second transform coefficients or second quantized transform coefficients, transmitting the bitstream, receiving the bitstream, entropy decoding the bitstream to determine the data associated with the first coding partition data and the one or more indicators, entropy decoding the bitstream to determine the data associated with the second coding partition data and the one or more second indicators, performing an inverse scan, an inverse quantization, and an inverse transform based at least in part on the data associated with the first coding partition and the one or more indicators to generate a first decoded prediction error data partition, performing a second inverse scan, a second inverse quantization, and a second inverse transform based at least in part on the data associated with the second coding partition and the second one or more indicators to generate a second decoded prediction error data partition, adding a prediction partition to the first decoded prediction error data partition to generate a first reconstructed partition, assembling the first reconstructed partition and a second reconstructed partition to generate at least one of a first tile or a first super-fragment, applying at least one of a deblock filtering or a quality restoration filtering to the first tile or the first super-fragment to generate a first final decoded tile or super-fragment, assembling the first final decoded tile or super-fragment with a second final decoded tile or super-fragment to generate a decoded video frame, and transmitting the decoded video frame for presentment via a display device. Partitioning the prediction error data partition to generate the plurality of coding partitions may include partitioning the prediction error data partition using at least one of a bi-tree partitioning technique or a k-d tree partitioning technique. The content adaptive transform may include a hybrid parametric Haar transform such that the hybrid parametric Haar transform may include a parametric Haar transform in a first direction and a discrete cosine transform in a second direction, and such that the first direction comprises at least one of horizontal or vertical. The fixed transform may include at least one of a discrete cosine transform or a discrete cosine transform approximator. The second content adaptive transform may include a second hybrid parametric Haar transform. The second fixed transform may include a second discrete cosine transform. The plurality of coding partitions may include a minimum partition size of 4×4 pixels. The first subset of the plurality of coding partitions may include small to medium sized coding partitions, and small to medium sized coding partitions may include coding partitions having a height of less than or equal to 16 pixels and a width less than or equal to 16 pixels. The second subset of the plurality of coding partitions may include medium to large sized coding partitions, and medium to large sized coding partitions may include coding partitions having a height of greater than or equal to 16 pixels and a width greater than or equal to 16 pixels, and the second subset of the plurality of coding partitions may include coding partitions having a partition size of 16×16 pixels, 32×32 pixels, or 64×64 pixels. The second subset of the plurality of coding partitions may include small to large sized coding partitions, and small to large sized coding partitions may include the plurality of coding partitions. The third subset of the plurality of second prediction error data partitions may include small to medium sized partitions, and wherein small to medium sized partitions comprise partitions having a height of less than or equal to 16 pixels and a width less than or equal to 16 pixel. The fourth subset of the plurality of second prediction error data partitions may include medium to large sized partitions, and wherein medium to large sized partitions comprise partitions having a height of greater than or equal to 16 pixels and a width greater than or equal to 16 pixels. The fourth subset of the plurality of second prediction error data partitions may include small to large sized partitions, and wherein small to large sized partitions comprise the plurality of second prediction error data partitions. The prediction error data partition may include prediction error data generated based at least in part on a previously decoded frame generated using at least one of a morphing technique or a synthesizing technique, and the one or more indicators may include at least one of a frame reference, morphing parameters, or synthesizing parameters associated with the prediction error data.

In other examples, a video encoder may include an image buffer and a graphics processing unit having coding partitions generator logic circuitry and adaptive transform logic circuitry. The graphics processing unit may be communicatively coupled to the image buffer and the coding partitions generator logic may be configured to receive a prediction error data partition for transform coding and partition the prediction error data partition to generate a plurality of coding partitions of the prediction error data partition, and the adaptive transform logic circuitry may be configured to perform a content adaptive transform on a first subset of the plurality of coding partitions and perform a fixed transform on a second subset of the plurality of coding partitions.

In a further example video encoder, the graphics processing unit may include content pre-analyzer logic circuitry, encode controller logic circuitry, and/or adaptive entropy encoder logic circuitry. The adaptive transform logic circuitry may be configured to determine a picture type associated with a video frame associated with the prediction error data partition, wherein the picture type comprises at least one of an F/B-picture or a P-picture and determine a second picture type associated a second video frame, wherein the second picture type comprises an I-picture. The encode controller logic circuitry may be configured to determine a prediction type associated with the prediction error data partition such that the prediction type may include inter prediction, determine a first coding partition from the plurality of coding partitions and a first coding transform for the coding partition such that the first coding transform may include at least one of the content adaptive transform or the fixed transform, such that both the first subset and the second subset may include the first coding partition, and such that to determine the first coding transform may include the encode controller logic circuitry being configured to perform rate distortion optimization or a content pre-analysis, generate one or more indicators associated with the first coding partition and the first coding transform such that the one or more indicators may include at least one of a transform type indicating at least one of the content adaptive transform or the fixed transform, a transform direction indicating a parametric transform direction for the content adaptive transform, or block size data indicating transform block sizes of the first coding partition, determine a second coding partition from a plurality of second prediction error data partitions associated with a tile of the second frame and a second coding transform for the second coding partition, wherein the second coding transform comprises at least one of a second content adaptive transform or a second fixed transform, and wherein determining the second coding transform comprises determining the second coding transform based on a size of the second coding partition, and generate one or more second indicators associated with the second coding partition and the second coding transform. The adaptive entropy encoder logic circuitry may be configured to entropy encode data associated with the first coding partition and the one or more indicators in a bitstream such that the data associated with the first coding partition may include at least one of transform coefficients or quantized transform coefficients, entropy encode data associated with the second coding partition and the one or more second indicators in the bitstream such that the data associated with the second coding partition may include at least one of second transform coefficients or second quantized transform coefficients, and transmit the bitstream. The coding partitions generator logic circuitry may be further configured to receive the tile for coding and partition the tile using at least one of a k-d tree partitioning technique or a bi-tree partitioning technique to generate the plurality of partitions for prediction. The adaptive transform logic circuitry may be further configured to perform a second content adaptive transform on a third subset of a plurality of second prediction error data partitions associated with the plurality of partitions for prediction and perform a second fixed transform on a fourth subset of the plurality of second prediction error data partitions associated with the plurality of partitions for prediction. To partition the prediction error data partition to generate the plurality of coding partitions may include the coding partitions generator logic circuitry being configured to partition the prediction error data partition using at least one of a bi-tree partitioning technique or a k-d tree partitioning technique. The content adaptive transform may include a hybrid parametric Haar transform such that the hybrid parametric Haar transform may include a parametric Haar transform in a first direction and a discrete cosine transform in a second direction, and such that the first direction comprises at least one of horizontal or vertical. The fixed transform may include at least one of a discrete cosine transform or a discrete cosine transform approximator. The second content adaptive transform may include a second hybrid parametric Haar transform. The second fixed transform may include a second discrete cosine transform. The plurality of coding partitions may include a minimum partition size of 4×4 pixels. The first subset of the plurality of coding partitions may include small to medium sized coding partitions, and small to medium sized coding partitions may include coding partitions having a height of less than or equal to 16 pixels and a width less than or equal to 16 pixels. The second subset of the plurality of coding partitions may include medium to large sized coding partitions, and medium to large sized coding partitions may include coding partitions having a height of greater than or equal to 16 pixels and a width greater than or equal to 16 pixels, and the second subset of the plurality of coding partitions may include coding partitions having a partition size of 16×16 pixels, 32×32 pixels, or 64×64 pixels. The second subset of the plurality of coding partitions may include small to large sized coding partitions, and small to large sized coding partitions may include the plurality of coding partitions. The third subset of the plurality of second prediction error data partitions comprise small to medium sized partitions, and wherein small to medium sized partitions comprise partitions having a height of less than or equal to 16 pixels and a width less than or equal to 16 pixels. The fourth subset of the plurality of second prediction error data partitions comprise medium to large sized partitions, and wherein medium to large sized partitions comprise partitions having a height of greater than or equal to 16 pixels and a width greater than or equal to 16 pixels. The fourth subset of the plurality of second prediction error data partitions comprise small to large sized partitions, and wherein small to large sized partitions comprise the plurality of second prediction error data partitions. The prediction error data partition may include prediction error data generated based at least in part on a previously decoded frame generated using at least one of a morphing technique or a synthesizing technique, and the one or more indicators may include at least one of a frame reference, morphing parameters, or synthesizing parameters associated with the prediction error data.

In yet another example, a system may include an antenna configured to receive an encoded bitstream of video data and a video decoder communicatively coupled to the antenna and configured to decode the encoded bitstream. The encoded bitstream may include data associated with a coding partition and one or more indicators comprising a transform type indicating at least one of a content adaptive transform or a fixed transform. The video decoder may be configured to decode the encoded bitstream to determine the data associated with the coding partition and the transform type, perform an inverse transform based at least in part on the data associated with the coding partition and the transform type to generate a decoded prediction error data partition, add a prediction partition to the decoded prediction error data partition to generate a reconstructed partition, and assemble the reconstructed partition with a second reconstructed partition to generate at least one of a tile or a super-fragment.

In a further example system, the system may also include a display device configured to present video frames. The encoded bitstream may further include data associated with a second coding partition and one or more second indicators comprising at least a second transform type, wherein the one or more indicators further comprises at least one of a transform direction indicating a parametric transform direction for the content adaptive transform. The video decoder may be further configured to decode the encoded bitstream to determine the data associated with the second coding partition and the one or more second indicators, perform a second inverse transform based at least in part on the data associated with the second coding partition and the second transform type to generate a second decoded prediction error data partition, assemble the tile or super-fragment with a second tile or a second super-fragment to generate a video frame. The inverse transform may include a hybrid parametric Haar inverse transform such that the hybrid parametric Haar inverse transform may include a parametric Haar inverse transform in a direction of the parametric transform direction and a discrete cosine inverse transform in a direction orthogonal to the parametric transform direction. The parametric transform direction may include at least one of horizontal or vertical. The fixed inverse transform comprises at least one of a discrete cosine inverse transform or a discrete cosine inverse transform approximator. The prediction partition may include a previously decoded frame generated using at least one of a morphing technique or a synthesizing technique, and the bitstream further may include at least one of a frame reference, morphing parameters, or synthesizing parameters associated with the prediction partition.

In a further example, at least one machine readable medium may include a plurality of instructions that in response to being executed on a computing device, causes the computing device to perform the method according to any one of the above examples.

In a still further example, an apparatus may include means for performing the methods according to any one of the above examples.

The above examples may include specific combination of features. However, such the above examples are not limited in this regard and, in various implementations, the above examples may include the undertaking only a subset of such features, undertaking a different order of such features, undertaking a different combination of such features, and/or undertaking additional features than those features explicitly listed. For example, all features described with respect to the example methods may be implemented with respect to the example apparatus, the example systems, and/or the example articles, and vice versa.

What is claimed:

1. A computer-implemented method for video coding, comprising:
  receiving a prediction error data partition corresponding to input video for transform coding;
  partitioning the prediction error data partition into a plurality of coding partitions of the prediction error data partition including a first subset of the plurality of coding partitions and a second subset of the plurality of coding partitions, wherein the first subset of the plurality of coding partitions comprises one or more coding partitions having a height of less than or equal to 16 pixels and a width of less than or equal to 16 pixels and the second subset of the plurality of coding partitions comprises one or more coding partitions having a height of greater than or equal to 16 pixels and a width greater than or equal to 16 pixels;
  performing a content adaptive parametric transform on a first coding partition of the first subset of the plurality of coding partitions in response to the first coding partition of the first subset having a height of less than or equal to 16 pixels and a width of less than or equal to 16 pixels, wherein the content adaptive parametric transform comprises content dependent basis functions determined based on decoded video data neighboring the first coding partition;
  performing a fixed transform on a second coding partition of the second subset of the plurality of coding partitions in response to the second coding partition of the second subset having a height of greater than or equal to 16 pixels and a width greater than or equal to 16 pixels, wherein the fixed transform comprises fixed basis functions;

encoding a bitstream with quantized transform coefficients corresponding to the content adaptive transformed first subset of coding partitions and the fixed transformed second subset of coding partitions; and transmitting the encoded bitstream.

2. The method of claim 1, wherein partitioning the prediction error data partition into the plurality of coding partitions comprises partitioning the prediction error data partition using a bi-tree partitioning technique.

3. The method of claim 1, wherein the fixed transform comprises at least one of a discrete cosine transform or a discrete cosine transform approximator.

4. The method of claim 1, wherein the content adaptive parametric transform comprise one of a parametric Haar transform, a hybrid parametric Haar transform, a parametric slant transform, or a hybrid parametric slant transform.

5. The method of claim 1, wherein partitioning the prediction error data partition comprises partitioning the prediction error data partition into at least one coding partition of 16 by 16 pixels, the method further comprising:

selecting whether to encode the coding partition of 16 by 16 pixels based on a second content adaptive parametric transform or the fixed transform, wherein encoding the bitstream comprises encoding the bitstream with quantized transform coefficients corresponding to the selected second content adaptive parametric transform or fixed transform of the coding partition of 16 by 16 pixels.

6. The method of claim 1, further comprising:

determining a picture type and a prediction type associated with the prediction error data partition, wherein the picture type comprises at least one of an F/B-picture or a P-picture, wherein the prediction type comprises inter prediction, and wherein partitioning the prediction error data partition into the plurality of coding partitions comprises partitioning the prediction error data partition using a bi-tree partitioning technique.

7. The method of claim 1, further comprising:

receiving a tile for coding;

determining a picture type associated with the tile, wherein the picture type comprises an I-picture;

partitioning the tile using a k-d tree partitioning technique to generate a plurality of partitions for prediction;

performing intra-prediction to generate a plurality of prediction partitions associated with the plurality of partitions for prediction;

differencing the plurality of prediction partitions with original pixel data associated with the plurality of prediction partitions to generate a plurality of second prediction error data partitions;

performing a second content adaptive parametric transform on a third subset of the plurality of second prediction error data partitions; and performing a second fixed transform on a fourth subset of the plurality of second prediction error data partitions.

8. A video encoder comprising:

an image buffer;

a processor communicatively coupled to the image buffer and configured to:

receive a prediction error data partition corresponding to input video for transform coding;

partition the prediction error data partition into a plurality of coding partitions of the prediction error data partition including a first subset of the plurality of coding partitions and a second subset of the plurality of coding partitions, wherein the first subset of the plurality of coding partitions comprises one or more coding partitions having a height of less than or equal to 16 pixels and a width of less than or equal to 16 pixels and the second subset of the plurality of coding partitions comprises one or more coding partitions having a height of greater than or equal to 16 pixels and a width greater than or equal to 16 pixels;

perform a content adaptive parametric transform on the first subset of the plurality of coding partitions in response to the one or more coding partitions of the first subset having a height of less than or equal to 16 pixels and a width of less than or equal to 16 pixels, wherein the content adaptive parametric transform comprises content dependent basis functions determined from decoding neighboring video data;

perform a fixed transform on the second subset of the plurality of coding partitions in response to the one or more coding partitions of the second subset having a height of greater than or equal to 16 pixels and a width greater than or equal to 16 pixels, wherein the fixed transform comprises fixed basis functions; and encode a bitstream with quantized transform coefficients corresponding to the content adaptive transformed first subset of coding partitions and the fixed transformed second subset of coding partitions; and a transmitter configured to transmit the encoded bitstream.

9. The video encoder of claim 8, wherein to partition the prediction error data partition comprises the processor being configured to partition the prediction error data partition using a bi-tree partitioning.

10. The video encoder of claim 8, wherein the fixed transform comprises at least one of a discrete cosine transform or a discrete cosine transform approximator and the content adaptive parametric transform comprise one of a parametric transform, a parametric Haar transform, a hybrid parametric Haar transform, a parametric slant transform, or a hybrid parametric slant transform.

11. The video encoder of claim 8, wherein the processor is further configured to:

receive a tile for coding; and partition the tile using a k-d tree partitioning technique to generate a plurality of partitions for prediction, and wherein to partition the prediction error data partition comprises the processor to partition the prediction error data partition using a bi-tree partitioning technique.

12. The video encoder of claim 8, wherein the processor is further configured to:

receive a tile for coding; and partition the tile using a bi-tree partitioning technique to generate a plurality of partitions for prediction, wherein to partition the prediction error data partition comprises the processor being configured to partition the prediction error data partition using a k-d tree partitioning technique;

perform a second content adaptive parametric transform on a third subset of a plurality of second prediction error data partitions associated with the plurality of partitions for prediction; and perform a second fixed transform on a fourth subset of the plurality of second prediction error data partitions associated with the plurality of partitions for prediction.

13. A system comprising:
an antenna configured to receive an encoded bitstream of video data, wherein the encoded bitstream comprises data associated with a first coding partition, one or more indicators comprising a transform type indicating the first coding partition corresponds to a content adaptive parametric transform type, data associated with a second coding partition, and one or more second indicators indicating the second coding partition corresponds to a fixed transform type, wherein the content adaptive parametric transform comprises content dependent basis functions and the fixed transform comprises fixed basis functions; and
a video decoder communicatively coupled to the antenna and configured to decode the encoded bitstream, wherein the video decoder is configured to:
decode the encoded bitstream to determine the data associated with the first coding partition, the content adaptive parametric transform type corresponding to the first coding partition, the data associated with the second coding partition, and the fixed transform type corresponding to the second coding partition;
determine the content dependent basis functions of the content adaptive parametric transform based on decoded video data neighboring the first coding partition;
perform a content adaptive inverse transform based at least in part on the data associated with the first coding partition in response to the content adaptive transform type and based on the determined content dependent basis functions to generate a first decoded prediction error data partition;
perform a fixed inverse transform based at least in part on the data associated with the second coding partition in response to the fixed transform type to generate a second decoded prediction error data partition;
add a first prediction partition to the first decoded prediction error data partition to generate a first reconstructed partition;
add a second prediction partition to the second decoded prediction error data partition to generate a second reconstructed partition; and
assemble the first and second reconstructed partitions with a third reconstructed partition to generate at least one of a tile or a super-fragment.

14. The system of claim 13, the system further comprising:
a display device configured to present video frames.

15. The system of claim 13, wherein the fixed transform comprises at least one of a discrete cosine transform or a discrete cosine transform approximator.

16. The system of claim 13, wherein the content adaptive transform comprises a hybrid parametric Haar transform, wherein the hybrid parametric Haar transform comprises a parametric Haar transform in a first direction and a discrete cosine transform in a second direction, and wherein the first direction comprises at least one of horizontal or vertical.

17. At least one non-transitory machine readable medium comprising a plurality of instructions that, in response to being executed on a computing device, cause the computing device to provide video coding by:
receiving a prediction error data partition corresponding to input video for transform coding;
partitioning the prediction error data partition into a plurality of coding partitions of the prediction error data partition including a first subset of the plurality of coding partitions and a second subset of the plurality of coding partitions, wherein the first subset of the plurality of coding partitions comprises one or more coding partitions having a height of less than or equal to 16 pixels and a width of less than or equal to 16 pixels and the second subset of the plurality of coding partitions comprises one or more coding partitions having a height of greater than or equal to 16 pixels and a width greater than or equal to 16 pixels;
performing a content adaptive parametric transform on a first coding partition of the first subset of the plurality of coding partitions in response to the first coding partition of the first subset having a height of less than or equal to 16 pixels and a width of less than or equal to 16 pixels, wherein the content adaptive parametric transform comprises content dependent basis functions determined based on decoded video data neighboring the first coding partition;
performing a fixed transform on a second coding partition of the second subset of the plurality of coding partitions in response to the second coding partition of the second subset having a height of greater than or equal to 16 pixels and a width of greater than or equal to 16 pixels, wherein the fixed transform comprises fixed basis functions;
encoding a bitstream with quantized transform coefficients corresponding to the content adaptive transformed first subset of coding partitions and the fixed transformed second subset of coding partitions; and
transmitting the encoded bitstream.

18. The machine readable medium of claim 17, wherein partitioning the prediction error data partition into the plurality of coding partitions comprises partitioning the prediction error data partition using a bi-tree partitioning technique.

19. The machine readable medium of claim 17, wherein the fixed transform comprises at least one of a discrete cosine transform or a discrete cosine transform approximator.

20. The machine readable medium of claim 17, wherein the content adaptive parametric transform comprise one of a parametric Haar transform, a hybrid parametric Haar transform, a parametric slant transform, or a hybrid parametric slant transform.

21. The video encoder of claim 8, wherein partitioning the prediction error data partition comprises partitioning the prediction error data partition into at least one coding partition of 16 by 16 pixels, wherein the processor is further configured to:
select whether to encode the coding partition of 16 by 16 pixels based on a second content adaptive parametric transform or the fixed transform, wherein to encode the bitstream comprises the processor being configured to encode the bitstream with quantized transform coefficients corresponding to the selected second content adaptive parametric transform or fixed transform of the coding partition of 16 by 16 pixels.

22. The machine readable medium of claim 17, wherein partitioning the prediction error data partition comprises partitioning the prediction error data partition into at least one coding partition of 16 by 16 pixels, the machine readable medium further comprising instructions that, in response to being executed on a computing device, cause the computing device to provide video coding by:
selecting whether to encode the coding partition of 16 by 16 pixels based on a second content adaptive parametric transform or the fixed transform, wherein encoding the bitstream comprises encoding the bitstream with quantized transform coefficients corresponding to the selected second content adaptive parametric transform or fixed transform of the coding partition of 16 by 16 pixels.

* * * * *